(12) United States Patent
Satoh et al.

(10) Patent No.: US 8,054,327 B2
(45) Date of Patent: Nov. 8, 2011

(54) OPTICAL SCANNING DEVICE AND IMAGE FORMING APPARATUS USING THE SAME

(75) Inventors: Yukito Satoh, Miyagi (JP); Mitsumi Fujii, Iwate (JP)

(73) Assignee: Ricoh Company, Ltd., Tokyo (JP)

( * ) Notice: Subject to any disclaimer, the term of this patent is extended or adjusted under 35 U.S.C. 154(b) by 113 days.

(21) Appl. No.: 12/533,796

(22) Filed: Jul. 31, 2009

(65) Prior Publication Data
US 2009/0290205 A1    Nov. 26, 2009

Related U.S. Application Data

(62) Division of application No. 10/223,294, filed on Aug. 20, 2002, now Pat. No. 7,593,029.

(30) Foreign Application Priority Data

| Aug. 20, 2001 | (JP) | 2001-248851 |
| Aug. 23, 2001 | (JP) | 2001-252988 |
| Sep. 28, 2001 | (JP) | 2001-304069 |
| Jul. 25, 2002 | (JP) | 2002-216250 |

(51) Int. Cl.
- *B41J 15/14* (2006.01)
- *B41J 27/00* (2006.01)
- *G02B 26/08* (2006.01)

(52) U.S. Cl. ............ 347/243; 347/259; 359/224.1

(58) Field of Classification Search .......... 347/241–243, 347/256–260, 231; 359/213.1, 214.1, 199.1–199.4, 359/224.1–224.2, 225.1

See application file for complete search history.

(56) References Cited

U.S. PATENT DOCUMENTS

| 5,740,150 A * | 4/1998 | Uchimaru et al. ............ 369/119 |
| 5,942,054 A | 8/1999 | Tregilgas et al. |
| 5,959,760 A | 9/1999 | Yamada et al. |
| 6,185,026 B1 | 2/2001 | Hayashi et al. |
| 6,198,562 B1 | 3/2001 | Hayashi et al. |
| 6,198,565 B1 | 3/2001 | Iseki et al. |
| 6,201,629 B1 | 3/2001 | McClelland et al. |
| 6,238,581 B1 | 5/2001 | Hawkins et al. |
| 6,317,246 B1 | 11/2001 | Hayashi et al. |
| 6,381,057 B1 | 4/2002 | Itabashi |
| 6,400,391 B1 | 6/2002 | Suhara et al. |
| 6,400,917 B2 | 6/2002 | Nakazato et al. |

(Continued)

FOREIGN PATENT DOCUMENTS

JP    54-110783    8/1979

(Continued)

OTHER PUBLICATIONS

"Silicon Torsional Scanning Mirror" by Kurt E. Petersen. IBM J. Res. Develop. vol. 24 No. 5. Sep. 1980.

*Primary Examiner* — Hai C Pham
(74) *Attorney, Agent, or Firm* — Oblon, Spivak, McClelland, Maier & Neustadt, L.L.P.

(57) ABSTRACT

An optical deflector of the present invention includes a movable mirror and torsion bars supporting the mirror and formed integrally with the mirror. The mirror reciprocatingly vibrates to reflect a light beam to thereby deflect it. The mirror is curved in the form of an arch in a section including at least the torsion bars. The mirror deforms little during vibration even if it is thin. Small power can cause such a thin mirror to vibrate with a large amplitude.

11 Claims, 51 Drawing Sheets

U.S. PATENT DOCUMENTS

| | | |
|---|---|---|
| 6,429,956 B2 | 8/2002 | Itabashi |
| 6,462,853 B2 | 10/2002 | Hayashi |
| 6,469,772 B1 | 10/2002 | Itabashi |
| 6,919,980 B2 * | 7/2005 | Miyajima et al. .......... 359/199.1 |
| 7,005,775 B2 | 2/2006 | Wan |
| 2003/0103717 A1 | 6/2003 | Aksyuk et al. |

FOREIGN PATENT DOCUMENTS

| | | |
|---|---|---|
| JP | 3-11144 | 1/1991 |
| JP | 4-86616 | 3/1992 |
| JP | 4-336522 | 11/1992 |
| JP | 07-072409 | 3/1995 |
| JP | 11-052278 | 2/1996 |
| JP | 08-220463 | 8/1996 |
| JP | 9-281417 | 10/1997 |
| JP | 2722314 | 11/1997 |
| JP | 2924200 | 5/1999 |
| JP | 2000-180739 | 6/2000 |
| JP | 2000-214407 | 8/2000 |
| JP | 2001-249300 | 9/2001 |
| JP | 2001249300 A * | 9/2001 |
| JP | 2002-48998 | 2/2002 |
| WO | WO 00/54090 | 9/2000 |

* cited by examiner

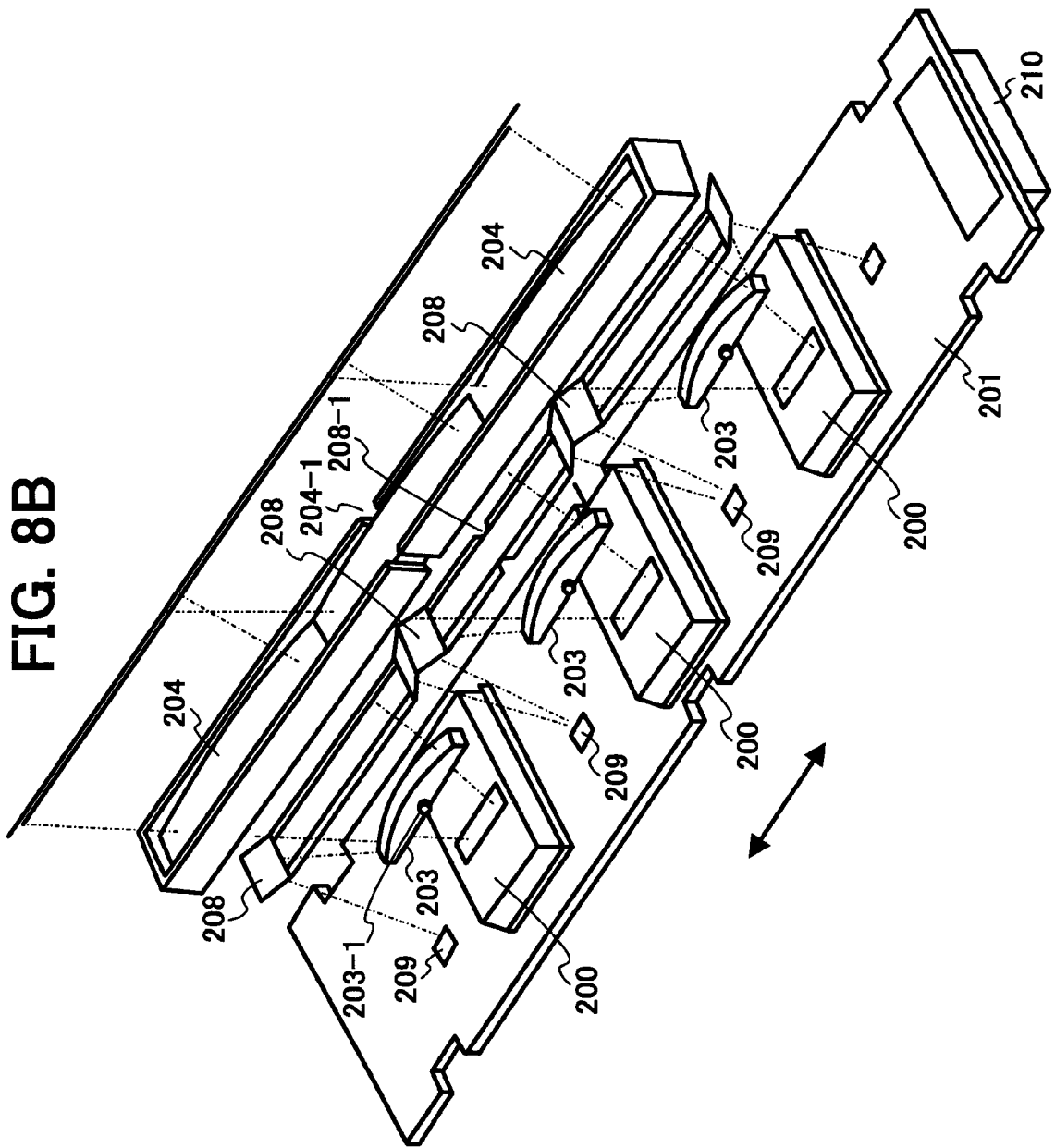

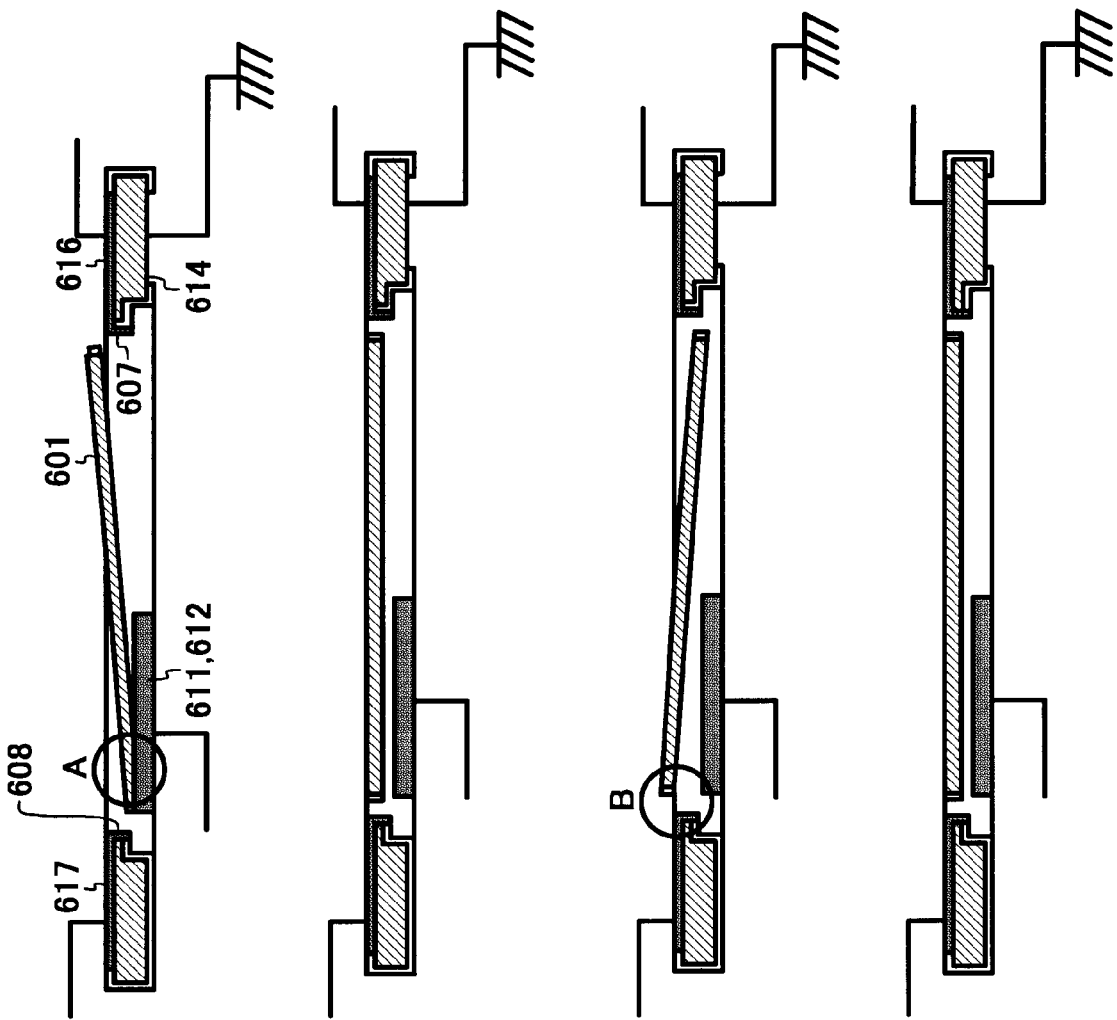

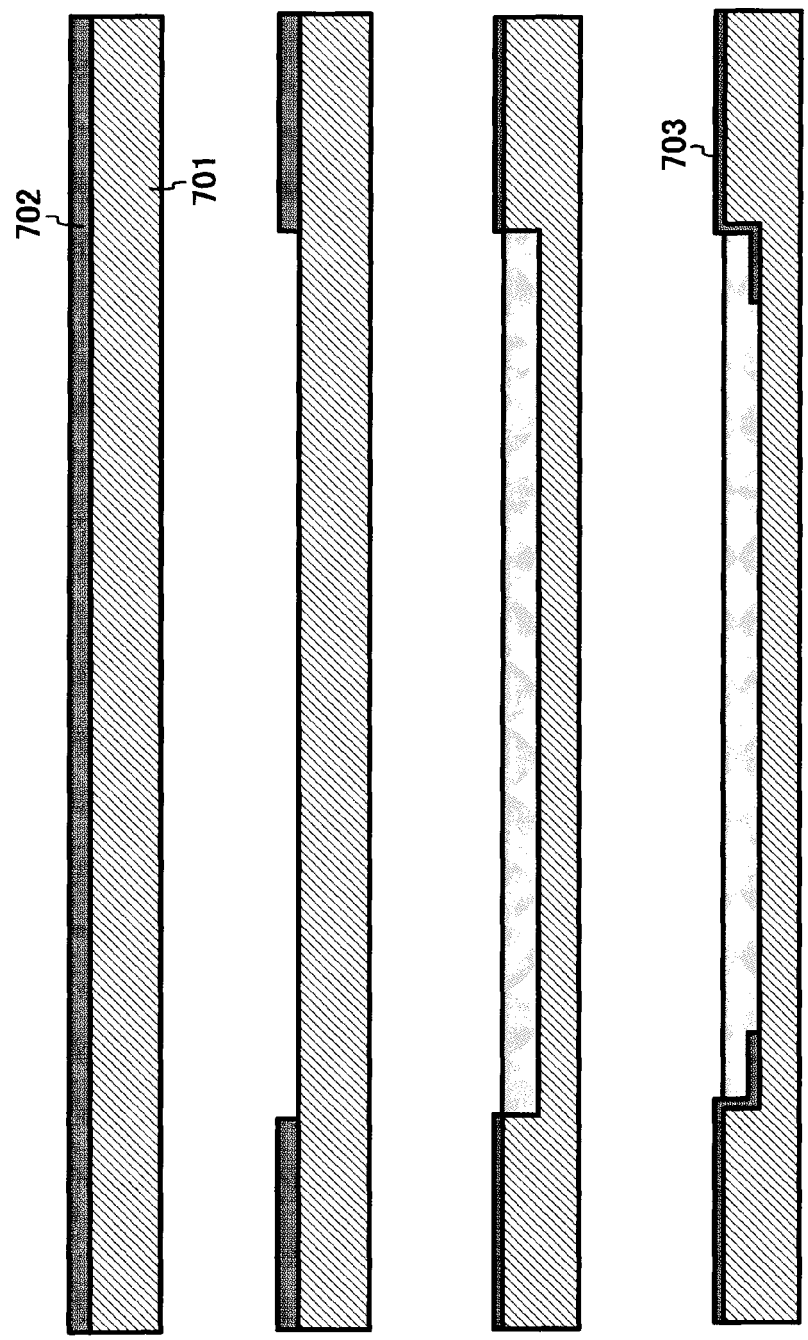

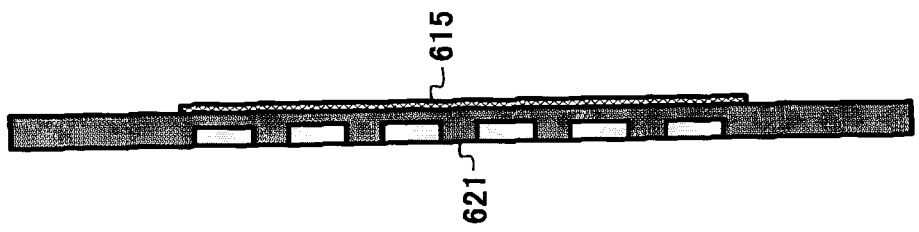
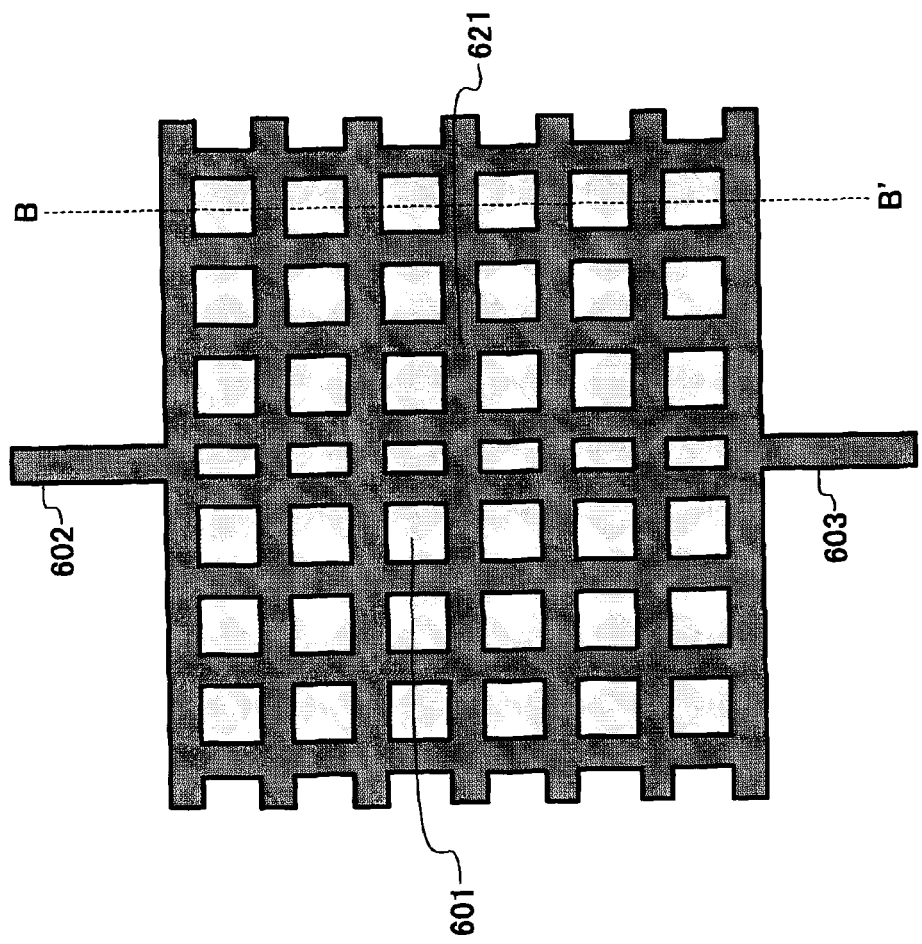

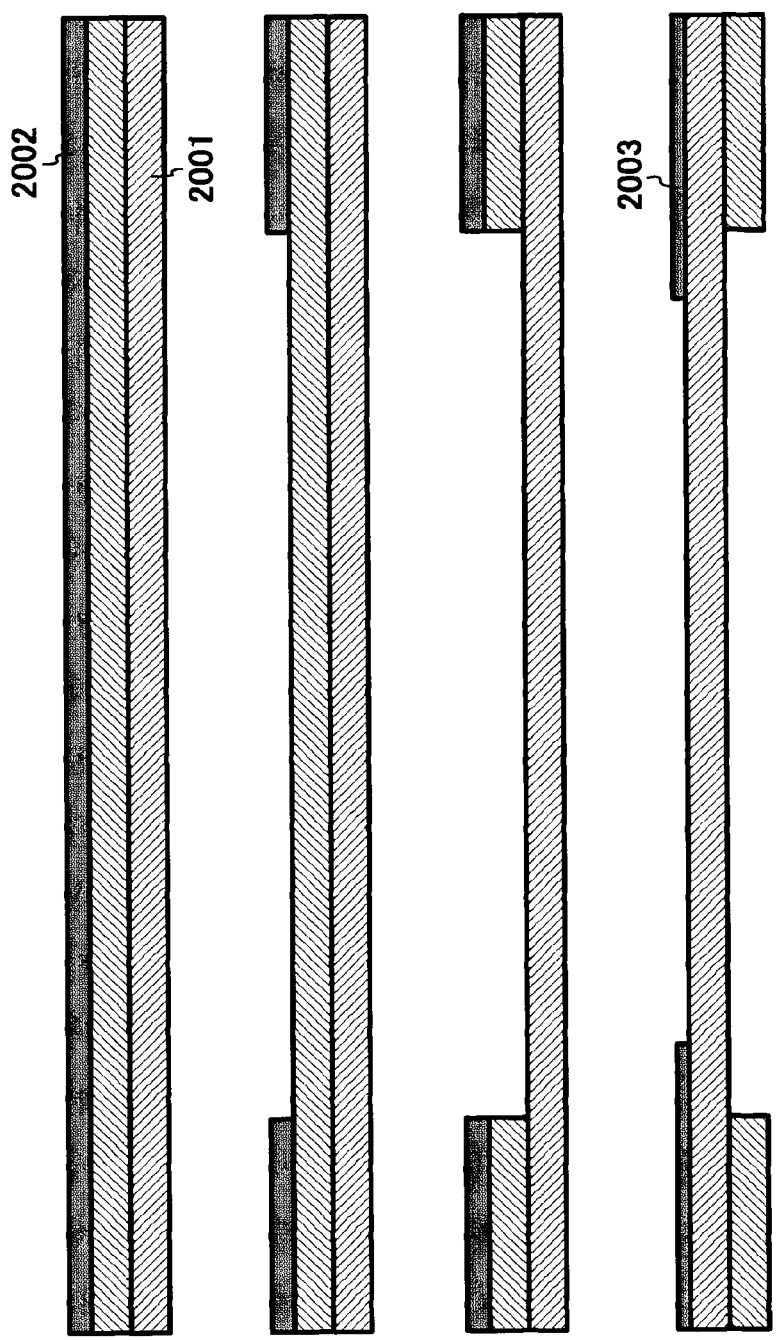

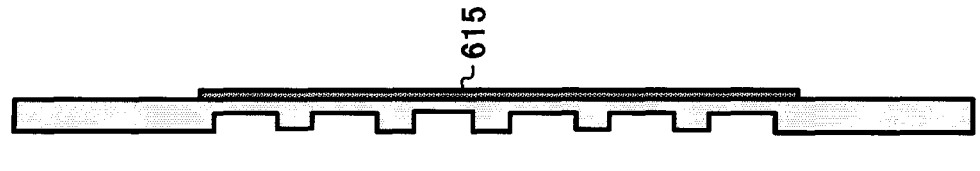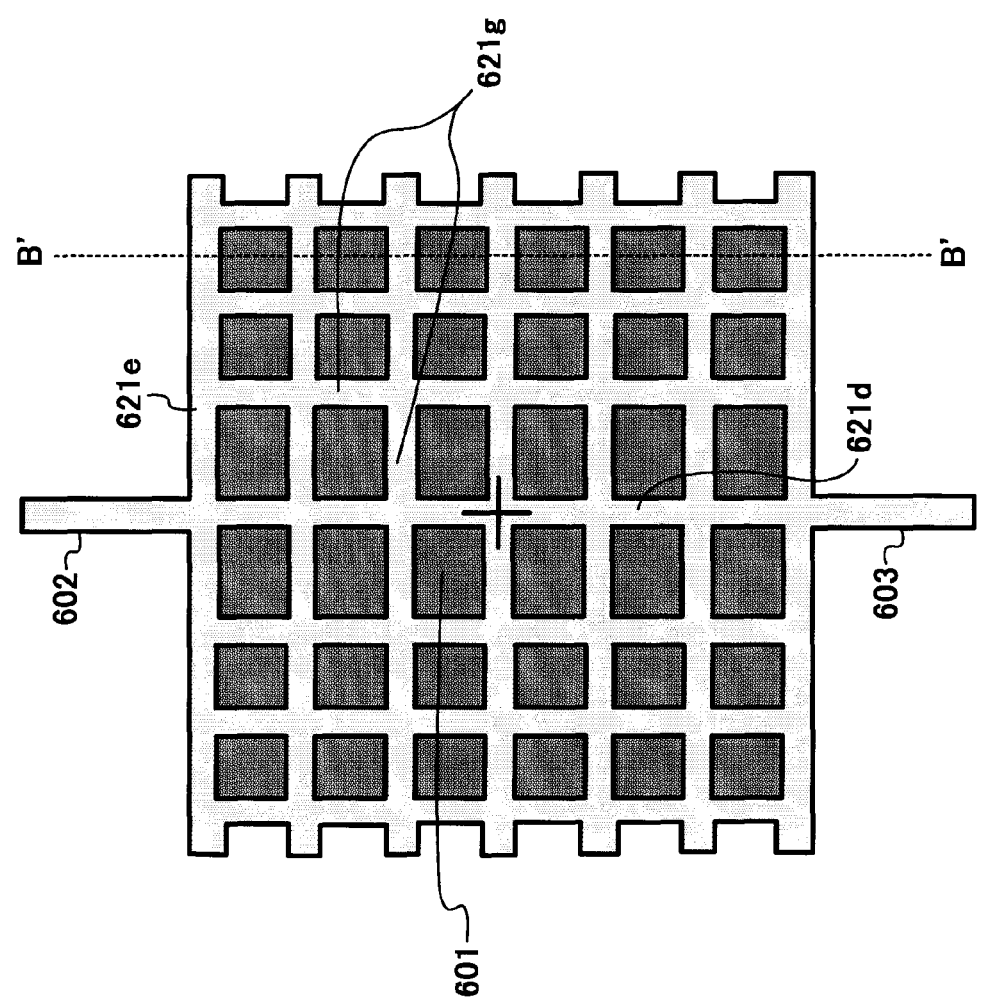

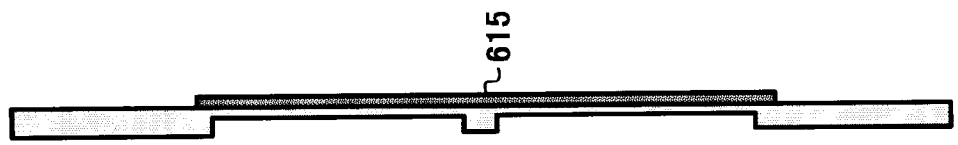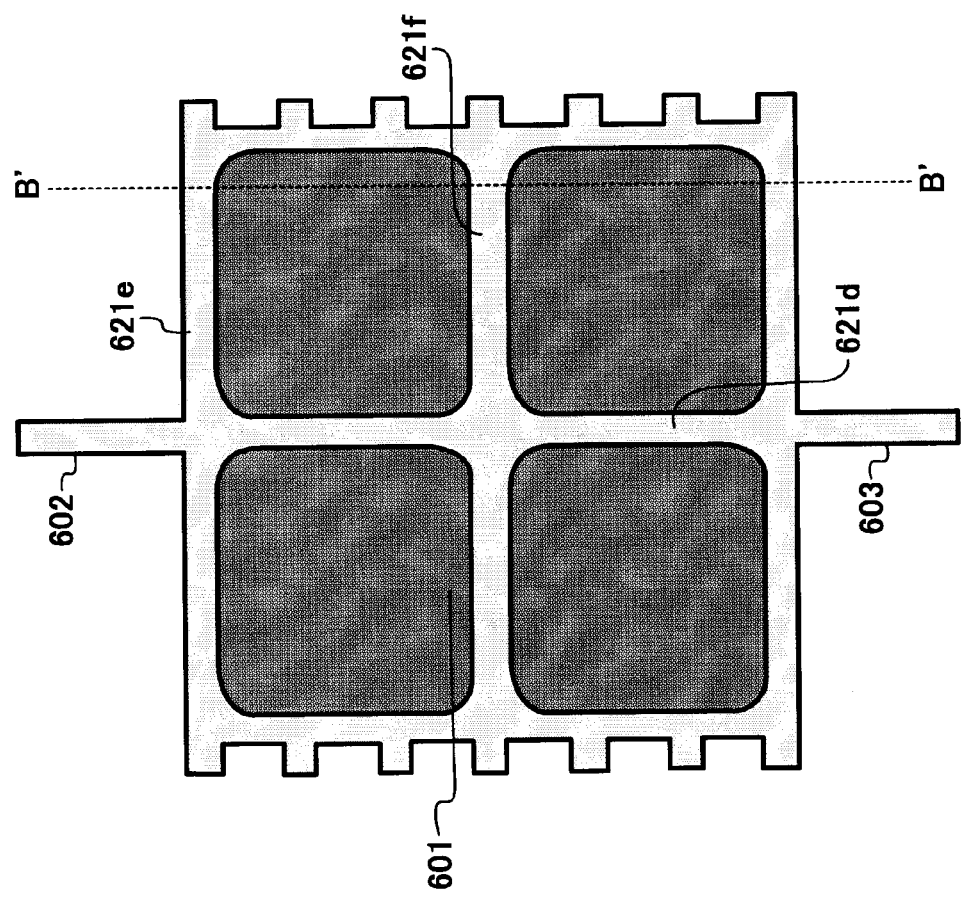

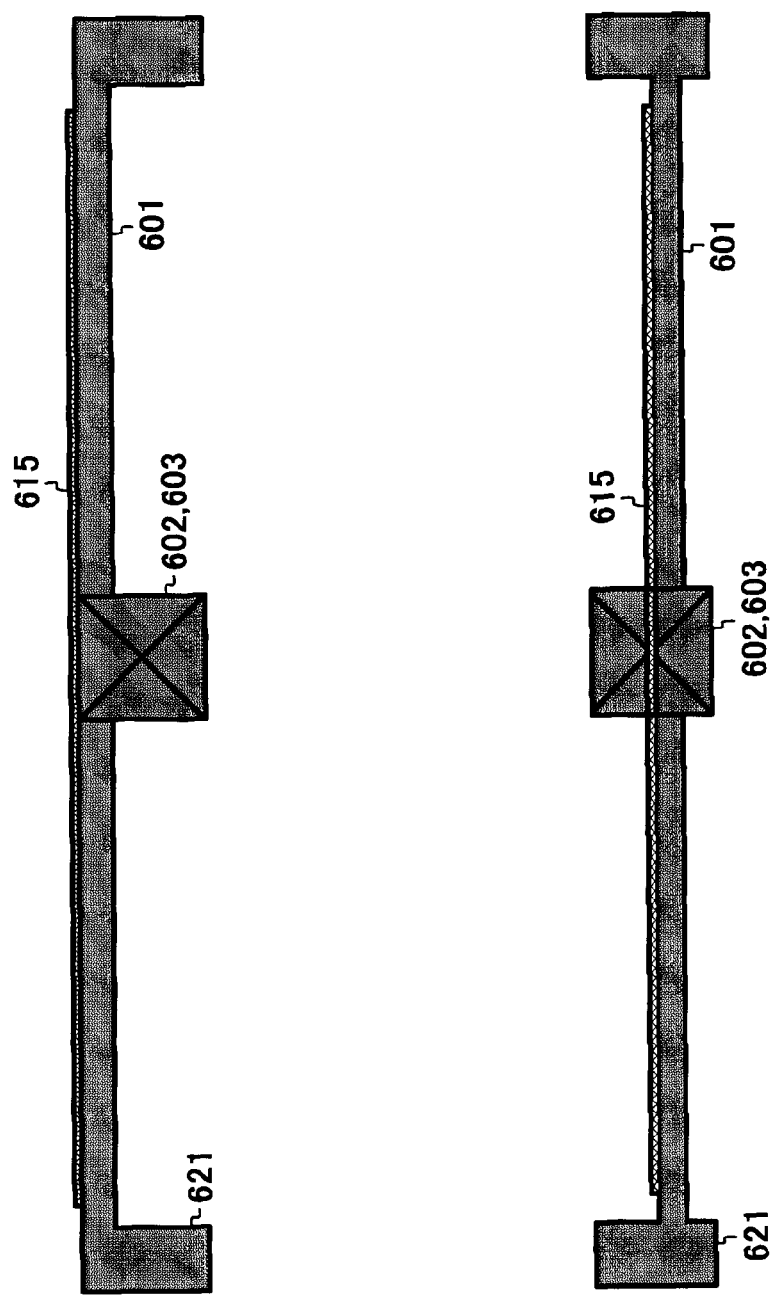

OPTICAL SCANNING DEVICE AND IMAGE FORMING APPARATUS USING THE SAME

CROSS-REFERENCE TO RELATED APPLICATIONS

This application is a divisional of U.S. application Ser. No. 10/223,294, filed Aug. 20, 2002 now U.S. Pat. No. 7,593,029, the entire contents of which are incorporated herein be reference. U.S. application Ser. No. 10/223,294, claims the benefit of priority under 35 U.S.C. §119 from Japanese Patent Application Nos. 2001-248851 filed Aug. 20, 2001; 2001-252988 filed Aug. 23, 2001; 2001-304069 filed Sep. 28, 2001; and 2002-216250 filed Jul. 25, 2002.

BACKGROUND OF THE INVENTION

1. Field of the Invention

The present invention relates to an optical scanning device, particularly an optical scanning device of the type including a minute mirror supported by two torsion bars and performing torsional vibration about the bars, and an image forming apparatus using the same.

2. Description of the Background Art

It has been customary with an optical scanning device to use a polygonal mirror, galvanometer mirror or similar deflector for deflecting an incident light beam. The problem with this kind of deflector is that deflecting speed is limited because of the durability of bearings, heat and noise and cannot meet the increasing demand for higher resolution and higher printing speed.

Today, optical scanning devices using micromachining are under study and expected to implement desirable optical writing devices for digital copiers, laser printers and other image forming apparatuses or reading devices for barcode readers and scanners. Japanese Patent Nos. 2,722,314, 3,011,144 and 2,924,200, for example, each disclose a particular system in which a movable mirror and torsion bars supporting it are formed integrally with each other by use of a silicon substrate. The movable mirror reciprocatingly vibrates due to resonance and therefore produces a minimum of noise while realizing high-speed operation. In addition, the movable mirror can be driven by a small torque and therefore with a minimum of power consumption. On the other hand, Japanese Patent Laid-Open Publication No. 11-218709 proposes correcting means for correcting the deformation of a movable mirror during vibration although the movable mirror is not formed integrally with torsion bars. Further, Japanese Patent Laid-Open Publication No. 4-86616 teaches a member for preventing a movable mirror from vibrating due to deformation when the direction of vibration is switched.

Although the movable mirror produced by micromachining has the advantages described above, it must be configured and dimensioned in accordance with resonance frequency and must be light enough to increase amplitude for a small torque. The mirror is therefore thin and apt to deform during vibration. Because the mirror performs sinusoidal vibration, negative acceleration increases with an increase in swing angle, resulting in an inertial force counter to rotation indirection. Consequently, the edge portions of the mirror positioned at both sides of torsion bars deform in the direction perpendicular to the torsion bars, varying the direction of beam deflection and thereby making scanning speed irregular on a line to be scanned. Further, the curvature of the deformed mirror shifts a beam focusing point.

Japanese Patent Nos. 3,011,144 and 2,924,200 mentioned earlier each disclose a particular system in which a movable mirror is formed with movable electrodes at its edges positioned at both sides of torsion bars while stationary electrodes each are positioned to face one of the movable electrodes. Electrostatic attraction is caused to act between the movable mirrors and the stationary mirrors for thereby driving the mirror. The electrodes are configured in the form of comb teeth and combined to have a broad area each, so that the electrostatic attraction is intensified. Generally, to provide the mirror with initial displacement, a step is formed between each movable electrode and stationary electrode adjoining it. Therefore, when the mirror is tilted in one direction, one of the movable electrodes is moved away from the associated stationary electrode. As a result, only the electrostatic attraction available with the other stationary electrode acts on the mirror. The system therefore fails to effectively use electrostatic attraction to act between the two movable electrodes and the two stationary electrodes.

IBM J. Res. Develop Vol. 24 (1980) teaches an optical scanning device in which a mirror base is supported by two torsion bars aligning with each other and is caused to perform torsional vibration about the torsion bars by electrostatic attraction, which acts between the mirror base and an electrode facing it. This optical scanning device, which is produced by micromachining, is simpler in structure than the conventional optical scanning device using a polygonal mirror to be driven by a motor and can be produced by a semiconductor process. The optical scanning device can therefore be easily reduced in size and cost. Further, the device has a single reflection surface and is therefore free from irregularity in accuracy particular to a plurality of reflection surfaces. In addition, the device is feasible for high-speed operation because of reciprocating scanning.

An electrostatic drive, torsional vibration type of optical scanning device is proposed in each of The 13th Annual International Workshop on MEMS 2000, PP. 473-478 and MEMS 1999, pp. 333-338. The scanning device of the type proposed includes an electrode facing the end face of a mirror base such that the electrode does not overlap the vibration range of the mirror base, so that the swing angle of the mirror base is increased. More specifically, the mirror base is implemented by a 20 μm thick, silicon base and plays the role of a movable electrode. Electrostatic attraction is caused to act between the mirror base or movable electrode and a stationary electrode that faces the end of the mirror base at a small distance. The two electrodes are formed at the same position. Particularly, the device proposed in MEMS 2000 uses the minute asymmetry of a structural body derived from a fabrication process to provide the mirror base with an initial moment for the startup of drive with respect to a twist axis. The device proposed in MEM 1999 has a think metal film or electrode for startup positioned in a plane perpendicular to a drive electrode.

Further, a trial, vibratory mirror chip using a thin film mirror is described in Optical MEMS 2000 and includes a circular frame. Polysilicon with a tensile stress is formed on the frame. An electrode resembling comb teeth is formed at the extension of the frame parallel to a torsion bar. An upper and a lower electrode cause the torsion bar to twist.

It is a common practice with a torsional vibration type of optical scanning device implemented by micromachining to form a mirror base by etching a silicon substrate through by dry etching. The mirror base is several ten micrometers. For example, the optical scanning device described in MEMS 2000 uses a 30 μm thick mirror base with the maximum area of 1.5 mm². Likewise, MEMS 1999 uses a 20 μm thick mirror base with the maximum area of 3 mm². Even such a thin mirror base is sometimes required to be dimensioned several millimeters at each side, depending on the configuration of a beam issuing from a light source or a required beam diameter on a surface to be scanned.

The swing angle of a mirror may be expressed as:

$$\theta = Trq \times K(\omega, \delta) / I \qquad \text{Eq. (1)}$$

where I denotes the moment of inertia of the mirror, Trq denote a drive torque, ω denotes an angular velocity, δ denotes the viscous resistance of a space in which the mirror vibrates, and K(ω,δ) denotes a coefficient of vibration.

The moment of inertial I of the mirror may be produced by:

$$I = M(a^2 + b^2)/12 \qquad \text{Eq. (2)}$$
$$= \rho t a b (a^2)/12.$$

where M denotes the weight of the mirror, ρ denotes density, and b, a and t respectively denote the width, length and thickness of the mirror.

It will therefore be seen that to increase the swing angle of the mirror, the weight and therefore the moment of inertia of the mirror should only be reduced.

On the other hand, the resonance frequency f of the mirror may be expressed as:

$$f = 1/2\pi \sqrt{(k/I)} \qquad \text{Eq. (3)}$$

where k denotes the coefficient of torsional elasticity of a torsion bar.

Assuming that the torsion bar has a width c, a height t and a length L, then the coefficient of torsional elasticity k may be produced by:

$$k = \beta t c^3 E / L(1+\nu) \qquad \text{Eq. (4)}$$

where β denotes the coefficient of a sectional shape, E denotes a Young's modulus, and ν denotes a Poisson's ratio.

As the above Eqs. (3) and (4) indicate, the resonance frequency of the mirror can be increased if the coefficient of torsional elasticity of the torsion bar is increased by increasing the sectional area of the torsion bar or by reducing the length of the same or if the mirror is reduced in weight to reduce the moment of inertia.

Reducing the weight of the mirror and therefore the moment of inertia is effective to increase the swing angle and operation speed. Particularly, reducing the weight of the mirror is essential for reducing the weight of the mirror as structural means for increasing the swing angle. However, if the thickness of the mirror is reduced for reducing the weight while guaranteeing a size required of a mirror base, then the mirror base deforms in the case of high-speed drive and cannot easily maintain its surface configuration constant, causing the beam configuration and focus to vary. Moreover, it is difficult to accurately control the thickness of the mirror on a production line; any irregularity in thickness directly translates into irregularity in resonance frequency.

As for the trial optical scanner described in Optical MEMS 2000, the size of the mirror or thin film available at the present stage of development is 1 mm or less. Therefore, should such a thin film be directly applied to a large mirror, the thin film would deform in the event of high-frequency operation or the frame supporting the thin film would deform due to the tensile stress of the thin film.

SUMMARY OF THE INVENTION

It is an object of the present invention to provide an optical deflector causing a movable mirror thereof to deform little during vibration even if the mirror is thin, a method of producing the optical deflector, an optical scanning module, an optical scanning device, an image forming apparatus, and an image display.

It is another object of the present invention to provide an optical scanning device or a vibratory mirror chip whose mirror surface deforms little even when a large-size mirror base swings with a large swing angle at high speed for thereby insuring stable optical scanning, an optical scanning module using the same, an optical writing device, and an image forming apparatus.

It is a further object of the present invention to provide a method of producing such an optical scanning device or a vibratory mirror chip with a simple, low-cost procedure.

In accordance with the present invention, in an optical deflector including a movable mirror and torsion bars formed integrally with the movable mirror and supporting the mirror such that the mirror is rotatable about the torsion bars, the mirror reciprocatingly vibrates while reflecting a light beam for thereby deflecting the light beam. The mirror is curved in the form of an arch in a section containing at least the torsion bars.

A method of producing the optical deflector, an optical scanning module, an optical scanning device, an image forming apparatus and an image display are also disclosed.

BRIEF DESCRIPTION OF THE DRAWINGS

The above and other objects, features and advantages of the present invention will become more apparent from the following detailed description taken with the accompanying drawings in which:

FIG. 8B is a perspective view of the scanning device;

FIGS. 17A through 17D demonstrate the operation of the device of FIGS. 16A and 16B;

FIGS. 19A through 19K demonstrate a specific procedure for producing the device of FIGS. 16A and 16B;

FIGS. 21A and 21B are respectively a bottom view and a section showing a mirror base included in a fifth embodiment of the optical scanning device in accordance with the present invention;

FIGS. 26A through 26H are sections showing another specific procedure for producing the device of FIGS. 23A and 23B;

FIGS. 28A and 28B are respectively a bottom view and a section showing a mirror base included in a ninth embodiment of the optical scanning device in accordance with the present invention;

FIGS. 30A and 30B are respectively a bottom view and a section showing a mirror base included in an eleventh embodiment of the optical scanning device in accordance with the present invention;

FIG. 32 is a section showing a positional relation between the mirror base and torsion bars included in any one of the illustrative embodiments;

FIG. 33 is a view similar to FIG. 32, showing a relation particular to a thirteenth embodiment of the optical scanning device in accordance with the present invention;

DESCRIPTION OF THE PREFERRED EMBODIMENTS

Figure 1:
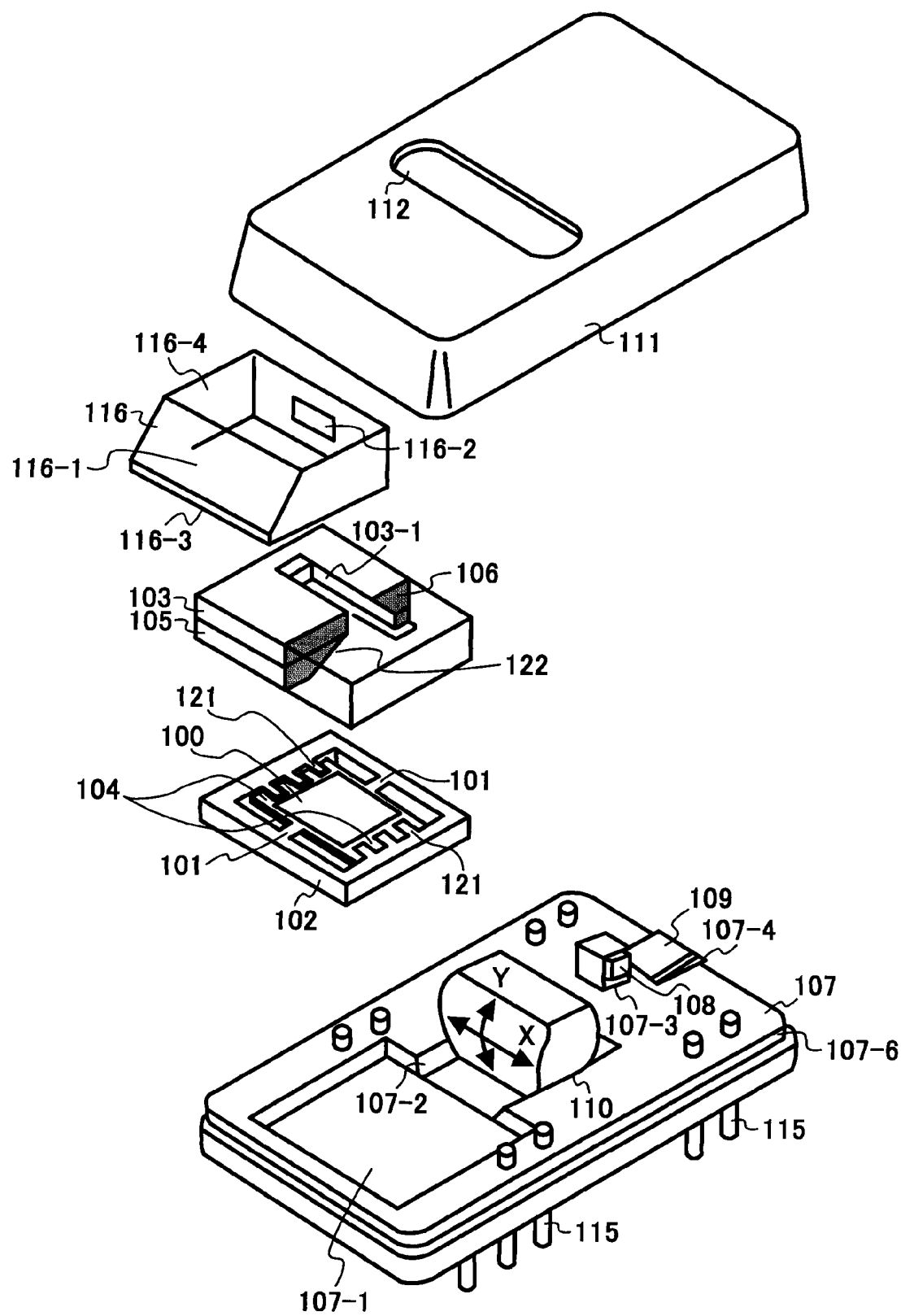
FIG. 1 is an exploded isometric view showing a first embodiment of the optical scanning module in accordance with the present invention.

Referring to FIG. 1 of the drawings, a first embodiment of the optical scanning module in accordance with the present invention is shown and included in an optical scanning device. As shown, the scanning module includes a mirror base 102 implemented by a silicon substrate. The bottom or reverse surface of the silicon substrate is etched to form a square cavity delimited by a frame portion and a flat portion having preselected thickness. Portions around the flat portion are etched through in such a manner as to form a movable mirror 100 and a pair of torsion bars 101 supporting the mirror 100. In the illustrative embodiment, a 200 μm thick silicon substrate is etched to form the mirror 100 and torsion bars 101, i.e., the flat portion that is 60 μm thick. The mirror 100 is sized 4 mm×4 mm while the torsion bars 101 each are 80 μm wide and about 1 mm long. The cavity formed in the bottom of the silicon forms a space in which the mirror 100 reciprocatingly vibrates.

Figure 2:
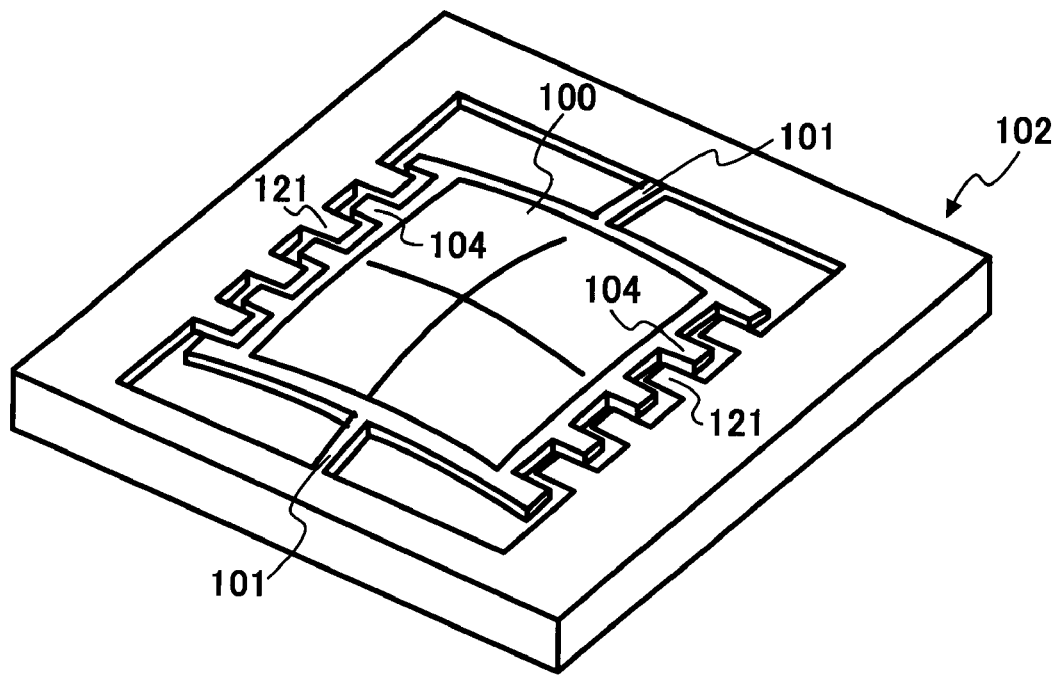
FIG. 2 is an isometric view of a movable mirror included in the module of FIG. 1.

The top or front surface of the mirror base 102 is directly implemented by the polished surface of a wafer. Etching applied to the bottom of the wafer releases stress remaining in the wafer due to consecutive processing steps, so that internal stress differs from the top to the bottom of the wafer. As a result, as shown in FIG. 2, the top of the mirror 100 is curved in the form of a dome. Further, an oxide film (or a nitride film) is formed on the surface of the mirror 100 and plays the role of a stress generating film. Tensile stress generated during the formation of the oxide film increases the curvature of the mirror 100 to thereby further reduce the radius of curvature. An aluminum film or similar metal film is formed on the oxide film by vapor deposition or sputtering, constituting a mirror surface.

Figure 3:
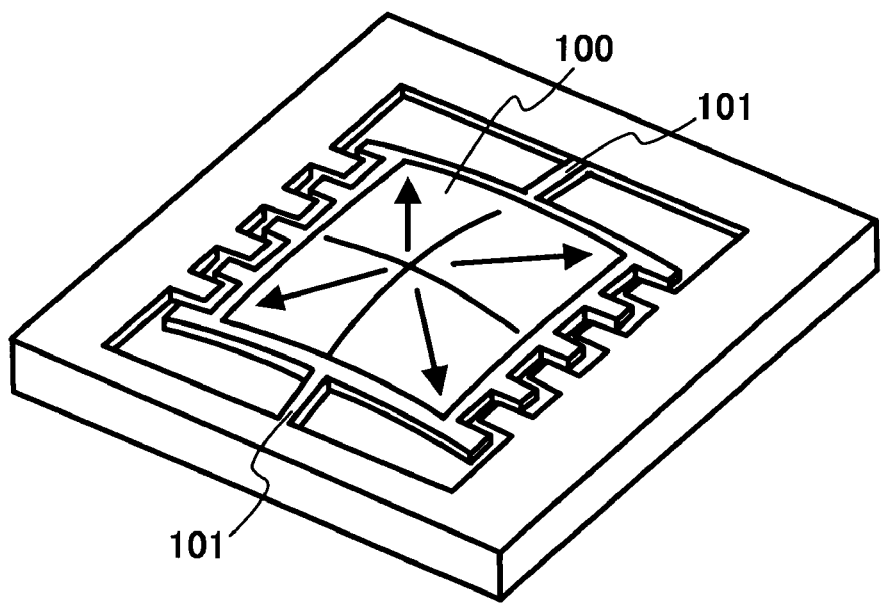
FIGS. 3 and 4 show stresses acting in the movable mirror.

As indicated by arrows in FIG. 3, to form the dome-like mirror 100, internal stress (tensile stress) extending from the center of the mirror 100 toward the peripheral portions is left in the mirror 100, causing the mirror 100 to bend in a section containing the torsion bars 101 and a section perpendicular to the torsion bars 101. Alternatively, as indicated by arrows in FIG. 4, internal stress may be left in the mirror 100 only in the direction parallel to the axis of the torsion bars 101, so that the mirror 100 bends in the form of an arch in the section containing the torsion bars 101. In any case, to control the shape of the mirror 100, the thickness of the thin film formed on the mirror 10 may be made uneven or ions may be locally implanted to thereby vary the balance of internal stress. While the mirror 100 is shown as being convex in FIGS. 3 and 4, it may be concave, if desired.

The edges of the mirror 100 positioned at both sides of the torsion bars 101 are notched in the form of comb teeth and covered with metal films, constituting movable electrodes 104. The inner edges of the frame portion facing the movable electrodes 104 have the same width as the mirror base 100 and are also notched in the form of comb teeth to constitute stationary electrodes 121. Each movable electrode 104 and stationary electrode 121 adjoining it are engaged with each other with a clearance of about 5 μm in an alternating fashion. When the mirror 100 is in a horizontal position, the movable electrodes 104 face the stationary electrodes 121 at the same level in the direction of thickness of the mirror base 102.

Figure 5:
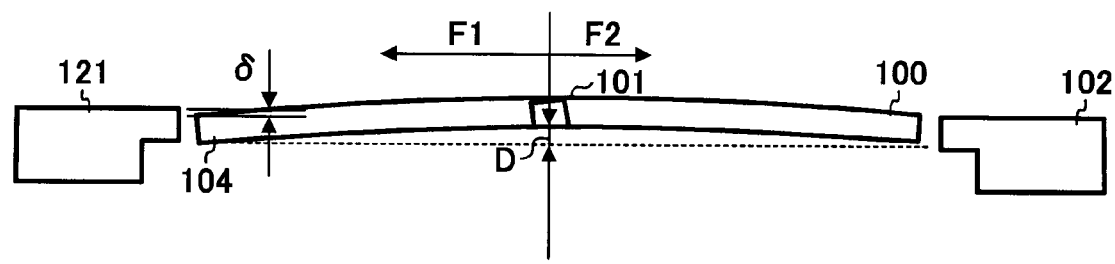
FIG. 5 shows a step between a movable electrode and a stationary electrode.

On the other hand, assume that the size of the difference in internal stress between the opposite surfaces of the mirror 100 is not symmetrically balanced with respect to the axis of the torsion bars 101, i.e., a line connecting the torsion bars 101. Stated another way, assume that the center of balance between the right and left internal stresses F1 and F2 (see FIG. 5) is shifted to the left or the right from the axis of the torsion bars 101. Then, as shown in FIG. 5, a twisting moment is generated even in the section of the torsion bars 101, causing the mirror 100 to tilt. The illustrative embodiment sets up such an uneven condition (F1>F2) for thereby forming a step δ of 3 μm to 5 μm between the left movable electrode 104, as viewed in FIG. 5, and stationary electrode 121 adjoining it. This step or initial displacement δ allows the movable electrodes 104 and stationary electrodes 121 at both edges of the mirror 100 to be positioned in the same plane and therefore located at the same distance in the event of reciprocating vibration. It follows that electrostatic attraction evenly acts on the opposite edges of the mirror 100 and can be effectively used.

As shown in FIG. 2, tension is uniformly generated in the mirror 100 due to the internal stress, providing the mirror 100 with a spherical surface having a uniform curvature. Such a configuration implements a greater sectional secondary moment than a flat configuration in the subscanning direction, which is parallel to the axis of the torsion bars 101. This causes the mirror 100 to deform little despite inertia counter in direction to the rotation of the mirror 100 or load variation to occur just after the switching of the direction of rotation.

It is needless to say that the curvature of the mirror 100 should advantageously be small from the rigidity standpoint. As shown in FIG. 1, the illustrative embodiment includes a coupling lens 110 having particular magnification in each of the main and subscanning directions. While a semiconductor laser 108 emits a laser beam, the coupling lens 110 converges the laser beam at a particular position in each of the main and subscanning directions. The coupling lens 110 therefore outputs a parallel beam in the main scanning direction and converges the laser beam on the mirror 100 in the subscanning direction. However, even if the coupling lens 11 is so positioned as to implement either one of the parallel beam in the main scanning direction and the convergence on the mirror in the subscanning direction, the curved mirror 100 causes the above difference in converging position to appear on a surface to be scanned also. Therefore, the thickness D of the curvature shown in FIG. 5 should preferably be λ/2 or less (λ denotes the wavelength of the laser beam) from the optical performance standpoint. In light of this, the radius of curvature is selected to be 3 m to 5 m.

Further, a difference in the radius of curvature between the main and the subscanning directions makes it difficult to match the converging positions. In this respect, stress should preferably be generated in the radial direction from the center of the mirror 100 as in the illustrative embodiment. This, coupled with the curvature close to a spherical surface, allow the curvatures in the main and subscanning directions to be matched.

It is to be noted that the curvature of the mirror 100 can be controlled if the thickness of the oxide film on the mirror 100 is controlled or if neon or similar inactive, dilute gas ions are implanted in the oxide film for varying the internal stress.

If desired, the oxide film having tensile stress may be replaced with a thin film having a compressive stress and formed on the bottom or reverse surface of the mirror 100. Of course, the oxide film may be replaced with, e.g., a magnesium fluoride film.

Figure 4:
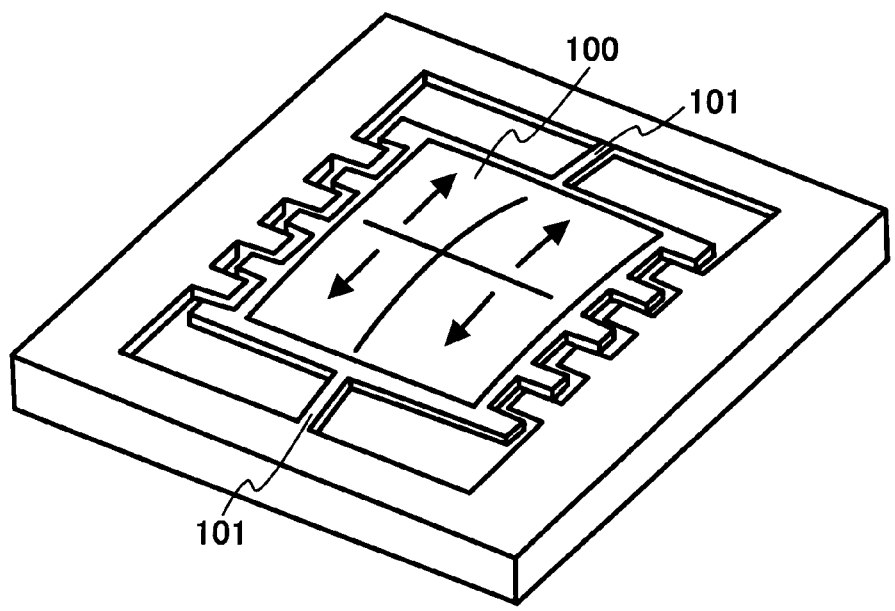

While the curvature of the mirror 100 reduces the deformation of the mirror 100 ascribable to rotation, as stated above, the spherical configuration is not essential with the illustrative embodiment. For example, as shown in FIG. 4, the mirror 100 may be curved only in the section containing the torsion bars 101 (subscanning direction).

When a voltage is applied to each of the stationary electrodes 121, electrostatic attraction acts between the stationary electrode 121 and the movable electrode 104 adjoining it and causes the mirror 100 to return to the horizontal position while twisting the torsion bars 101. When the above voltage is interrupted, the torsion bars 101 are restored to return the mirror 100 to the tilted position. When the voltage applied to the stationary electrodes 121 are periodically switched, i.e., when an AC voltage is applied to the electrodes 121, the mirror 100 reciprocatingly vibrates. The frequency of the vibration is brought close to the specific oscillation frequency of the mirror 100 to set up resonance for thereby amplifying amplitude.

In the illustrative embodiment, the specific oscillation frequency of the mirror 100, i.e., the thickness of the mirror 100 that gives a sectional secondary moment I and the width and length of the torsion bars 101 are selected in matching relation to recording speed. Generally, the swing angle θ0 of the mirror 100 is expressed as:

$$\theta 0 = T/K \qquad \text{Eq. (5)}$$

$$(K = G \cdot I/L)$$

where K denotes a spring constant determined by the modulus of elasticity G, sectional secondary moment I and length L of the torsion bars 101 supporting the mirror 100, and T denotes a torque given by electrostatic attraction.

Also, the resonance frequency fd of the mirror 100 is produced by:

$$fd = (K/J)^{1/2} \qquad \text{Eq. (6)}$$

where J denotes a moment of inertia.

As the Eqs. (5) and (6) indicate, to reduce required electrostatic attraction, there should be reduced the moment of inertia. This can be effectively done by reducing the thickness of the mirror 100.

Figure 6:
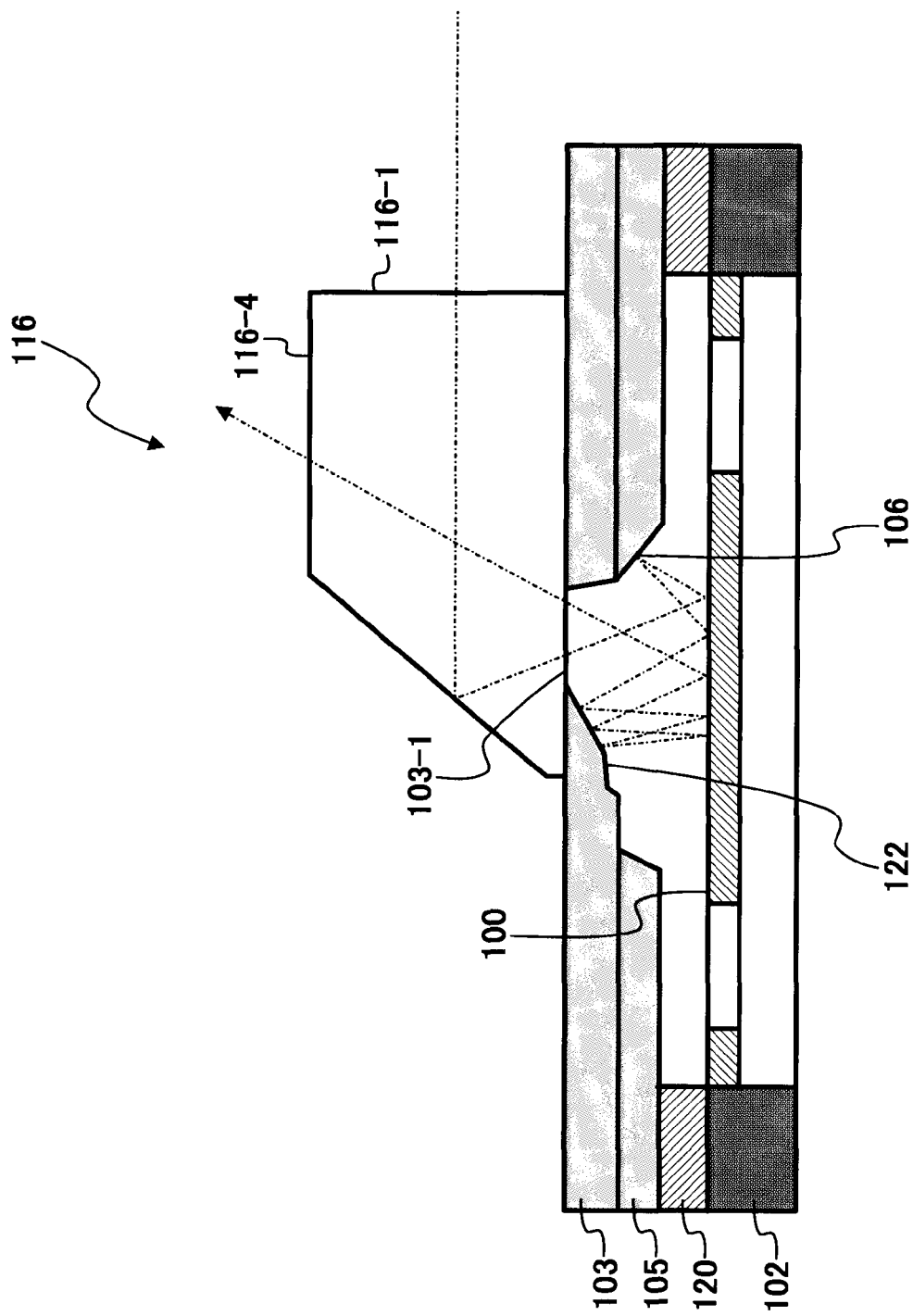
FIG. 6 is a section of the illustrative embodiment.

As shown in FIG. 1, a facing mirror base is positioned above the mirror 100 and implemented as a laminate of two silicon substrates 105 and 103. For the first substrate 105, use is made of a wafer having a slice angle of about 9° from the crystal face orientation of <110> and etched to form an inclined surface inclined by 26.3° from the substrate surface. A metal film is deposited on such an inclined surface to form a reflection surface 106. The second substrate 103 is identical with the first substrate 105 except that a slice angle is about 9° from the crystal face orientation of <111>, and that an inclined surface is inclined by 9° to form a reflection surface 122. As shown in FIG. 6, an opening 103-1 extends throughout the second substrate 103 and is contiguous with the reflection surface 122, so that a light beam can pass therethrough. The reflection surfaces 106 and 122 are positioned at opposite sides of the opening 103-1 like a roof and inclined by 144.7° relative to each other.

A prism 116 includes a reflection surface 116-1 for reflecting the incident light beam toward an input surface 162-1, an output surface 116-4 and the mirror 100 and a surface 116-3 adhered to the top of the second substrate 103 in such a manner as to cover the space in which the mirror 100 vibrates. An aperture mask is formed on the input surface 116-2 for shaping the light beam output from the coupling lens 110 to a preselected diameter.

As shown in FIG. 6, the light beam incident to the mirror 100 via the opening 103-1 at a preselected angle, e.g., 20° is reflected by the reflection surface 106, again reflected by the mirror 100 and then repeatedly reflected between the mirror 100 and the reflection surface 122. Subsequently, the light beam is incident to the prism 116 via the opening 103-1. Such repeated reflection is successful to implement a large scanning angle with the small swing angle of the mirror 100. For example, assuming that the mirror 100 reflects the light beam N times, e.g., five times in total and that the swing angle is $\alpha$, then the scanning angle $\theta$ is $2N\alpha$.

A support frame 107 is formed of, e.g., sintered metal and has lead terminals 115 inserted therein via an insulator. The support frame 107 includes a surface 107-1 for adhering the mirror base 102, a V-shaped groove 107-2 for positioning the coupling lens 110, a surface 107 perpendicular to the surface 107-1 for mounting the semiconductor laser 108, and a surface 107-4 for mounting a monitor PD (Photo Diode) chip 109. Light output from the rear end of the semiconductor laser 108 is incident to the monitor PD chip 109.

The coupling lens 110, which is a cylinder cut at its top and bottom as seen in FIG. 1, has a nonspherical first surface symmetrical with respect to the axis, and a cylindrical second surface curved in the subscanning direction. The V-shaped groove 107-2 is provided with a width and an angle that cause the optical axis to coincide with the emission point of the laser 108 when the cylindrical surface of the coupling lens 110 contacts. The position of the coupling lens 110 is adjusted relative to the laser 108 in the direction of optical axis in such a manner as to cancel the curvature of the mirror 100.

In the illustrative embodiment, the light beam on the mirror 100 is a diverging light beam because the mirror 100 is concave. Therefore, adjustment is made in the direction of optical axis such that the light beam output from the output surface 116-4 of the prism 116 becomes a parallel beam in the direction of optical axis. If the mirror 100 is concave, then the light beam is a converging light beam on the mirror 100. The cut surfaces of the coupling lens 110 are parallel to the axis of the cylinder while the axis is so positioned as to be horizontal. The laser 108 emits the laser beam modulated in accordance with image data.

A cover 111 is implemented as a cap-like sheet metal and has an opening for outputting the light beam. A glass sheet 112 is adhered to the inner surface of the cover 111 around the above opening. The cover 111 is fitted in a step 107-6 formed in the periphery of the support frame 107, protecting the laser 108 and mirror base 102 in a hermetic condition. The laser 108, monitor PD chip 109 and stationary electrodes 121 are connected to the tips of the lead terminals 115 protruding above the support frame 107 by wire bonding.

Figure 7:
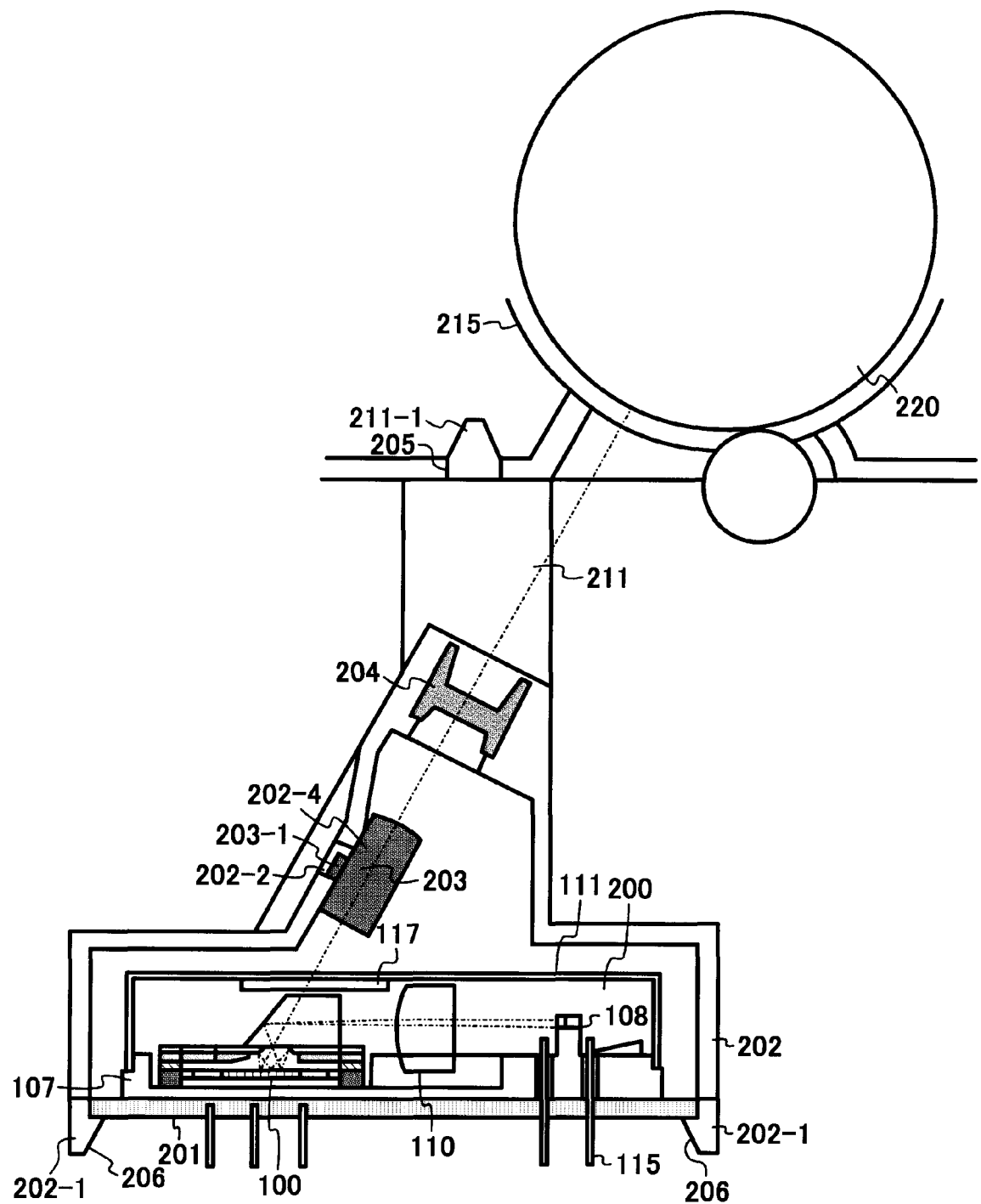
FIG. 7 is a section showing a first embodiment of the optical scanning device in accordance with the present invention.
Figure 8A:
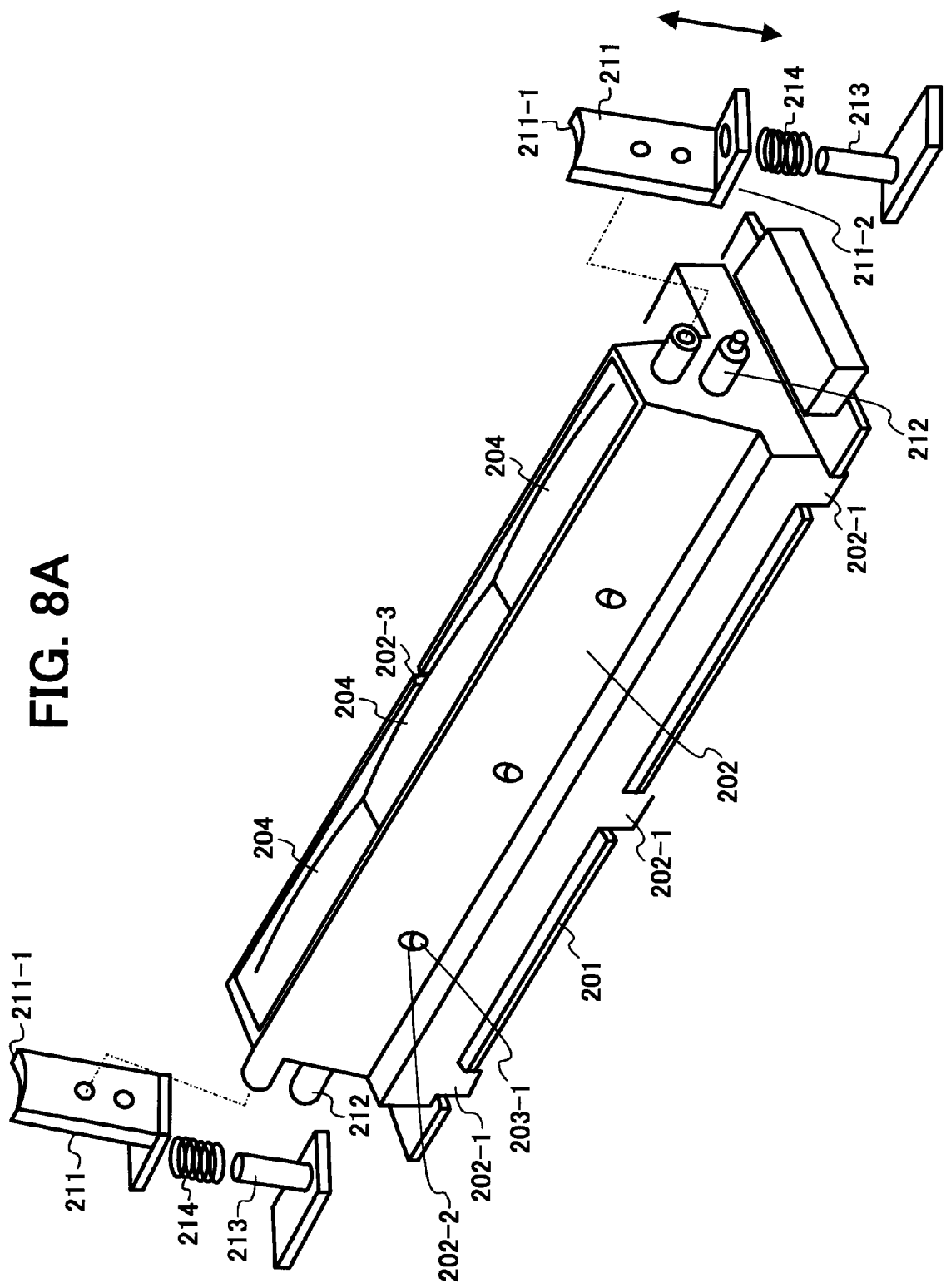
FIG. 8A is an external view of the scanning device shown in FIG. 7.

Reference will be made to FIGS. 7, 8A and 8B for describing a first embodiment of the optical scanning device in accordance with the present invention. As shown, a plurality of (three in the illustrative embodiment) optical scanning modules 200 each having the configuration described above are arranged on a printed circuit board 201 in an array in the main scanning direction. Electronic parts constituting a laser driver a mirror driver are also mounted on the circuit board 201. The lead terminals 115 of each support frame 107 are inserted in through holes formed in the circuit board 201. The modules 200 are positioned relative to each other by using the clearances of the through holes, temporarily fixed in place, and then soldered together with the other electronic parts.

The circuit board 201 with the modules 200 is attached to the bottom opening of a casing 202 and retained by pairs of snap nails 202-1 protruding from the casing 202. More specifically, the circuit board 201 is formed with notches configured to mate with the snap nails and positioned in the main scanning direction thereby. Further, hook-like locking portions 206 included in the snap nails 202-1 are engaged with the edges of the circuit board 201 to thereby position the circuit board 201 in the subscanning direction. The locking portions 206 are deformable to unlock the circuit board 201, so that the circuit board 201 can be easily removed from the casing 202 by being pressed down by lugs 205.

The casing 202 includes a positioning surface to which first scanning lenses or converging means 203 are adhered in an array in the main scanning direction. Further, the casing 202 includes a positioning portion for retaining second scanning lenses 204. In addition, the housing 202 includes a portion for holding synchronizing mirrors 208 (see FIG. 8B). In the illustrative embodiment, the second scanning lenses 204 are implemented as a single molding of resin while the synchronizing mirrors 208 are interconnected by a high-luminance aluminum sheet. The second scanning lenses 204 and synchronizing mirrors 208 are fitted in a beam outlet opening from the outside. Lugs 202-3 protrude from the center portion of the opening and mate with recesses 204-1 of the lenses 204 and recesses 208-1 formed in the mirrors 208, thereby positioning the lenses 204 and mirrors 208 in the main scanning direction. The lenses 204 and mirrors 208 are positioned in the subscanning direction by being pressed against one end of the opening.

Further, a lug 203-1 protrudes from each first scanning lens 203 at the center in the main scanning direction and mates with one of holes 202-2 formed in the casing 202 at equal intervals, so that the lenses 203 are positioned relative to each other in the main scanning direction. The lenses 203 are abutted against one end of the casing 202 in the direction of optical axis and then adhered at bottoms thereof in the subscanning direction to surfaces lying in the same plane.

Synchronization sensors 209 are implemented by PIN photodiodes and arranged between nearby modules 200 and at opposite ends. The synchronization sensors 209 are mounted on the circuit board 201 in such a manner as to sense light beams at both of the sides where the modules 200 start scanning and the sides where they end scanning. The synchronizing mirrors 208 each are bent such that its reflection surfaces located at the scanning start side and scanning end side of nearby modules 200, thereby reflecting incident light beams toward the shared synchronization sensor 209 between nearby modules 200.

A connector 210 feeds power to all of the modules 200 while implementing the interchange of data signals. A photoconductive drum 220 is supported by a cartridge that will be described specifically later. A pair of positioning members 211 are mounted on opposite sides of the casing 202, and each includes a surface to abut against a cylindrical surface 215 concentric with the drum 220. More specifically, each positioning member 211 is fastened to lugs 212 by screws. At the same time, a generally L-shaped seat portion included in the positioning member 211 is attached to a pin 213 protruding from the frame of the apparatus body via a spring 214. The positioning members 211 are therefore constantly pressed against the cartridge for thereby surely positioning all of the modules 200 relative to the drum 220.

Figure 9:
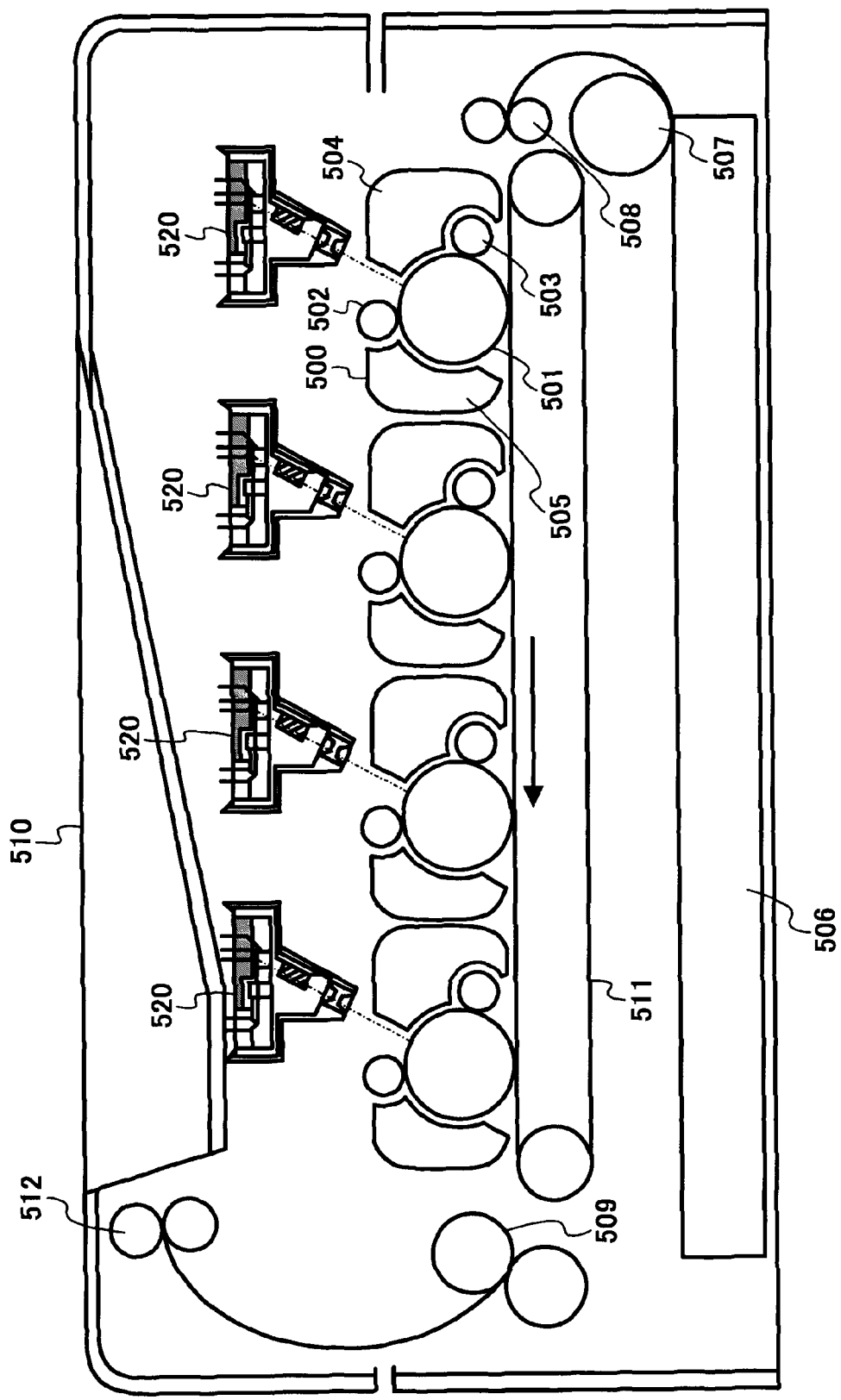
FIG. 9 shows a specific configuration of a color laser printer to which the optical scanning device is applied.

FIG. 9 shows a specific configuration of a color laser printer including the optical scanning device described above. As shown, one optical scanning device 520 and one process cartridge 500 are assigned to each of yellow, magenta, cyan and black. The optical scanning devices 520 and process cartridges 500 are serially arranged in the direction of sheet conveyance. A pickup roller 507 feeds a sheet or recording medium from a tray 506 toward a registration roller pair 508. The registration roller pair 508 stops the sheet and then conveys it in synchronism with the printing timing. Subsequently, a belt 511 conveys the sheet in a direction indicated by an arrow in FIG. 9. Toner images formed on photoconductive drums or image carriers 501 in different colors are sequentially transferred from the drums 501 to the sheet one above the other, completing a color image. A heat roller 509 fixes the color image on the sheet. An outlet roller 512 drives the sheet with the fixed color image, i.e., a print out of the apparatus body to a print tray 510. The process cartridges 500 are identical in configuration except for the color of toner.

Arranged around each drum 501 are a charge roller 502, a developing roller 503, a hopper 504 storing toner, and a cleaning case 505. The charge roller 502 uniformly charges the surface of the drum 501. The developing roller 503 develops a latent image formed on the drum 501 by the scanning device 520 with toner to thereby produce a corresponding toner image. The cleaning case 505 is configured to scrape off the toner left on the drum 501 after image transfer.

In each optical scanning device 520, the scanning lines of a plurality of modules 200 are connected to constitute a single line made up of L dots in total. The L dots are divided into dots 1 through L1, dots L1+1 through L2 and dots L2+1 through L from the head to the tail of an image. In the illustrative embodiment, a particular number of dots L1 and a particular number of dots L2 are assigned to each color, so that the seams of the scanning lines of different colors constituting the same scanning line do not overlap each other.

While the illustrative embodiment includes three modules 200, the number of modules may be increased or decreased in accordance with the recording width of the apparatus, as desired.

Figure 10:
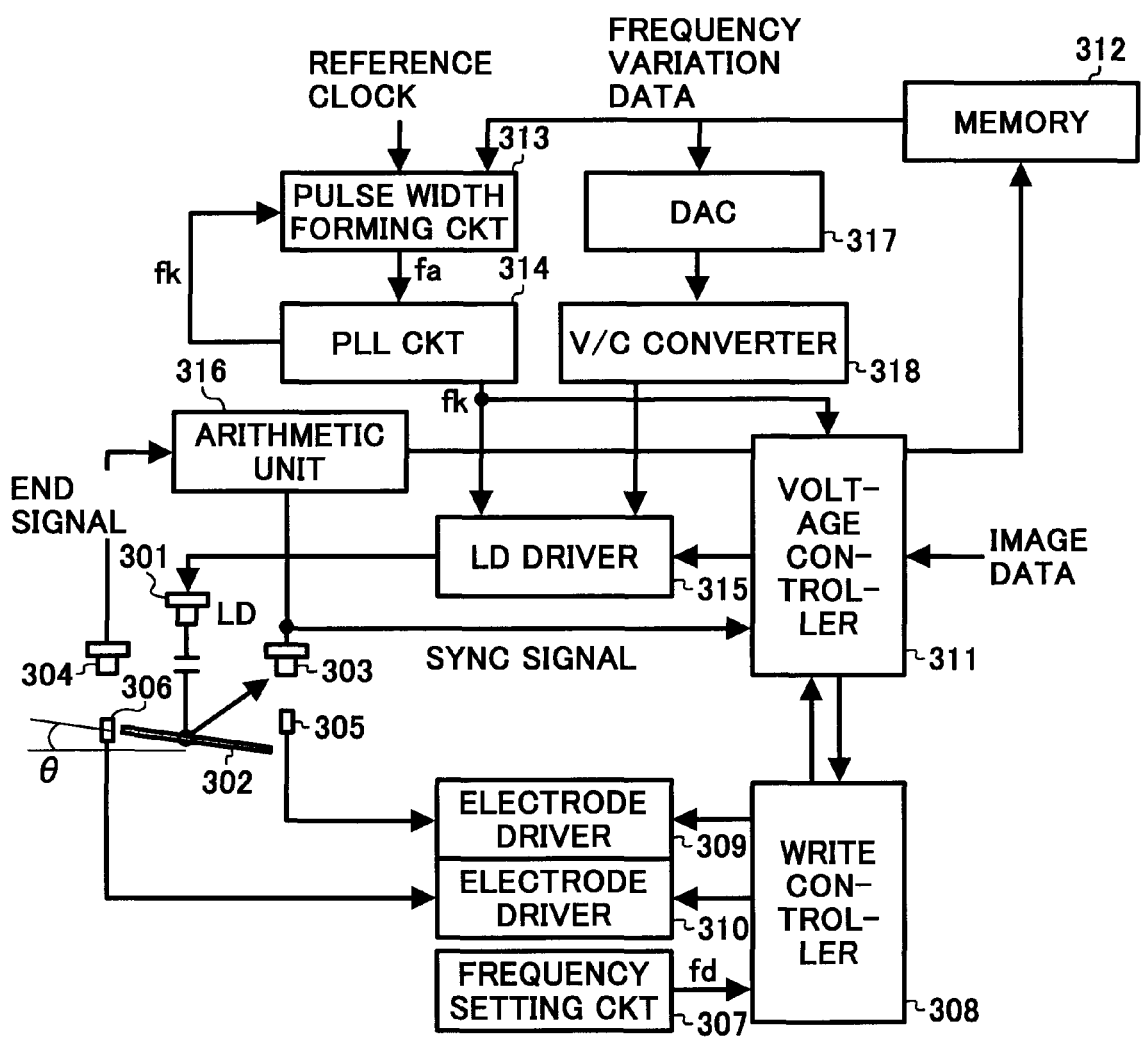
FIG. 10 is a block diagram schematically showing a laser drive circuit and a mirror drive circuit.

Referring to FIG. 10, specific circuitry for controlling the drive of the semiconductor laser and mirror will be described. The semiconductor laser is represented by a laser diode (LD). As shown, a frequency setting circuit 307 varies the previously mentioned scanning frequency fd in accordance with the resonance frequency of the mirror 302. A voltage controller 308 applies, via electrode drivers 209 and 310, pulse voltages shifted in phase by half a period from each other to the stationary electrodes 305 and 306, thereby causing a movable mirror 302 to resonate.

In the illustrative embodiment, when the mirror 302 moves forward from the scanning angle θ0 to an angle −θ0, image is recorded over an interval between θs and −θs (θ0<θ<θ0). Subsequently, when the mirror 302 moves backward from −θ0 to +θ0, image recording is interrupted. Stated another way, an image is recorded every period of the scanning frequency fd. In the illustrative embodiment, θ0 is selected to be 5° while θs/θ0 is selected to be 0.7. An LD 301 starts emitting a laser beam when the voltage to the stationary electrode 305 is interrupted. The synchronization sensor 303 outputs a synchronization signal on sensing the light beam. The synchronization signal is used to determine a recording start timing. While the apparatus is in a stand-by state, the voltages to the stationary electrodes 305 and 306 are lowered or interrupted in order to save power, thereby reducing the amplitude (swing angle) of the mirror 302. In this condition, the synchronization sensor 303 does not output the synchronization signal.

At the time of power-up or the start of recording, the voltages applied from the voltage controller 308 to the stationary electrodes 305 and 306 and therefore electrostatic attraction is increased little by little until the synchronization sensor 303 outputs the synchronization signal, thereby increasing the amplitude of the mirror 302 little by little. As soon as the synchronization signal reaches a preselected level, the voltage values for the stationary electrodes 305 and 306 are set.

While synchronization is sensed when the swing angle is around θ0, the illustrative embodiment additionally includes an end sensor 304 located at a position where the swing angle is around −θ0. The end sensor 304 senses the light beam at the end of scanning and outputs an end signal. An arithmetic unit 316 produces a difference between the end signal and the synchronization signal output from the synchronization sensor 303, i.e., a scanning time. The voltage controller 311 raises or lowers the voltage for the stationary electrode 305 such that the scanning time coincides with a preselected value, thereby correcting the variation of the amplitude ascribable to the shift of the resonance frequency, which may be brought about by temperature variation. It is to be noted that the end sensor 304 is not essential with the illustrative embodiment; of course, an extra optical sensor may be used.

After the setting described above, a write controller 311 executes sequence control so as to allow the LD 301 to be turned on in a recording region. Further, assume that neither the synchronization sensor 303 nor the end sensor 304 outputs a signal or the scanning time does not reach preselected one even when the voltage applied exceeds a preselected limit. Then, the write controller 311 outputs an error signal and interrupts the application of voltages to the stationary electrodes 305 and 306, thereby preventing the light beam from being radiated to the outside of the scanning device 520 more than necessary. Because the illustrative embodiment includes three modules 200, it does not start printing an image until all of the modules 200 satisfy the above conditions.

Figure 11:
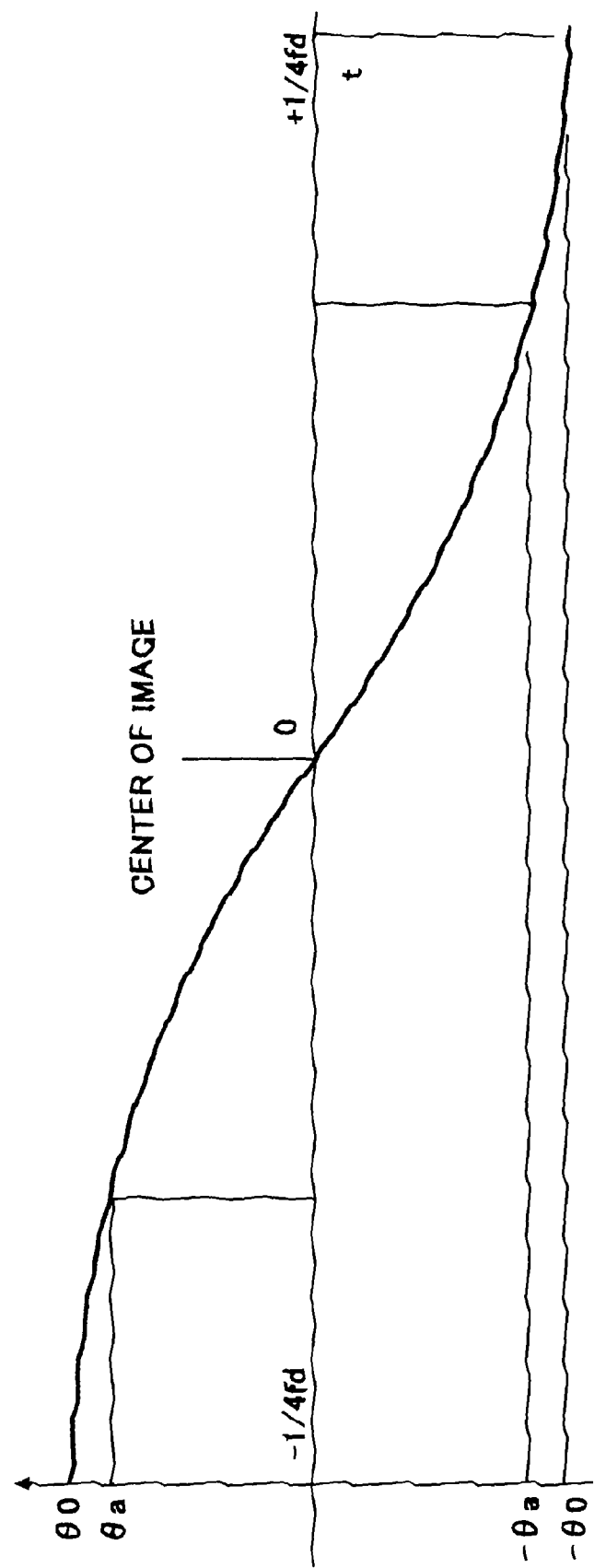
FIG. 11 is chart showing how the swing angle of the movable mirror varies.

The mirror 302 resonates and therefore has the swing angle θ varying in a sinusoidal waveform, as shown in FIG. 11. More specifically, the scanning speed is high at the center of an image, but low at the peripheral portion of the image. This is represented by:

$$\theta = \theta 0 \cdot \sin 2\pi fd \cdot t - 1/4fd < t < 1/4fd \qquad \text{Eq. (7)}$$

where fd denotes the scanning frequency.

On the other hand, dots must be formed on the drum, which is the surface to be scanned, at equal intervals in the main scanning direction. Further, as for the converging characteristics of the scanning lenses 203 and 204, the orientation of the light beam must be corrected such that a scanning distance dH/dθ for a unit scanning angle is proportional to $\sin^{-1}\theta/\theta 0$, i.e., small at the center of an image and increases toward the periphery of the image with increasing speed. Moreover, when the swing angle of the mirror 302 increases, an ideal sinusoidal vibration is not achievable; the amplitude is more effected by air resistance as the distance to the drum decreases.

However, as the ratio of the effective swing angle θa to the maximum swing angle θ0 increases, it is necessary to noticeably increase the amount of correction against a decrease in scanning speed dH/dt that occurs at the peripheral portion of an image. This, in turn, requires the refracting force of the lens to vary in a high ratio in order to increase the distance to the focus from the center toward the periphery of the lens. As a result, the lens needs a curvature with a noticeable thickness distribution, which is difficult to implement even in the case of resin molding featuring a relatively high degree of freedom. In addition, the beam spot diameter increases at the peripheral portion, aggravating irregularity within single scanning.

In light of the above, the illustrative embodiment reduces the amount of correction at the lenses 203 and 204 to an adequate degree. At the same time, the illustrative embodiment varies the frequency of a pixel clock, which modulates the LD 301, stepwise in the main scanning direction, thereby varying the print position (phase) of the individual dot and pulse width. Assuming that the amount of correction dH/dθ effected by the lenses 203 and 204 is proportional to θ, then such a correction scheme allows the lenses 203 and 204 to be implemented as f·θ lenses. It follows that the amount of correction can be freely distributed to the lenses and pixel clock.

Referring again to FIG. 10, a memory 312 stores frequency variation data beforehand. The write controller 311 sequentially reads the data out of the memory 312 by using the synchronization signal as a trigger to thereby vary the frequency of the pixel clock such that the frequency monotonously increases from low frequency f1 to high frequency fh from the periphery toward the center of an image and decreases to the low frequency f1 from the center toward the periphery.

Figure 12:
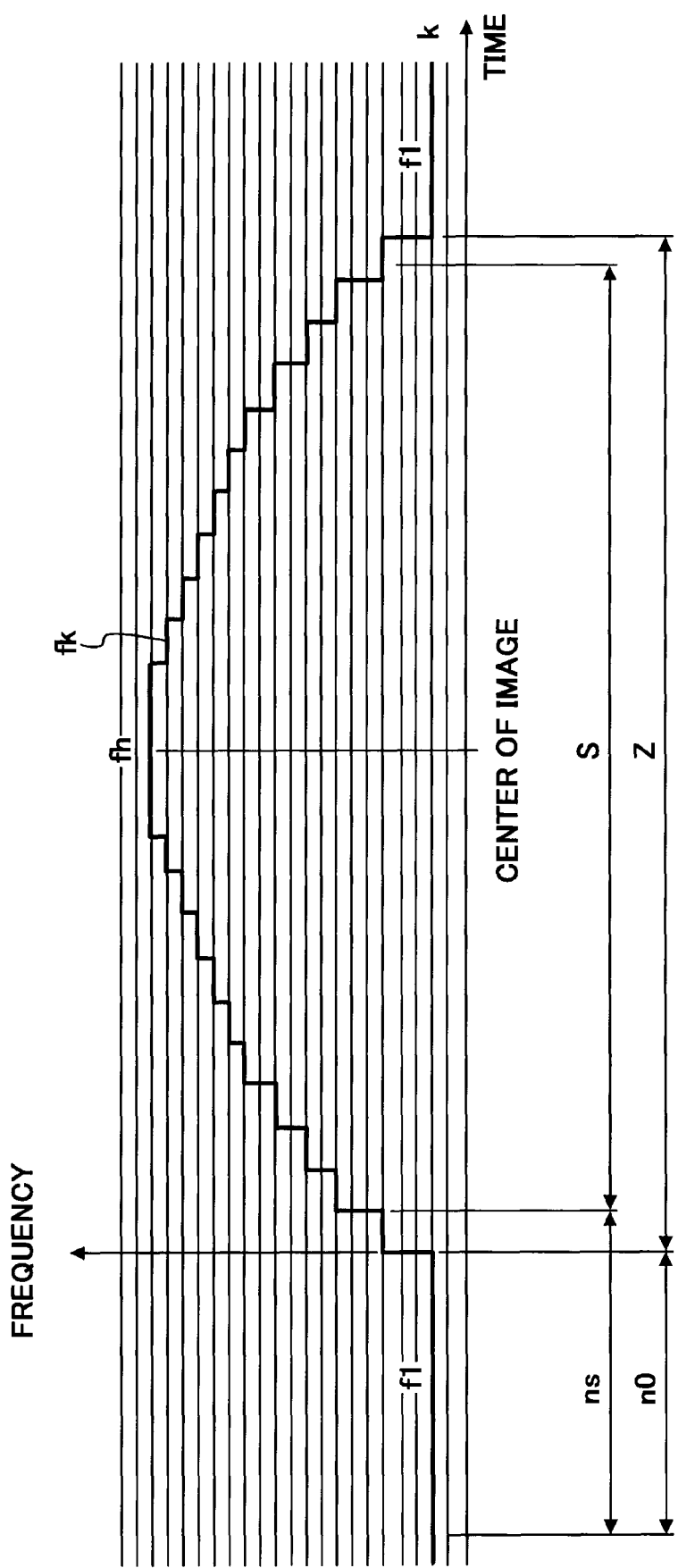
FIG. 12 is a chart showing how the frequency of a pixel clock varies.

As shown in FIG. 11, as for scanning using the mirror 302, the scanning speed is high at the center of an image, but low in the periphery of the image. FIG. 12 shows control over the frequency of the pixel clock unique to the illustrative embodiment. As shown, the pixel clock has a high frequency fh (small pulse width) at the center of an image or a low frequency f1 (large pulse width) at the periphery, so that the scanning speed is substantially the same throughout the entire range between the center and the periphery.

How the illustrative embodiment varies the pixel clock frequency will be described hereinafter with reference to FIG. 10. A reference clock signal f0 is divided by M on the basis of a division ratio M given as the frequency variation data. A pulse width forming circuit 313 counts the resulting frequency-divided clock pulses having a frequency of f0/M to thereby form a pulse whose length corresponds to k (desired integer) clock pulses. By repeating this, the pulse width forming circuit 313 outputs a PLL (Phase Locked Loop) reference signal fa (frequency of k·f0/M) having a period that varies stepwise in the main scanning direction.

A PLL circuit 314 compares the phase of the PLL reference signal fa and that of the pixel clock fk. If the two phases are different, then the PLL circuit 314 varies the frequency of the pixel clock fk and feeds the resulting pixel clock to the write controller 311 and pulse forming circuit 313 as well as to an LD driver 315. On receiving the synchronization signal from the synchronization sensor 303, the write controller 311 starts counting the PLL reference signal fa having the low frequency f1 while generating addresses corresponding to the counts, thereby reading the frequency variation data out of the memory 312. Consequently, the data read out of the memory 312 changes from a count n0, as shown in FIG. 12. At a count ns, the write controller 311 serially reads out image data in synchronism with the pixel clock while feeding them to the LD driver 315.

The period of the pixel clock fk is produced by:

k·(reference clock f0/division ratio M).

As shown in FIG. 12, a range Z over which the pixel clock is varied is slightly broader than an image recording ranges by about 100 pixels at opposite ends. Accordingly, the low frequency f1 is selected to be lower than the pixel clock frequency fk at opposite ends of the image recording range S, so that the image recording range S can be shifted by varying the count ns from synchronization sensing up to the start of image recording.

Further, by adding a correction number to the division ratios M, it is possible to shift the low frequency f1 and high frequency fh while maintaining the frequency width (fh-f1) from the frequency f1 to the frequency fh. It follows that the variation of the image recording width ascribable to irregularity in the resonance frequency of the mirror 302 and the curvature of the mirror 100, FIG. 2, can be corrected without any local distortion if the frequency (1/fk) of the individual pixel is uniformly varied. At this instant, assuming that the cumulative time of the individual pixel, i.e., the count of the clock at the individual pixel is k, then T=Σ(k/fk) also varies. However, by varying a count n0 from synchronization sensing up to the start of pixel clock variation, it is possible to cause the time when the mirror 302 becomes parallel to the mirror base 102 to coincide with the frequency variation data at the center of an image at all times.

Now, energy E for exposing the drum is represented by beam intensity P=P/fk. In light of this, the frequency variation data that cause the frequency of the pixel clock to vary are routed through a DAC (Digital-to-Analog Converter 317, a (V/C (Voltage-to-Current) converter 318 to the LD driver 315 so as to vary a drive current assigned to the LD 301. As a result, the beam intensity is also varied stepwise in the main scanning direction. In the illustrative embodiment, the beam intensity is high at the center of an image and lowered toward the periphery of the image.

The control over the drive of the LD 301 and mirror 302 described above is effected module by module. As for the drive of the mirror 302, the mirrors 302 of nearby modules 200 are driven in phases shifted from each other by half a period of the scanning frequency fd, so that the downstream module starts recording on the elapse of half a period since the start of recording by the upstream module. This causes the downstream module to start recording as soon as the upstream module ends recording.

Figure 13:
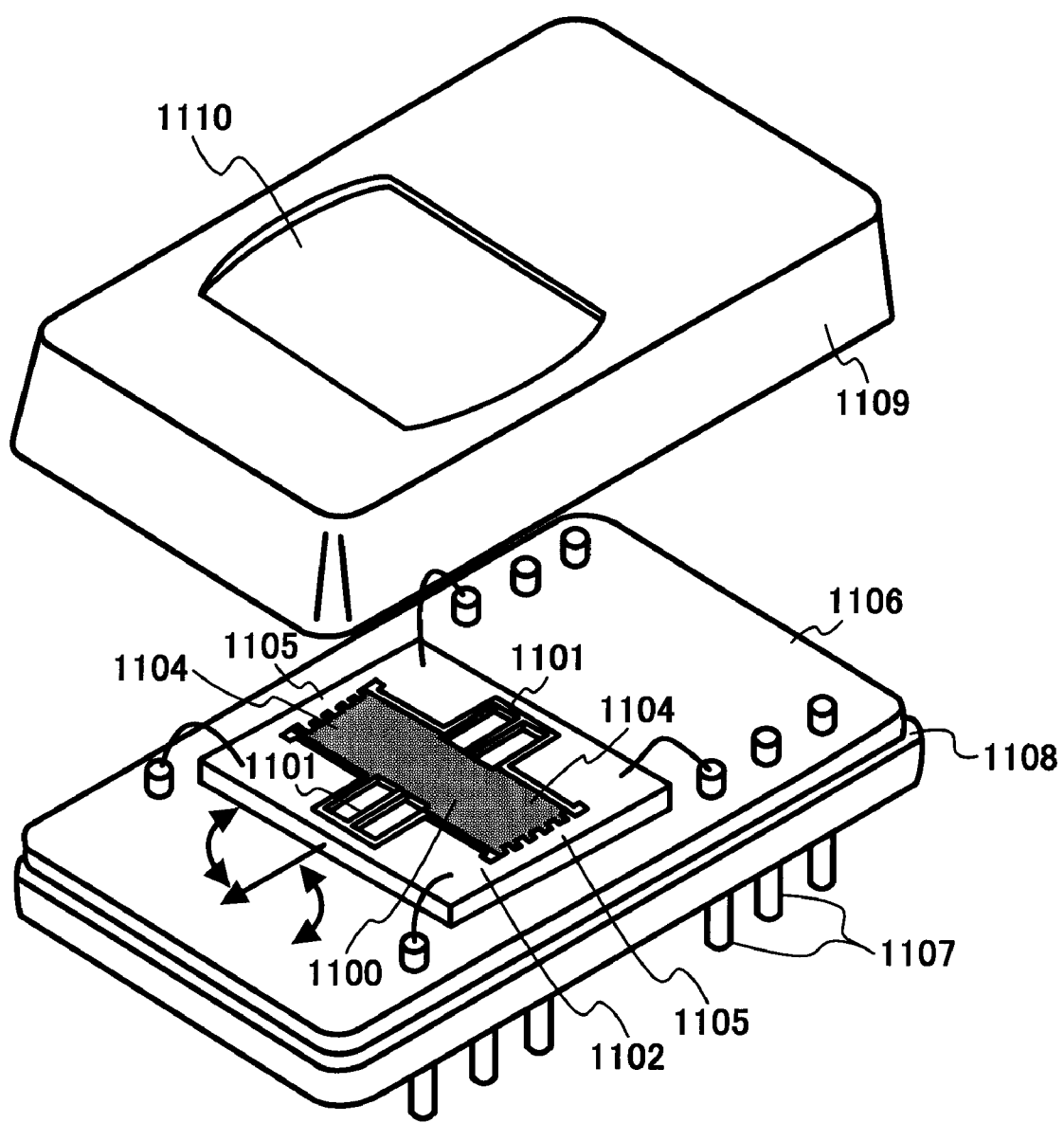
FIG. 13 is an exploded isometric view showing a second embodiment of the optical scanning module in accordance with the present invention.

FIG. 13 shows a second embodiment of the optical scanning module in accordance with the present invention. As shown, the scanning module includes a mirror base 1102 implemented by a silicon substrate. The bottom or reverse surface of the silicon substrate is etched to form a square cavity delimited by a frame portion and a flat portion having preselected thickness. Portions around the flat portion are etched through to form a movable mirror 1100 and a pair of torsion bars 1101 supporting the mirror 1100. The mirror 1100, like the mirror 100, is bent in the form of a dome. In the illustrative embodiment, a 200 μm thick silicon substrate is etched to form the mirror 1100 and torsion bars 1101, i.e., the flat portion that is 60 μm thick. The mirror 1100 is sized 4 mm×2 mm and covered with a gold, aluminum or similar metal film for reflection. The edges of the mirror 1100 positioned at both sides of the torsion bars 1101 are notched in the form of comb teeth and covered with metal films, constituting movable electrodes 1104. The inner edges of the frame portion facing the movable electrodes 1104 are also notched in the form of comb teeth to constitute stationary electrodes 1105. The movable electrodes 1104 and stationary electrodes 1105 are engaged with each other with a clearance of about 5 µm in an alternating fashion. When the mirror 1100 is in a horizontal position, the movable electrodes 1104 face the stationary electrodes 1105 at the same level in the direction of thickness of the mirror base 1100.

The torsion bars 1101 are so dimensioned as to resonate in a vibration mode in which the bars 1101 constitute the axis of rotation in accordance with the scanning frequency of the mirror 1100. In the illustrative embodiment, the torsion bars 1101 are about 100 µm wide and about 1 mm long each. The top or front surface of the silicon substrate 1102 is implemented by the polished surface of a wafer and formed with, e.g., a nitride film for insulation. Therefore, the mirror 1100 is slightly inclined due to a difference in internal stress between the top and the bottom, so that a step of several micrometers is formed between the movable electrodes 1104 and stationary electrodes 1105.

When a voltage is applied to either one of the stationary electrodes 1105, the resulting electrostatic force causes the mirror 1100 to rotate to the horizontal position while twisting the torsion bars 1101. Therefore, when an AC voltage is applied, the mirror 1100 reciprocatingly vibrates. Although the amplitude of vibration is small, when an AC voltage implementing frequency corresponding to the mechanical resonance frequency of the mirror 1100 is applied, the mirror 1100 is excited to increase its amplitude. In the illustrative embodiment, the mirror 1100 is caused to perform sinusoidal vibration by ±5°. The comb-shaped electrodes each achieve a large length and therefore a large area, so that the electrostatic torque is increased for a low voltage. A base 1106 is implemented by sintered metal and has lead terminals 1107 inserted therein via an insulator. The mirror base 1102 is adhered to the base 1106. The stationary electrodes of the mirror base 1102 are connected to the tips of lead terminals 1107 protruding above the base 1106 by wire bonding. When the above module is mounted to a printed circuit board, not shown, the lower ends of the lead terminals are inserted into through holes formed in the circuit board and then soldered to circuitry not shown. A metallic cover 1109 is fitted on the step 1108 of the base 1106 and sealed in an inactive gas. A window glass 1110 is fitted on the cover 1109 and allows a light beam to pass therethrough.

Figure 14:
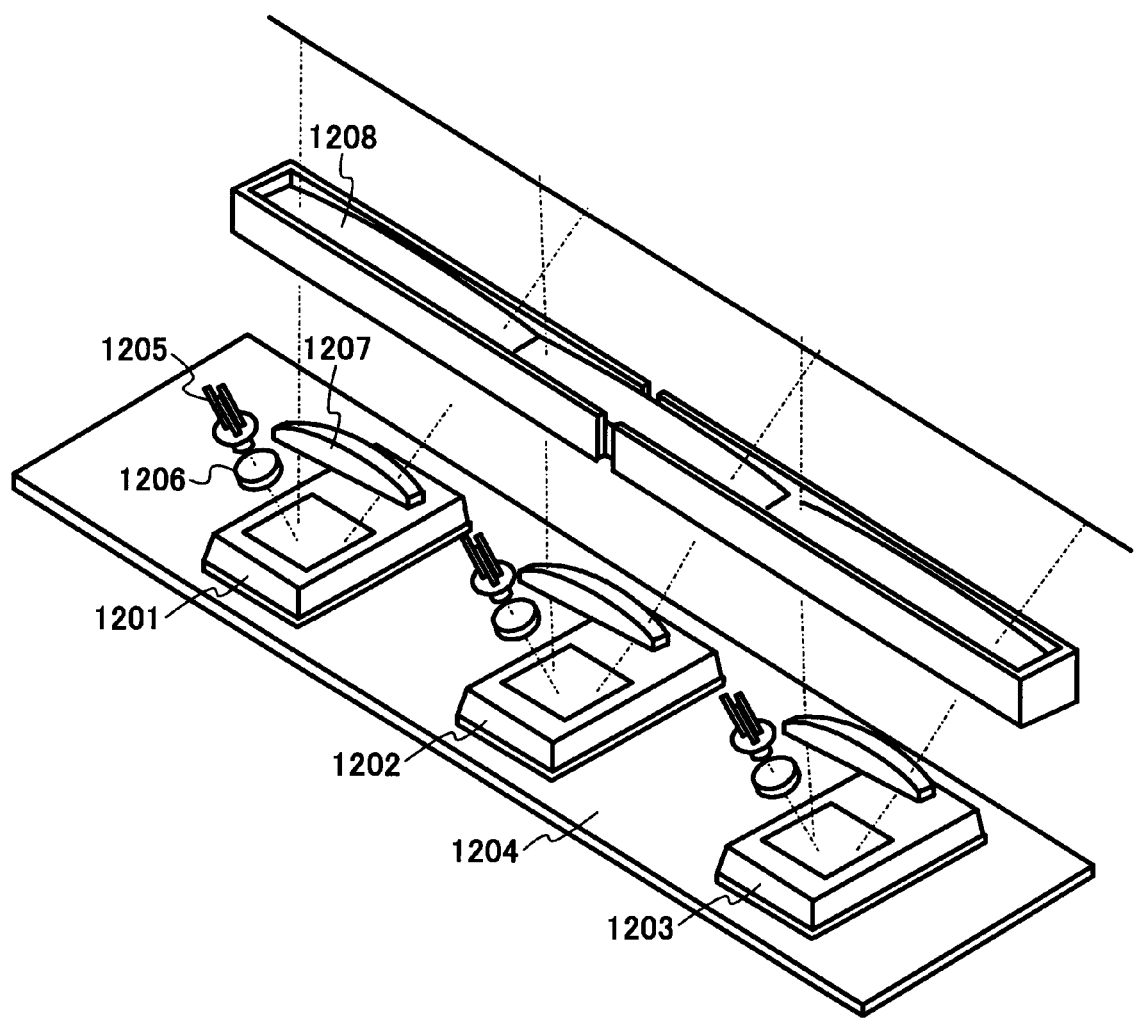
FIG. 14 is a perspective view of an optical scanning device to which the module of FIG. 13 is applied.

FIG. 14 shows a second embodiment of the optical scanning device in accordance with the present invention that includes optical modules each having the configuration shown in FIG. 13. As shown, mirror deflectors 1201, 1202 and 1203 are mounted on a printed circuit board 1204 with their scanning directions matched to each other. The mirror deflectors 1201 through 1203 each constitute optical scanning means including a semiconductor laser 1205, a coupling lens 1206, a first scanning lens 1207, and a second scanning lens 1208. In the illustrative embodiment, the second scanning lenses 1208 are connected together.

A laser beam issuing from the laser 1205 is converted to a parallel beam by the coupling lens 1206 and then incident to the mirror deflector via the window glass 1110 by being inclined by about 10° in the subscanning direction from the direction normal to the mirror 1100. The mirror 1100 deflects the incident laser beam toward the window glass 1110. The laser beam output from the window glass 1110 is focused on the drum, not shown, by the scanning lenses 1207 and 1208, scanning one of zones formed by dividing a single image in the subscanning direction.

Figure 15:
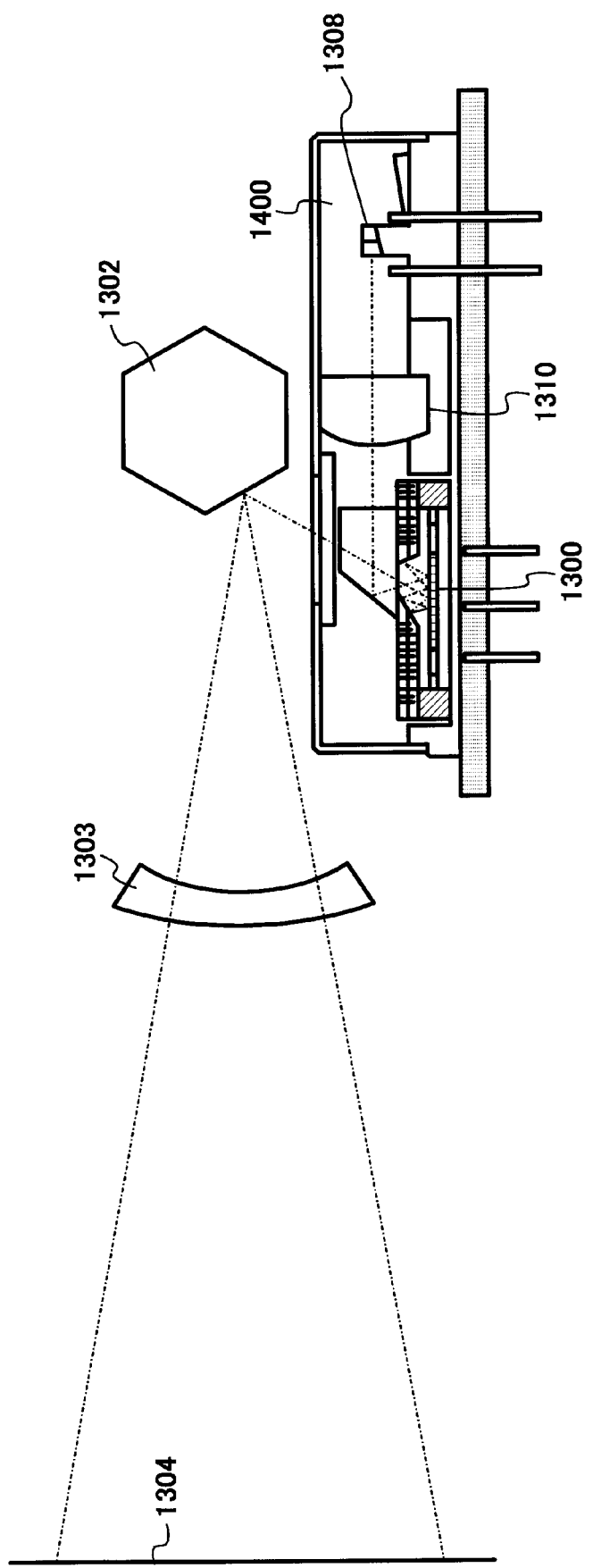
FIG. 15 is a section showing an embodiment of the image forming apparatus in accordance with the present invention.

FIG. 15 shows an embodiment of the image display in accordance with the present invention. As shown, the image display includes an optical scanning module 1400 similar to the module 200 of FIG. 7 except that it includes a light source 1308 capable of emitting a light beam in the wavelength band of three primary colors R (red), G (green) and B (blue). The light source 1308 may be implemented by, e.g., a GaInP (gallium-indium-phosphor) LED (Light Emitting Element) for red light, by a GaN (gallium-nitrogen) LED for green light or by a GaN LED for blue light. Alternatively, use may be made of an SHG light source implemented by a semiconductor laser and a nonlinear optical crystal, an organic EL (electroluminescence) device or a fluorescent display tube.

The light beam issuing from the light source 1308 is incident to a movable mirror 1300 via a coupling lens 1310 and a prism. The mirror 1300 deflects the incident light beam in the horizontal direction toward a polygonal mirror 1302 whose axis extends to the rear, as viewed in FIG. 15. A stepping motor, for example, causes the polygonal mirror 1302 to rotate so as to deflect the light beam in the vertical direction. In this configuration, every time the mirror 1300 performs scanning, the horizontal scanning position on a screen 1304 is sequentially shifted in the vertical direction, causing the light beam to bidimensionally scan the screen 1304.

A projection lens 1303 focuses the light beam on the screen 1304 in the form of a beam spot. One face of the polygonal mirror 1302 causes one frame to be displayed on the screen 1304. The mirror 1300 may be provided with scanning frequency of 15.7 kHz that is coincident with the horizontal scanning period of an NTSC (National Television System Committee) video signal. The polygonal mirror 1302 is rotated at a speed of 600 rpm.

The oxide film or the nitride film constitutes a stress generating film while the semiconductor laser constitutes a light source. The stationary electrodes 305 and 306, frequency setting circuit 307, voltage controller 308 and electrode drivers 309 and 310 constitute mirror driving means in combination. The developing roller 503 plays the role of developing means and image transferring means while the polygonal mirror 1302 serves as scanning means. Further, the screen 1304 and projection lens 1303 constitute a surface to be scanned and projecting means, respectively.

As stated above, the embodiments described with reference to FIGS. 1 through 15 achieve various unprecedented advantages, as enumerated below.

(1) A movable mirror is curved in the form of an arch in a section containing at least torsion bars. The mirror therefore deforms little during reciprocating vibration even if it is thin. Such a thin mirror can be caused to vibrate with a large amplitude by small power.

(2) No extra members for causing the mirror to bend are necessary because the mirror is bent by its own internal stress.

(3) A stress generating film formed on the top or the bottom of the mirror increases the curvature of the mirror while allowing the curvature to be controlled.

(4) A twisting moment is generated in the section of the torsion bars such that the mirror tilts in an unloaded condition, implementing initial displacement between movable electrodes and stationary electrodes. This allows the movable electrodes and stationary electrodes at opposite ends of the mirror to lie in the same plane and therefore implements the same distance during reciprocating vibration. Consequently, electrostatic attraction evenly acts on opposite ends of the mirror and can be effectively used.

(5) The curved mirror is easy to produce because a silicon substrate with internal stress remaining therein should only be etched from either one of the opposite surfaces and thinned thereby.

(6) Mirror driving means causes the mirror of a beam deflector to reciprocatingly vibrate by applying a torque to the mirror itself, so that the mirror reflects a light beam issuing from a light source. This realizes an energy-saving, optical scanning module.

(7) A plurality of optical scanning modules are arranged in the main scanning direction and implements an image recording width as great as the total dimension of the modules, so that images with various widths can be formed.

Figure 16A:
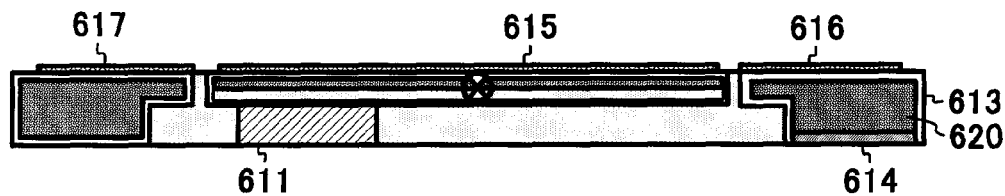
FIGS. 16A and 16B are respectively a section and a bottom view showing a third embodiment of the optical scanning device in accordance with the present invention.
Figure 16B:
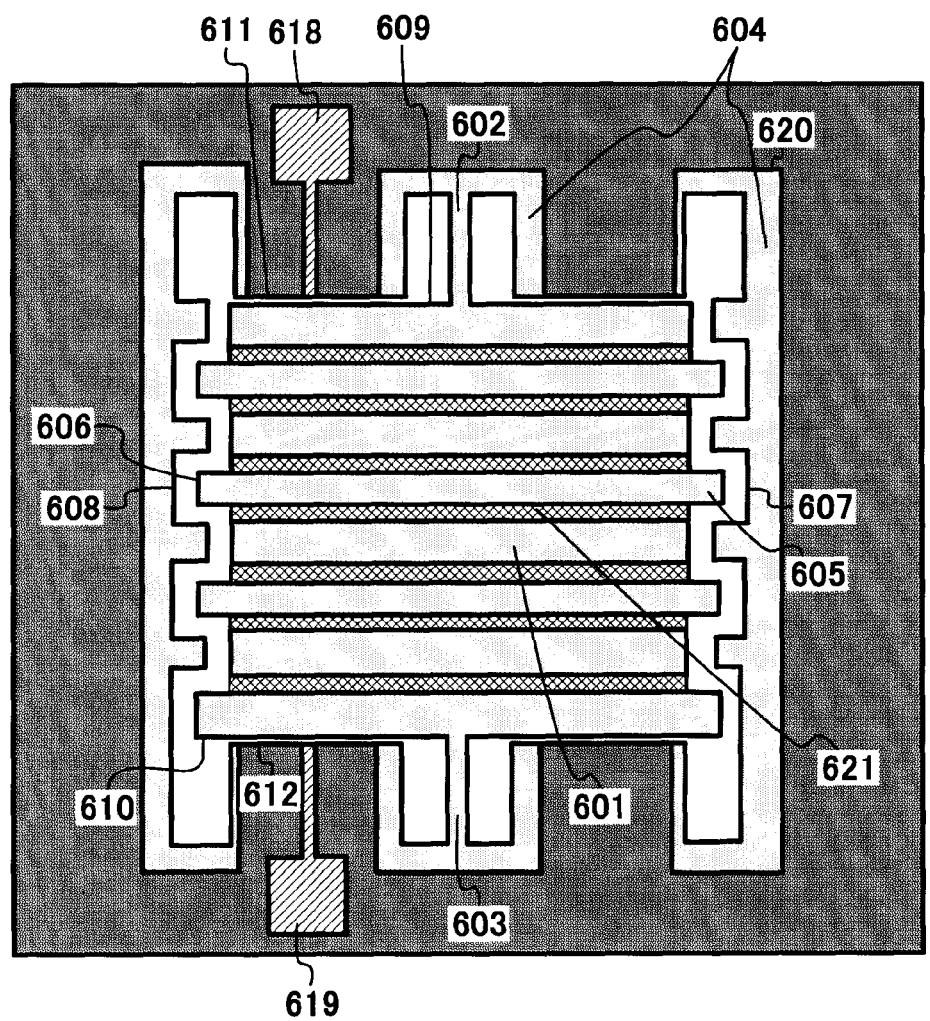

Referring to FIGS. 16A and 16B, a third embodiment of the optical scanning device in accordance with the present invention is shown. As shown, the optical scanning device includes a mirror base 601 supported by two torsion bars 602 and 603 aligning with each other at opposite edges thereof 609 and 610. A thin metal film 615 is formed on the top or front surface, as viewed in FIG. 16A, of the substantially square flat portion of the mirror base 601 and has sufficient reflectance to a light beam. A plurality of parallel ribs 621 for reinforcement are formed on the bottom or reverse surface of the flat portion perpendicularly to the torsion bars 602 and 603. The portions of the mirror base 601 where the ribs 612 are present are as thick as the torsion bars 602 and 603, i.e., the other portions are thinner than the torsion springs 602 and 603. The torsion bars 602 and 603 each are dimensioned to have torsional rigidity capable of implementing required resonance frequency and are affixed to an inner frame 604. The inner frame 604 is surrounded by and affixed to an outer frame 620 thicker than the inner frame 604.

The optical scanning device described above constitutes mirror driving means for causing the mirror base 601 to perform torsional vibration about an axis formed by the torsion bars 602 and 603. The mirror driving means is made up of stationary electrodes and movable electrodes for drive and stationary electrodes and movable electrodes for startup, as will be described more specifically hereinafter. The movable electrodes are implemented by the edge portions of the mirror base 101.

The edges 605 and 606 of the mirror base 601 not supported by the torsion bars 602 and 603 are configured in the form of comb teeth, constituting movable electrodes for drive. These movable electrodes 605 and 606 are respectively engaged with stationary electrodes 607 and 608, which are formed on the inner frame 604 and also configured in the form of comb teeth, in an alternating fashion. The edges 609 and 610 of the mirror base 601 supported by the torsion bars 602 and 603, respectively, linearly extend and constitute movable electrodes for startup. Stationary electrodes 611 and 612 for startup also linearly extend on the outer frame 620 at a position shifted from the above edges 609 and 610 in the direction of thickness of the mirror base 601. The movable electrodes 609 and 610 and stationary electrodes 611 and 612 face each other with a small clearance.

The inner frame 604 and outer frame 620 are formed integrally with each other by use of a conductor and have their tops or front surfaces covered with an insulator 613. The stationary electrodes 611 and 612 for startup are formed on the insulator covering, among the inner edges of the outer frame 620, the inner edges facing the edges 609 and 610 of the mirror base 601. The portions of the outer frame 120 where the stationary electrodes 611 and 612 are present are thicker than the mirror base 601, so that the edges 609 and 610 of the mirror base 601 and stationary electrodes 611 and 612 are shifted from each other in the direction of thickness of the mirror base 601.

The insulator 613 is removed from part of the outer frame 620 so as to expose the conductor to the outside. A pad 614 is formed on such an exposed portion of the outer frame 620 and serves as a lead. The stationary electrodes 607 and 608 for drive formed on the inner frame 604 and stationary electrodes 611 and 612 for startup formed on the inner frame 620 are respectively led to pads 616 and 617 formed on the top the outer frame 620 and pads 618 and 619 formed on the bottom of the same.

Reference will be made to FIGS. 17A through 17D for describing the operation of the illustrative embodiment. As shown, the mirror base 601 supported by the torsion bars 602 and 603 is connected to ground via the pad 614 of the outer frame 620. When a voltage of, e.g., 50 V is applied to each of the stationary electrodes 611 and 612 for startup, electrostatic attraction acts between the stationary electrode 612 or 612 and the adjoining edge 609 or 610 of the mirror base 601, which are shifted from each other by a gap of, e.g., 5 µm in the direction of thickness of the mirror base 601. The electrostatic attraction causes the mirror base 601 to rotate counterclockwise, as viewed in FIGS. 17A through 17D, about the torsion bars 602 and 603 to a position indicated by a circle A in FIG. 17A. At the position A, the mirror base 601 has swung to a position where the edges 609 or 610 and stationary electrode 611 or 612 overlap each other, forming a step necessary for vibration to start between the stationary electrode 607 or 608 for drive and the edge 605 or 606 of the mirror base 601. It is noteworthy that the stationary electrodes 611 and 612 of the illustrative embodiment can be easily provided with a substantial dimension in the direction of step each, realizing the step necessary for startup even when the torsional rigidity of the torsion bars 602 and 603 are high.

Subsequently, the voltage application to the stationary electrodes 611 and 612 for startup is interrupted while, at the same time, a voltage of, e.g., 50 V is applied to the stationary electrodes 607 and 608 for drive. The resulting electrostatic attraction acting between each stationary electrode 607 or 608 and the adjoining edge 605 or 606 of the mirror base 601 causes the mirror base 601 to rotate clockwise in cooperation with the torsional rigidity of the torsion bars 602 and 603. As shown in FIG. 17B, when the mirror base 601 reaches a horizontal position, the voltage application to the stationary electrodes 607 and 608 is interrupted. At this instant, the mirror base 101 further swings clockwise due to its moment of inertia to a position shown in FIG. 17C where the moment of inertia and the torsional rigidity of the torsion bars 602 and 603 balance with each other. Just after the balance, the voltage is again applied to the stationary electrodes 607 and 608 to cause the mirror base 601 to swing counterclockwise due to the resulting electrostatic attraction and the torsional rigidity of the torsion bars 602 and 603. As shown in FIG. 17D, when the mirror base 601 again reaches the horizontal position, the voltage application to the stationary electrodes 607 and 608 is interrupted. At this time, the mirror base 601 further swings counterclockwise until its moment of inertia and the torsional rigidity of the torsion bars 602 and 603 balance with each other.

In the illustrative embodiment, the drive frequency of the stationary electrodes 607 and 608 for causing the mirror base 601 to rotate is coincident with the resonance frequency of the mirror base 601. This allows the mirror base 601 to reciprocatingly vibrate (swing) with a larger swing angle than when it is displaced by the stationary electrodes 611 and 612 for startup.

Figure 18:
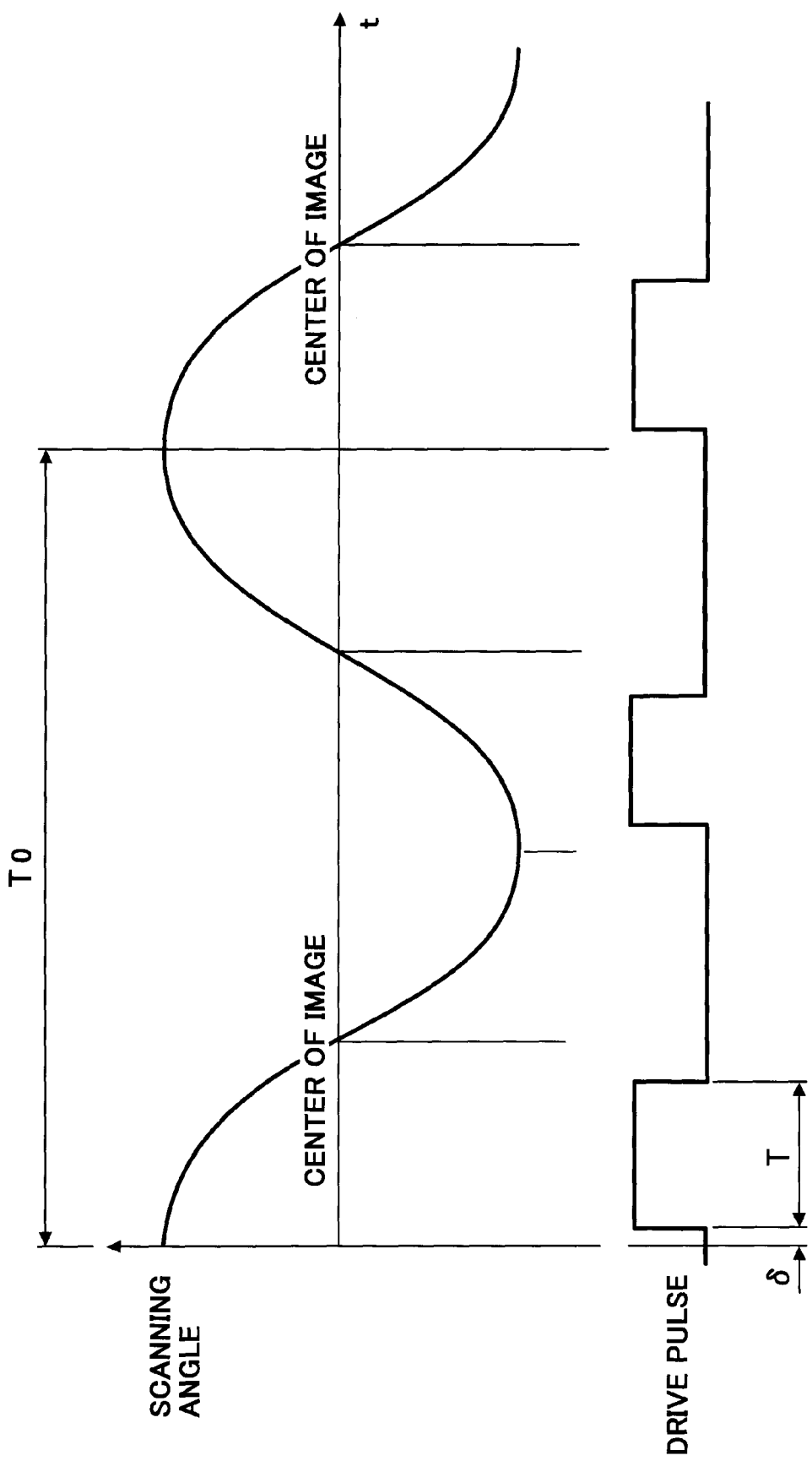
FIG. 18 is timing chart showing a relation between a mirror scanning angle and a drive pulse.

FIG. 18 shows the mirror scanning angle and drive pulse timing particular to the drive scheme described above. As shown, assume that a pulse is applied with a delay δ from the time when the scanning angle is maximum. Then, the drive pulse is applied for a period of time T in which the mirror moves toward the center of an image where the scanning angle is zero, i.e., two pulses are applied for one period.

In the illustrative embodiment, despite that the mirror base 601 has a broad area and has the thickness of its flat portion reduced to have a preselected moment of inertia, the ribs 621 present on the bottom of the flat portion effectively prevent the mirror base 601 from deforming when the mirror base 601 is in a halt or is vibrating. The mirror surface therefore remains flat even during high-frequency vibration and stably steers a light beam. It is to be noted that the ribs 621 are so configured as to insure reinforcement while reducing an increase in the moment of inertia of the mirror base 101 as far as possible.

Further, the mirror base 601 is apt to deform at positions remote from the torsion bars 602 and 603. The ribs 621 effectively reduce the deformation of the mirror base 601 at such positions as well. Moreover, because the ribs 621 are positioned on the bottom of the mirror base 601, the entire top of the mirror base 601 can be used as a mirror surface. This allows a beam configuration to be freely selected and therefore enhances the applicability of the optical scanning device.

In addition, the ribs 621 on the bottom of the mirror base 601 can be easily formed only if they are left as projections when a silicon substrate is etched, as will be described hereinafter with reference to FIGS. 19D and 19E. The ribs 621 therefore do not complicate a process for producing the optical scanning device.

FIGS. 19A through 19K demonstrate a specific process for producing the optical scanning device described above. It should be noted that the process to be described is similarly applicable to a fourth to a sixth embodiment to be described later. The mirror base, torsion bars and frames of the optical scanning device are implemented by a silicon substrate containing impurities in high concentration and having low resistance because such a substrate can be easily configured by accurate microprocessing and because the entire members can be used as shared electrodes.

As shown in FIG. 19A, a silicon substrate 701 that is, e.g., 200 μm thick and polished at opposite surfaces is prepared. A viscous heat-resistant resist 702 is coated on one surface of the silicon substrate 701 to a thickness of, e.g., 100 μm so as to serve as a mask. The masking material should only closely contact silicon, have a selective etching ratio large enough for the resist 702 to remain as a mask at the time of etching, and be easily removable after etching. The resist 702 may be replaced with, e.g., an Ni-plated film, if desired.

As shown in FIG. 19B, the resist or mask 702 is exposed and then developed to be thereby patterned in the form of an inner frame. Subsequently, as shown in FIG. 19C, the silicon substrate 701 is etched via the resist 702 to a thickness of, e.g., 100 μm to form the inner frame pattern by a dry etching device (ICP-RIE) operable at high etching speed with high anisotropy. The stationary electrodes 611 and 612 for start are formed at the resulting stepped edges of the silicon substrate 701 by a step that will be described later.

Figure 19E:
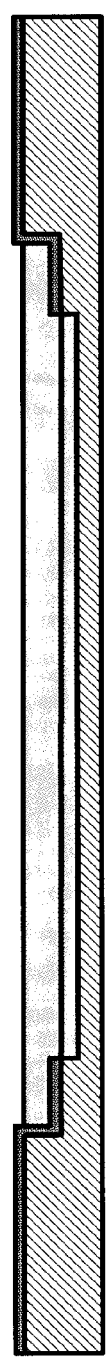

As shown in FIG. 19D, after the resist 702 has been removed, a viscous heat-resistant resist 703 is again coated on the stepped silicon substrate 701 to a thickness of, e.g., 100 μm The resist 703 is exposed and then developed to be patterned in the form of the ribs 612. As shown in FIG. 19E, the portion of the silicon substrate 701 thinned to 100 μm is etched to a depth of, e.g., 50 μm by the dry etching device (ICP-RIE) via the resist or mask 703 in the form of the ribs 621.

Figure 19F:
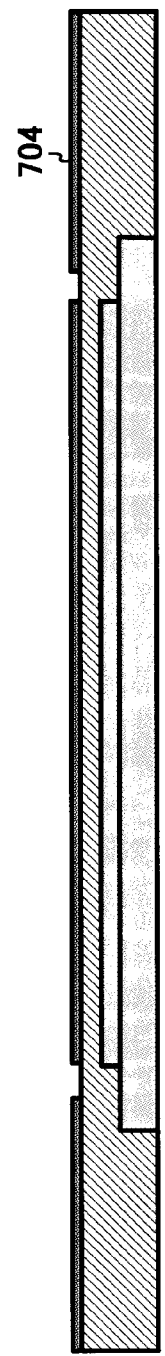
Figure 19G:
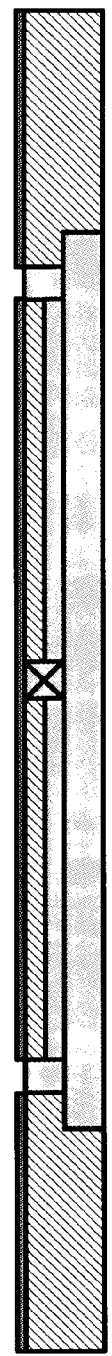

As shown in FIG. 19F, a viscous heat-resistant resist 704 is coated on the surface of the silicon substrate 701 opposite to the surface etched to form the inner frame 604 to a thickness of, e.g., 100 μm. The resist 704 is then patterned to form the mirror base 601 and torsion bars 602 and 603 over the thinned portion of the silicon substrate 701. As shown in FIG. 19G, the silicon substrate 701 is etched through via the resist or mask 704 by the dry etching device (ICP-RIE), thereby forming the mirror base 601 and torsion bars 602 and 603.

As stated above with reference to FIGS. 19D and 19E, projections left on the silicon substrate 701 after etching constitute the ribs 621. The mirror base 601 can therefore be easily, integrally formed by a semiconductor process.

Figure 19H:
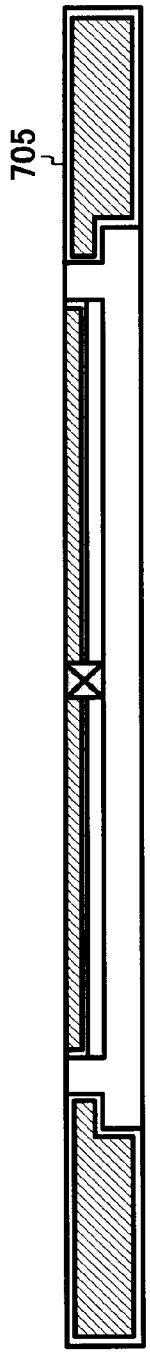

As shown in FIG. 19H, after the removal of the resist 704, the entire silicon substrate 701 is oxidized by heat to form an SiO$_2$ film or insulation layer 705 having a thickness of, e.g., 1 μm.

Figures 19I, 19J, 19K:
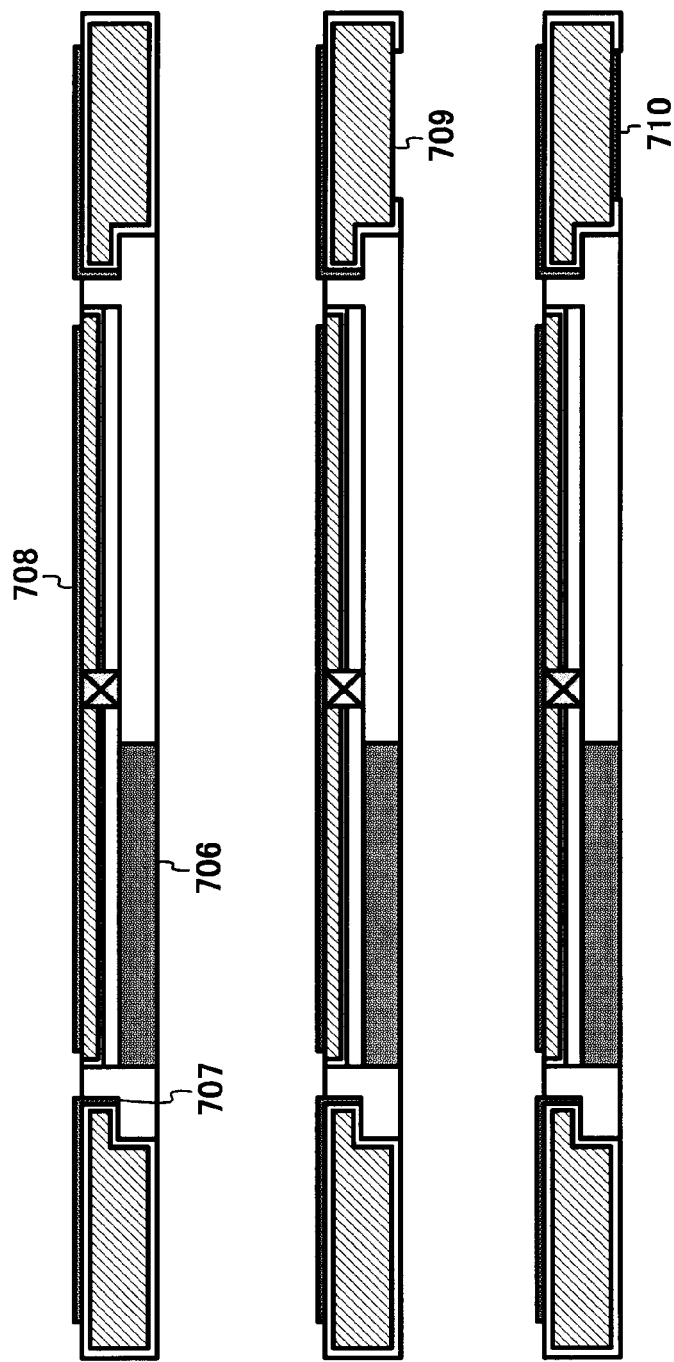

As shown in FIG. 19I, thin metal films 706 and 707 for forming the stationary electrodes 611 and 612 for startup and stationary electrodes 607 and 608 and the pads 616 through 619, respectively, are formed on the SiO$_2$ film at the inner edges of the frame. For this purpose, a Ti film as thin as 300 Å, for example, is formed on the siO$_2$ film by sputtering. Subsequently, a 1,200 Å Pt film, for example, is formed on the Ti film by sputtering. Further, a thin Al film 708 is formed as the thin metal film 615 that forms the mirror surface of the mirror base. In such film forming steps, the regions other than the electrodes are covered with a metallic stencil mask in order to prevent the metal films from being formed on the above regions. As for the stationary electrodes adjoining at the same position, a film is formed in the oblique direction with the mirror base being held in an inclined position by a jig.

The Ti film enhances the close contact of the Pt film on the SiO$_2$ film. While the illustrative embodiment uses a Pt film as an electrode material, the Pt film may be replaced with, e.g., an Au film or a Ti film so long as it is highly conductive and can closely contact SiO$_2$. Also, the Al film 708 forming the mirror surface may be replaced with any other suitable material, e.g., Au so long as it has sufficient reflectance to a laser beam. In addition, sputtering may be replace with vacuum deposition, ion plating or similar conventional technology, if desired.

Subsequently, as shown in FIG. 19J, the SiO$_2$ film on the bottom of the frame is partly etched out via a metal mask to form a contact hole 709. As shown in FIG. 19K, a thin Al film 710 is formed in the contact hole 709 via a metal mask, constituting the pad 614 for applying a voltage to the mirror base. The laminate is then heated at 400° C. in order to lower electric resistance between the pad 114 and the mirror base.

Figure 20B:
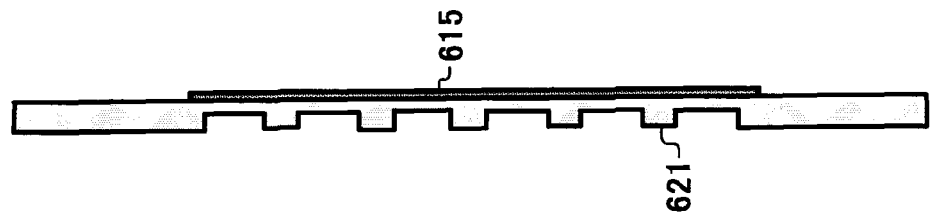
FIGS. 20A and 20B are respectively a bottom view and a section showing a mirror base included in a fourth embodiment of the optical scanning device in accordance with the present invention.
Figure 20A:
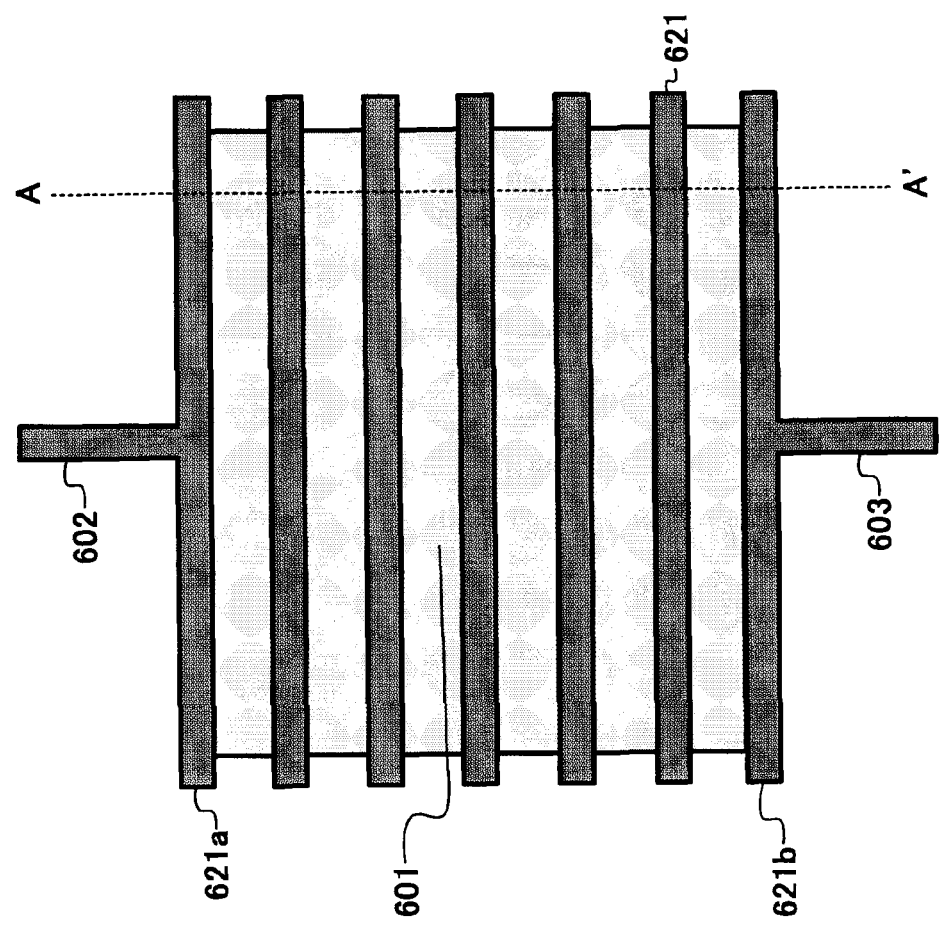

FIGS. 20A and 20B show a fourth embodiment of the optical scanning device in accordance with the present invention. FIG. 20A shows the bottom of the mirror base. FIG. 20B is a section along line A-A' of FIG. 20A. As shown, the ribs 621 for reinforcement extend on the bottom or reverse surface of the flat portion of the mirror base 601 perpendicularly to the torsion bars 602 and 603 as in the third embodiment. This embodiment differs from the third embodiment in that additional ribs 621a and 621b extend along the edges of the mirror base 601 to which the torsion bars 602 and 603 are connected. The ribs 621, 621a and 621b are, e.g., 30 μm high each. The edges of the mirror base 601 to which the torsion bars 602 and 603 are connected are identical in thickness with the torsion bars 602 and 603, i.e., 60 μm. The additional ribs 621a and 621b increase the connection strength of the torsion bars 602 and 603 and mirror base 601 for thereby enhancing the reliability of the optical scanning device. As for the rest of the configuration, this embodiment is identical with the third embodiment.

FIGS. 21A and 21B show a fifth embodiment of the optical scanning device in accordance with the present invention. FIG. 21A shows the reverse surface of a mirror substrate. FIG. 21B is a section along line B-B' of FIG. 21A. In this embodiment, too, the ribs 621 that are, e.g., 30 μm high are formed on the reverse surface of the flat portion of the mirror base 601, which are 30 μm thick and 4 mm square. This embodiment differs from the previous embodiments in that the ribs 621 extend in a lattice configuration in the directions perpendicular and parallel to the torsion bars 601 and 603. Further, additional ribs 621 extend along the edges of the flat portion of the mirror base 601 to which the torsion bars 602 and 603 are connected and the edges facing the drive electrodes. As for the rest of the configuration, the illustrative embodiment is identical with the third embodiment.

The ribs 621 arranged in a lattice configuration reinforce the entire mirror base 101 and effectively reduce the torsional deformation of the mirror base 601, thereby further promoting stable optical scanning. Further, the edges of the mirror base 601 connected to the torsion bars 602 and 603 are as thick as the torsion bars 602 and 603, i.e., 60 μm as in the fourth embodiment, increasing the connection strength of the mirror base 601 and torsion bars 602 and 603 more than in the third embodiment. Moreover, the edges of the mirror base 601, which face the drive stationary electrodes and serve as movable electrodes, are increased in thickness to 60 μm by the ribs 621, so that the movable electrodes have a larger area than in the previous embodiments and lower the voltage required of the mirror base 601.

Figure 22:
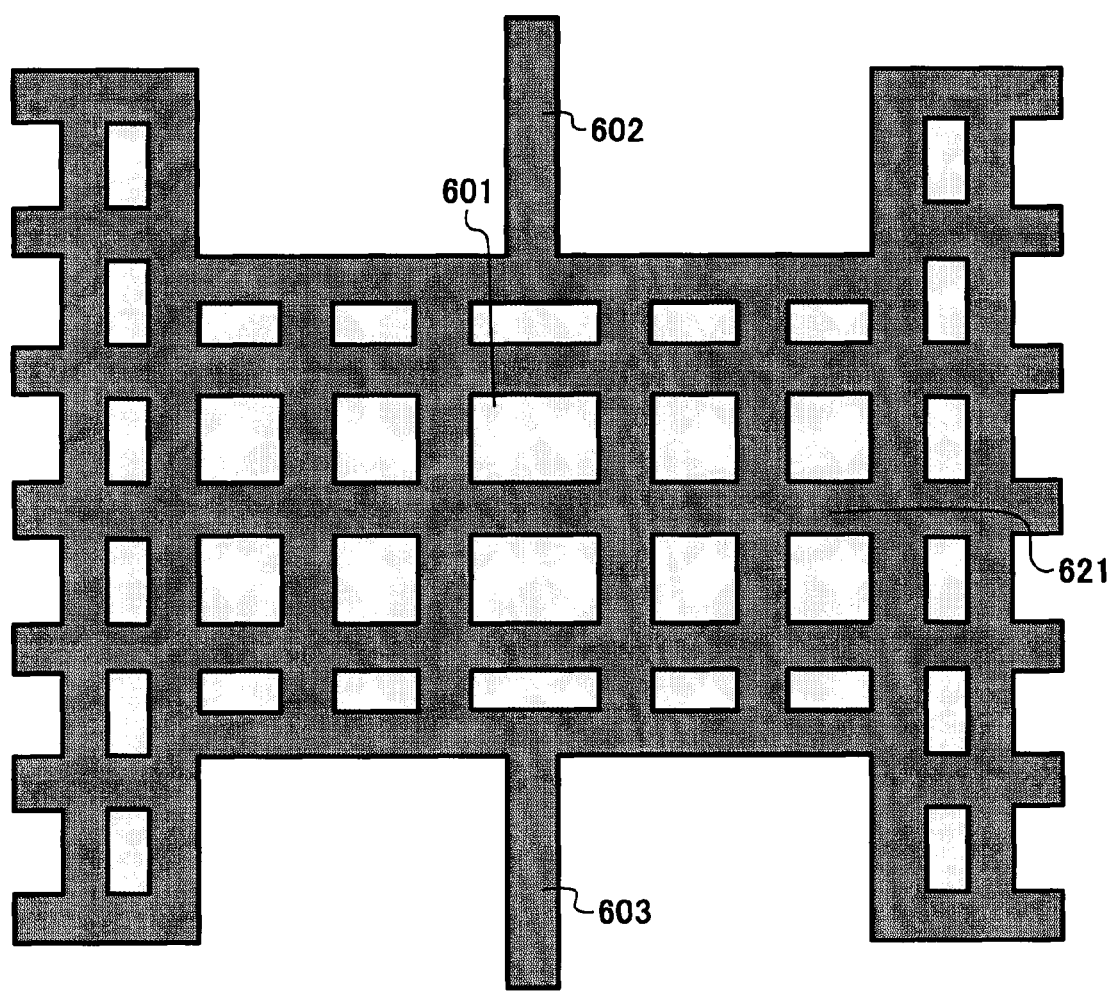
FIG. 22 is a bottom view showing a mirror base included in the sixth embodiment of the optical scanning device in accordance with the present invention.

FIG. 22 shows a sixth embodiment of the optical scanning device in accordance with the present invention. As shown, the mirror base 601 has a generally H-shaped configuration as viewed in a plan view, i.e., the edge portions of the mirror base 601 at opposite sides of the torsion bars 602 and 603 facing the stationary electrodes are broader in area than the other portion. This configuration effectively reduces the moment of inertia and therefore the voltage required of the mirror base 601. This embodiment additionally achieves the same advantages as the fifth embodiment because of the lattice configuration of the ribs 621.

Figure 23A:
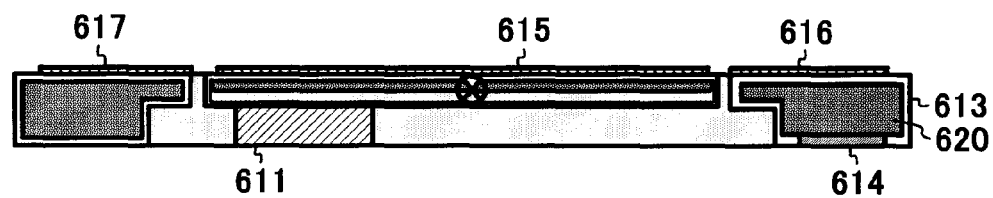
FIGS. 23A and 23B are respectively a section and a bottom view showing a seventh embodiment of the optical scanning device in accordance with the present invention.
Figure 23B:
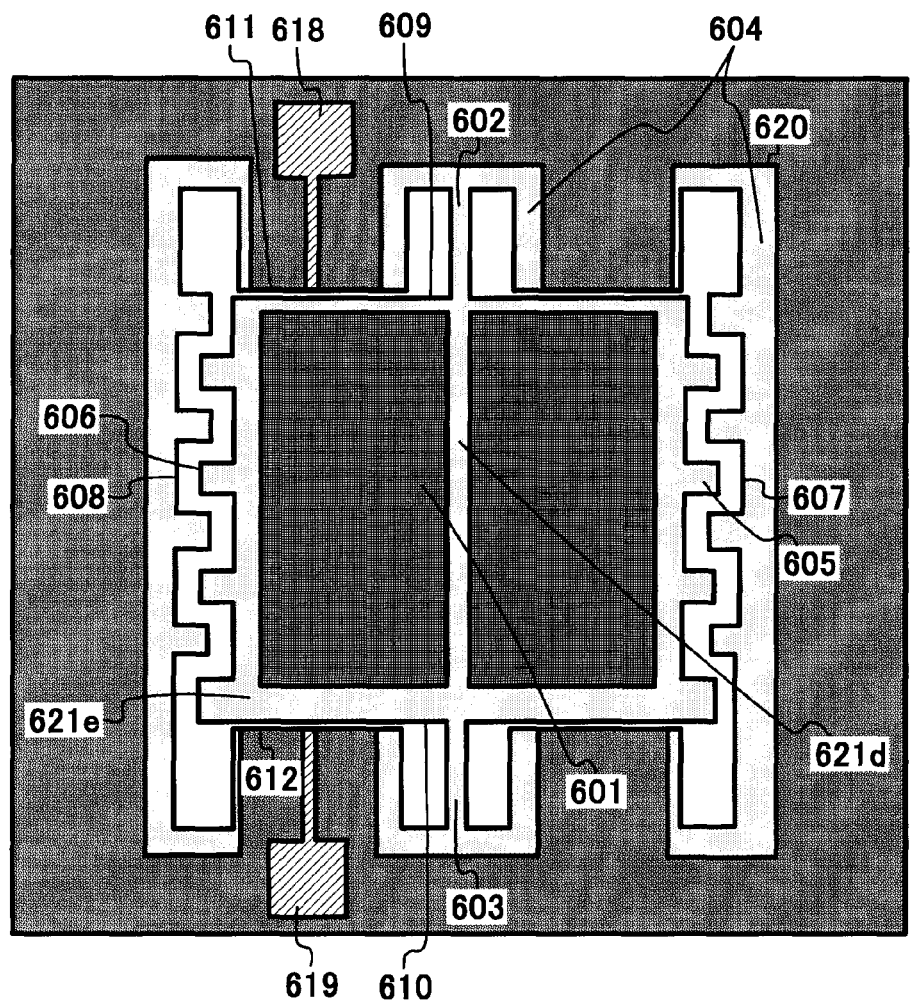

FIGS. 23A and 23B show a seventh embodiment of the optical scanning device in accordance with the present invention. FIG. 23A is a section at substantially the center of the optical scanning device while FIG. 23B shows the bottom of the device. As shown, this embodiment differs from the previous embodiments in that the torsion bars 602 and 603 are extended to form a rib 621d extending across the mirror base 601, and that a frame-like rib 621e surrounds the mirror base 601. The ribs 621d and 621d are as thick as the torsion bars 602 and 603 while the other portion of the mirror base 601 is thinner than the torsion bars 602 and 603.

Figure 24:
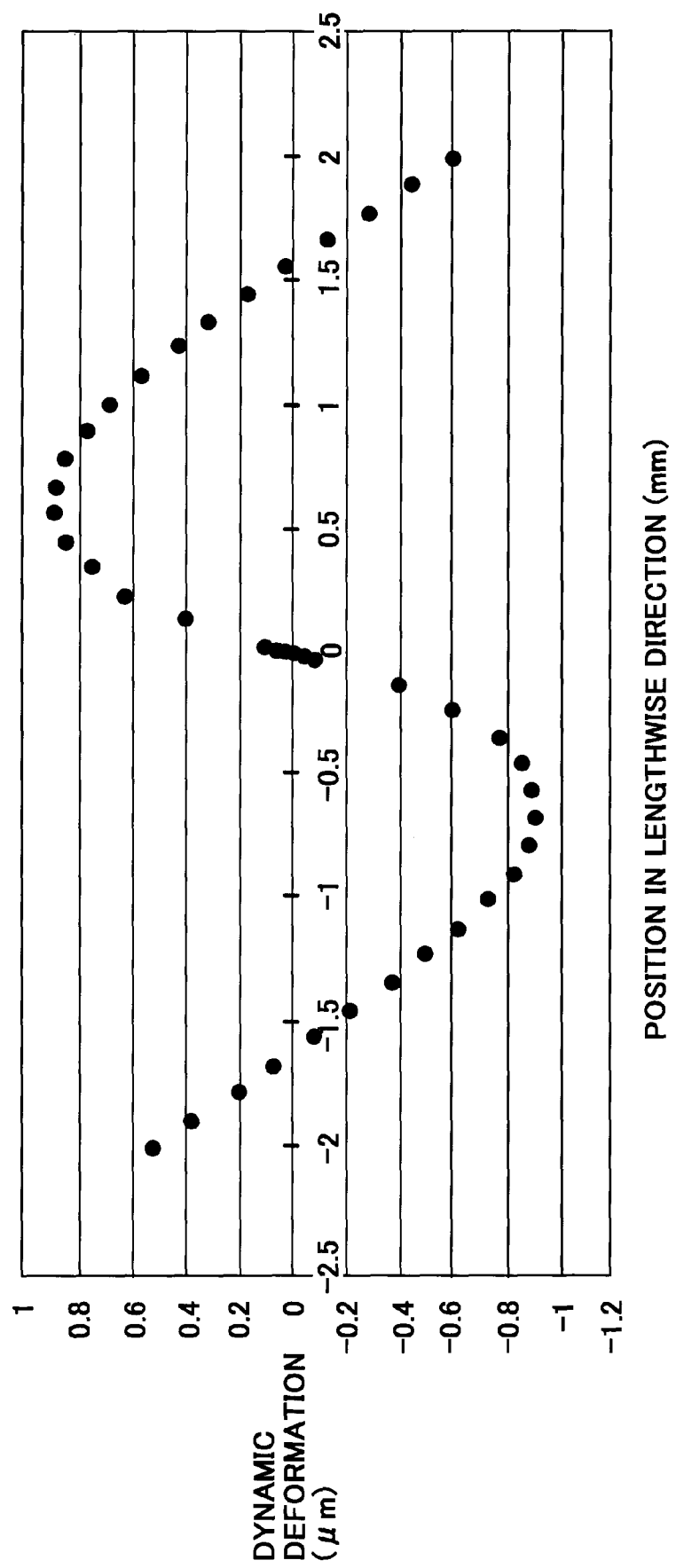
FIG. 24 is a graph showing the amounts of deformation of the mirror surface determined by calculation.

FIG. 24 shows the maximum deformation of the mirror base 601 calculated without the ribs of the illustrative embodiment and by use of a silicon mirror substrate 20 μm thick and 4 mm square and caused to oscillate by ±5° at a frequency of 2.5 kHz. As shown, the mirror base without the ribs deforms by the largest amount, which is about 1 μm, at centers at both sides of the torsion bars 602 and 603. In the illustrative embodiment, the rib 621d surrounding the mirror base 601 reduces such a deformation as well as deformation perpendicular thereto. This, coupled with the fact that the rib 621e extending across the mirror base 601 enhances the positional accuracy of the axis of vibration, insures a stable beam configuration.

Figure 25A:
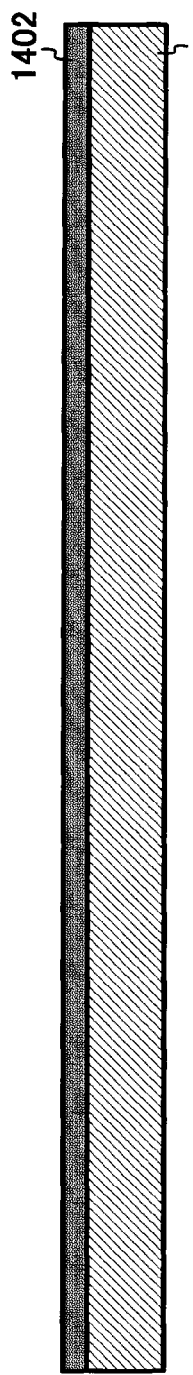
FIGS. 25A through 25K are sections showing a specific procedure for producing the device of FIGS. 23A and 23B.

FIGS. 25A through 25K demonstrate a specific process for producing the optical scanning device of the seventh embodiment. Again, the mirror substrate, torsion bars and frames are implemented as a silicon substrate that can be easily configured by accurate microprocessing. First, as shown in FIG. 25A, a silicon substrate 1401 that is 200 μm thick and polished at opposite surfaces is prepared. A viscous heat-resistant resist 1402 is coated on one surface of the silicon substrate 1401 to a thickness of 100 μm so as to serve as a mask. The masking material should only closely contact silicon, have a selective etching ratio large enough for the resist to remain as a mask at the time of etching, and be easily removable after etching. The resist 1402 may be replaced with, e.g., an Ni-plated film.

Figure 25B:
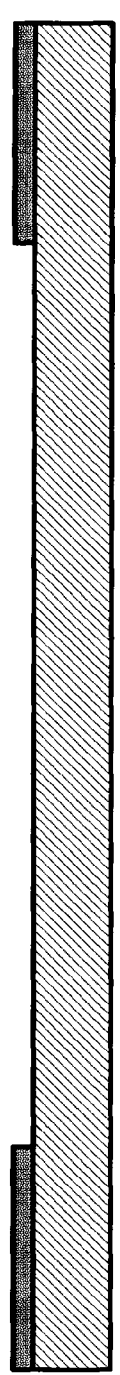
Figure 25C:

As shown in FIG. 25B, the resist or mask 1402 is exposed and then developed to be thereby patterned in the form of an inner frame. Subsequently, as shown in FIG. 25C, the silicon substrate 1401 is etched out via the resist 1402 to a thickness of 100 μm to form the inner frame pattern by the dry etching device (ICP-RIE). The stationary electrodes for startup are formed at the resulting stepped edges of the silicon substrate by the subsequent step.

Figure 25D:
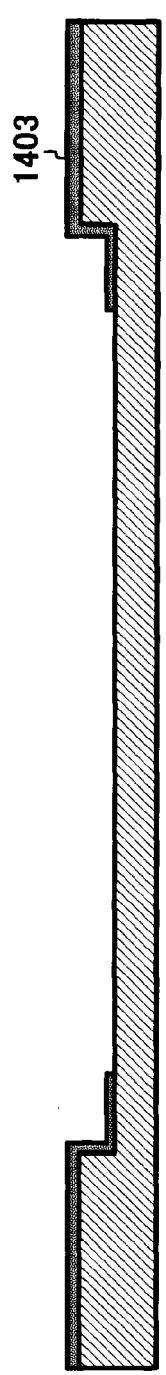
Figure 25E:
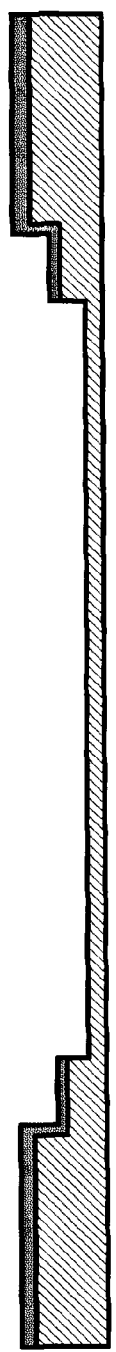

As shown in FIG. 25D, after the resist 1402 has been removed, a viscous heat-resistant resist 1403 is again coated on the stepped silicon substrate to a thickness of 100 μm. The resist 1403 is exposed and then developed to be thereby patterned in the form of the ribs. As shown in FIG. 25E, the portion of the silicon substrate thinned to 100 μm is etched out to a depth of 50 μm by the dry etching device (ICP-RIE) via the resist or mask 1403 in the form of the ribs.

Figure 25F:
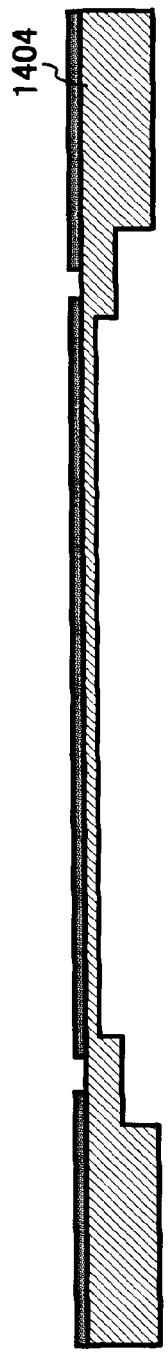
Figure 25G:
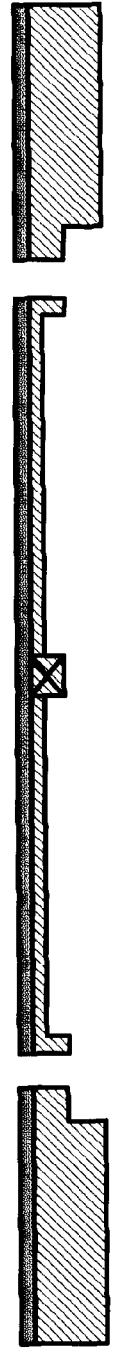

As shown in FIG. 25F, a viscous heat-resistant resist 1404 is coated on the surface of the silicon substrate opposite to the surface etched to form the inner frame to a thickness of 100 μm. The resist 1404 is then patterned to form the mirror base and torsion bars over the thinned portion of the silicon substrate. As shown in FIG. 25G, the silicon substrate is etched through via the resist or mask 1404 by the dry etching device, thereby forming the mirror base and torsion bars.

Figure 25H:
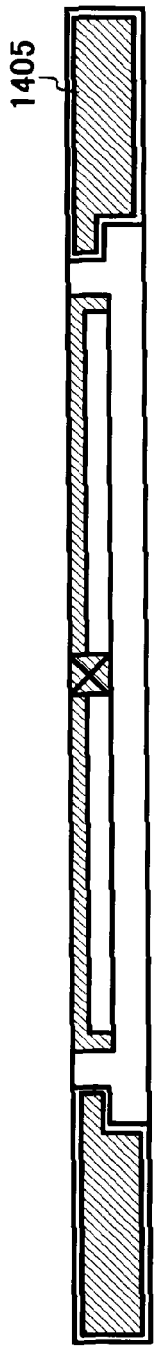

As shown in FIG. 25H, after the removal of the resist 1404, the entire silicon substrate is oxidized by heat to form an $SiO_2$ film or insulation layer 1405 having a thickness of 1 μm.

Figures 25I, 25J, 25K:
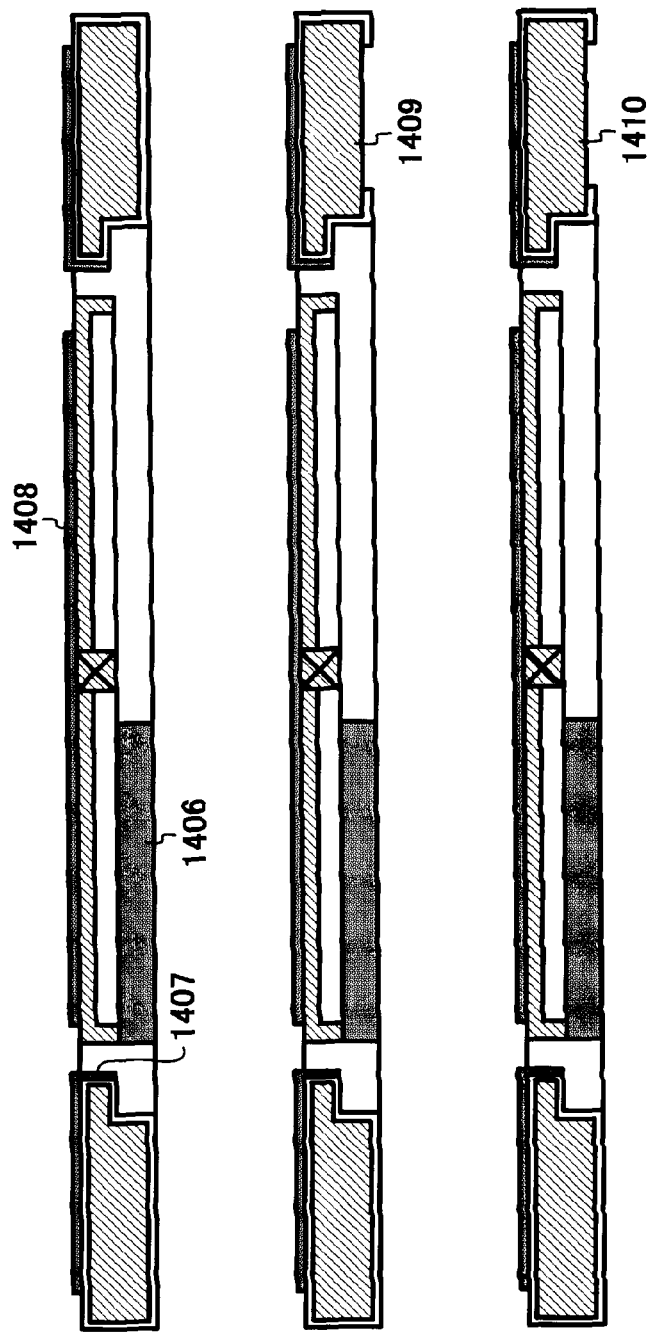

As shown in FIG. 25I, Ti films as thin as 300 Å are formed on the $SiO_2$ film at the inner edges of the frame as stationary electrodes for startup and stationary electrodes for drive by sputtering. Subsequently, Pt films 1406 and 1407 as thin as 1,200 Å are formed on the Ti films by sputtering. Further, a thin Al film 1208 is formed on the front surface of the mirror substrate as a mirror surface. In such film forming steps, the regions other than the electrodes are covered with a metallic stencil mask in order to prevent the metal films from being formed on the above regions. As for the Pt films 1407 forming the stationary electrodes for drive, a film is formed in the oblique direction with the mirror base being held in an inclined position by a jig.

The Ti film enhances the close contact of the Pt film on the $SiO_2$ film. While the illustrative embodiment uses a Pt film as an electrode material, the Pt film may be replaced with, e.g., an Au film or a Ti film so long as it is highly conductive and can closely contact $SiO_2$. Also, the Al film 1408 forming the mirror surface may be replaced with any other suitable material, e.g., Au so long as it has sufficient reflectance to a laser beam. In addition, sputtering may be replace with vacuum deposition, ion plating or similar conventional technology, if desired.

Subsequently, as shown in FIG. 25J, the SiO₂ film on the bottom of the frame is partly etched out via a metal mask to form a contact hole 1409. As shown in FIG. 25K, an electrode 1410 for applying a voltage to the mirror is formed in the contact hole 1409 via a metal mask. The laminate is then heated at 400° C. in order to lower electric resistance between the electrode pad 1410 and the mirror base. The procedure described above is similarly applicable to an eighth to a thirteenth embodiment of the optical scanning device to be described later.

FIGS. 26A through 26H demonstrate another specific process for producing the optical scanning device of the seventh embodiment. In this specific procedure, the mirror substrate, torsion bars and frames are implemented by an SOI (Silicon On Insulator) substrate that can be easily configured by accurate microprocessing and can easily form an electrode separating structure. A substrate constituting the mirror base and torsion bars is implemented by a 100 μm thick silicon substrate containing impurities in high concentration and having resistance as low as 0.1 Ω·cm or below. A substrate constituting the frames is implemented by a 525 μm thick silicon substrate having medium resistance ranging from several Ω·cm to several ten Ω·cm. Such substrates are separated by an insulation film that is a 1 μm thick oxide film.

First, as shown in FIG. 26A, a 626 μm thick SOI substrate 2001 polished at both surfaces thereof is prepared. A 100 μm thick, viscous heat-resistant resist 2002 is coated on the SOI substrate 2001 as a mask for deeply etching silicon. The masking material should only closely contact silicon, have a selective etching ratio large enough for the resist 2002 to remain as a mask at the time of 100 μm etching, and be easily removable after etching. The resist 2002 may be replaced with, e.g., an Ni-plated film.

As shown in FIG. 26B, the resist or mask 2002 is exposed and then developed to be thereby patterned in the form of an inner frame. Subsequently, as shown in FIG. 26C, the silicon substrate is etched out via the resist or mask to a thickness of 525 μm at which the oxide film appears in the form of the inner frame by the dry etching device (ICP-RIE). At this instant, the oxide film is far smaller in etching rate than silicon and therefore serves as an etching stop layer. The stationary electrodes for startup are formed at the resulting stepped edges of the silicon substrate by a step to follow.

Figure 26E:
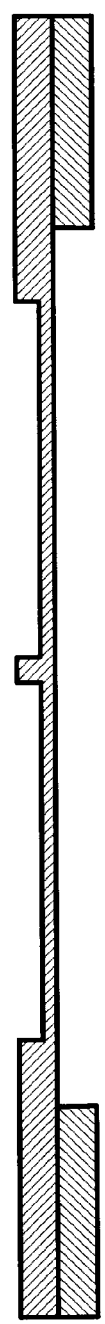

As shown in FIG. 26D, after the resist 2002 has been removed, a viscous heat-resistant resist 2003 is again coated on the substrate assigned to the mirror base to a thickness of 100 μm. The resist 2003 is exposed and then developed to be thereby patterned in the form of the ribs. As shown in FIG. 26E, the portion of the silicon substrate thinned to 100 μm is etched out to a depth of 50 μm by the dry etching device (ICP-RIE) via the resist or mask 2003 in the form of the ribs.

Figure 26F:
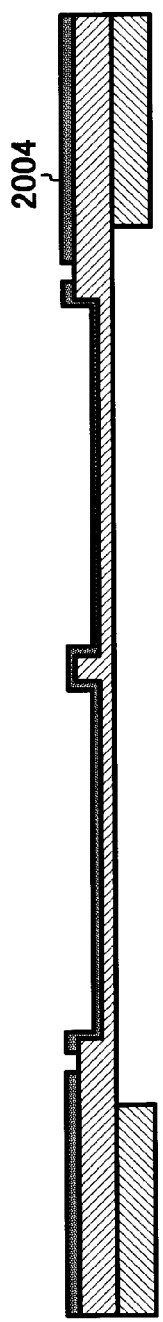
Figure 26G:
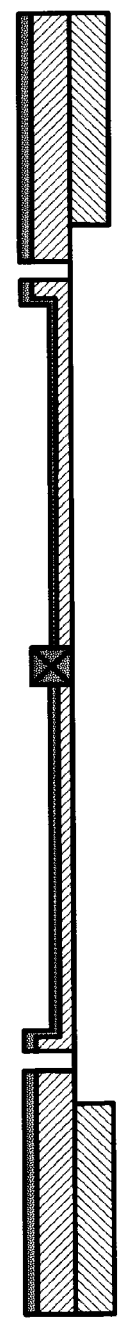

As shown in FIG. 26F, a viscous heat-resistant resist 2004 is coated on the surface of the silicon substrate where the ribs are formed to a thickness of 1.5 μm. The resist 2004 is then patterned to form the mirror base and torsion bars. At this instant, the resist 2004 is coated by spraying because it must cover the stepped portions of the ribs as well. As shown in FIG. 26G, the silicon substrate is etched through via the resist or mask 2004 by the dry etching device (ICP-RIE), thereby forming the mirror base and torsion bars.

Figure 26H:
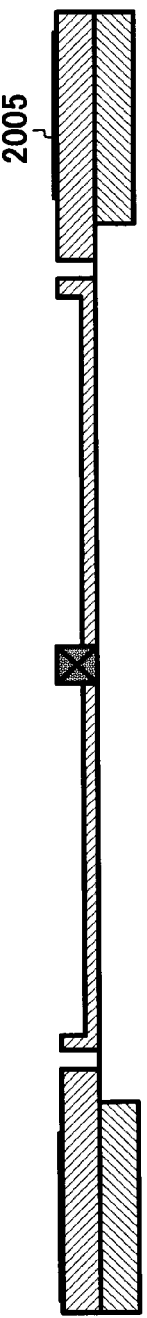

As shown in FIG. 26H, a thin Al film 2005 constituting the stationary electrodes for drive is formed on part of the frame by vacuum deposition via a metal mask. The laminate is then heated at 400° C. in order to lower electric resistance between the Al film 2005 and the mirror base. The Al film 2005 may be replaced with any other suitable material. In addition, sputtering may be replace with vacuum deposition, ion plating or similar conventional technology, if desired.

The procedure described with reference to FIGS. 26A through 26H reduces the number of production steps because it does not need the step of forming an oxide film for insulation after the formation of the mirror base, a step of forming metal electrodes on the edges of the mirror base or a step of forming a contact otherwise formed by removing part of the oxide film. Such a procedure is similarly applicable to an eighth to a thirteenth embodiment to be described hereinafter as well.

Figure 27B:
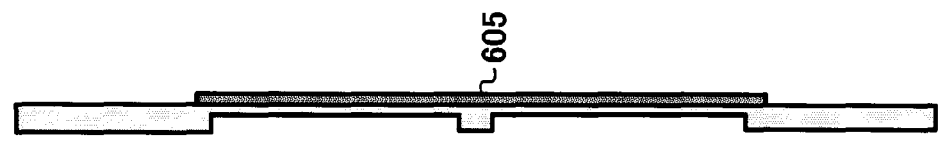
FIGS. 27A and 27B are respectively a bottom view and a section showing a mirror base included in an eighth embodiment of the optical scanning device in accordance with the present invention.
Figure 27A:
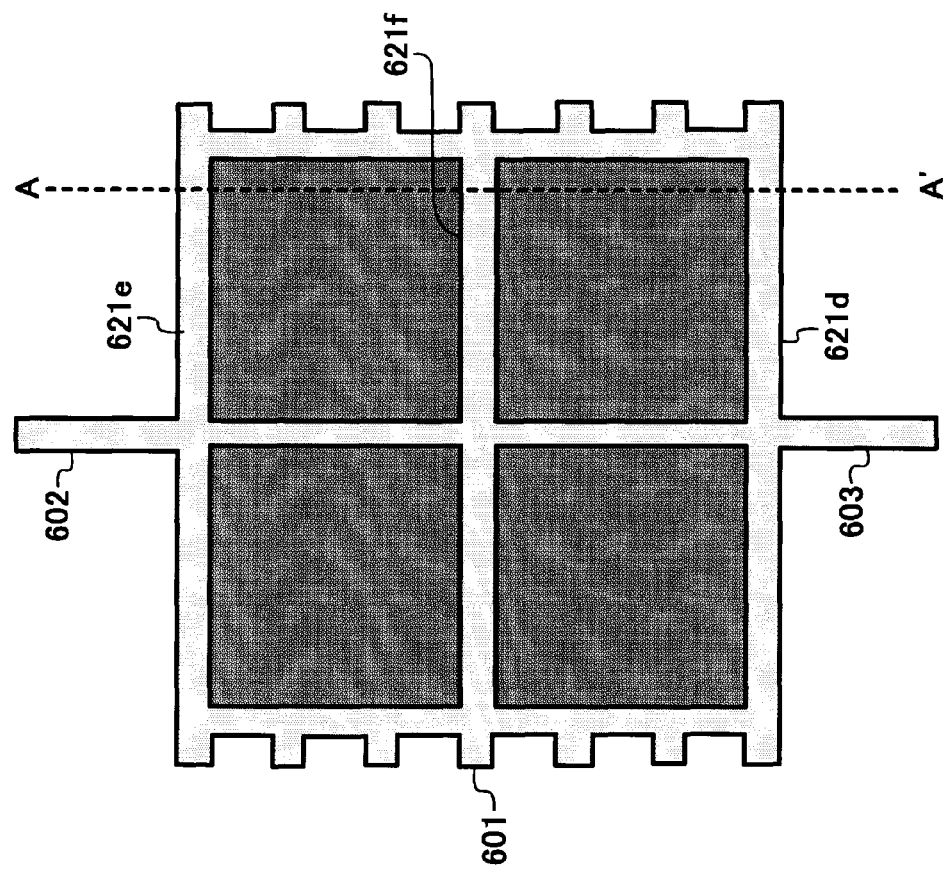

FIGS. 27A and 27B show an eighth embodiment of the optical scanning device in accordance with the present invention. FIG. 27A shows the reverse surface of the mirror base. FIG. 27B is a section along line A-A' of FIG. 27B. As for the general configuration, this embodiment is similar to the seventh embodiment, so that the following description will concentrate on the ribs 621 unique to the illustrative embodiment. As shown, the ribs 621 on the reverse surface of the mirror base 601 include a rib 621*f* in addition to the rib 621*d* extending across the mirror base 601 and rib 621*d* surrounding the mirror base 601. The rib 621*f* intersects the rib 621*d* at right angle while connecting the facing portions of the rib 621*e*. The ribs are 60 μm thick like the torsion bars 602 and 603 while the etched portion of the mirror base 601 is thinner than the torsion bars 602 and 603 by 30 μm.

During vibration, an inertial force acting on the minute portion of the mirror base 601 is proportional to the product of the mass of the minute portion and the square of the distance from the torsion bar 602 or 603. Therefore, in the direction parallel to the torsion bars 602 and 603, the inertial force varies in accordance with the mass of the minute portion, but does not vary in accordance with the position, so that deformation is small. However, in the direction perpendicular to the torsion bars 602 and 603, the difference in inertial force has great influence and brings about noticeable deformation. In light of this, the illustrative embodiment increases rigidity in the direction perpendicular to the torsion bars 602 and 603 with the rib 602*f*, thereby effectively reducing deformation ascribable to vibration.

FIGS. 28A and 28B show a ninth embodiment of the optical scanning device in accordance with the present invention. FIG. 28A shows the reverse surface of the mirror base 601. FIG. 28B is a section along line B-B' of FIG. 28B. As for general configuration, this embodiment is similar to the seventh embodiment, so that the following description will concentrate on the ribs 621 of the mirror base 601 unique to the illustrative embodiment. As shown, the ribs 621 on the bottom of the 4 mm square, mirror base 601 include the rib 121*d* extending across the mirror base 601 and contiguous with the torsion bars 602 and 603 and the rib 621*d* surrounding the mirror base 601. In the illustrative embodiment, the ribs 621 additionally include a plurality of ribs 621*g* perpendicular to and parallel to the rib 621*d* and arranged in a lattice configuration. The ribs 621*g* are arranged symmetrically with respect to the center of the rib 621*d* such that the center of gravity G of the mirror base 601 coincides with the center of the rib 621*d*. The ribs 621 are 60 μm thick like the torsion bars 602 and 603 while the other portion of the mirror base 601 is thinner than the torsion bars by 30 μm.

The additional ribs 621*g* reduce the deformation of the mirror base 601 in the directions perpendicular to and parallel to the torsion bars 602 and 603 more than in the eighth embodiment. It is to be noted that the illustrative embodiment needs a greater drive torque, i.e., a higher drive voltage because an increase in the weight of the mirror base 601 causes the swing angle to decrease.

Figure 29:
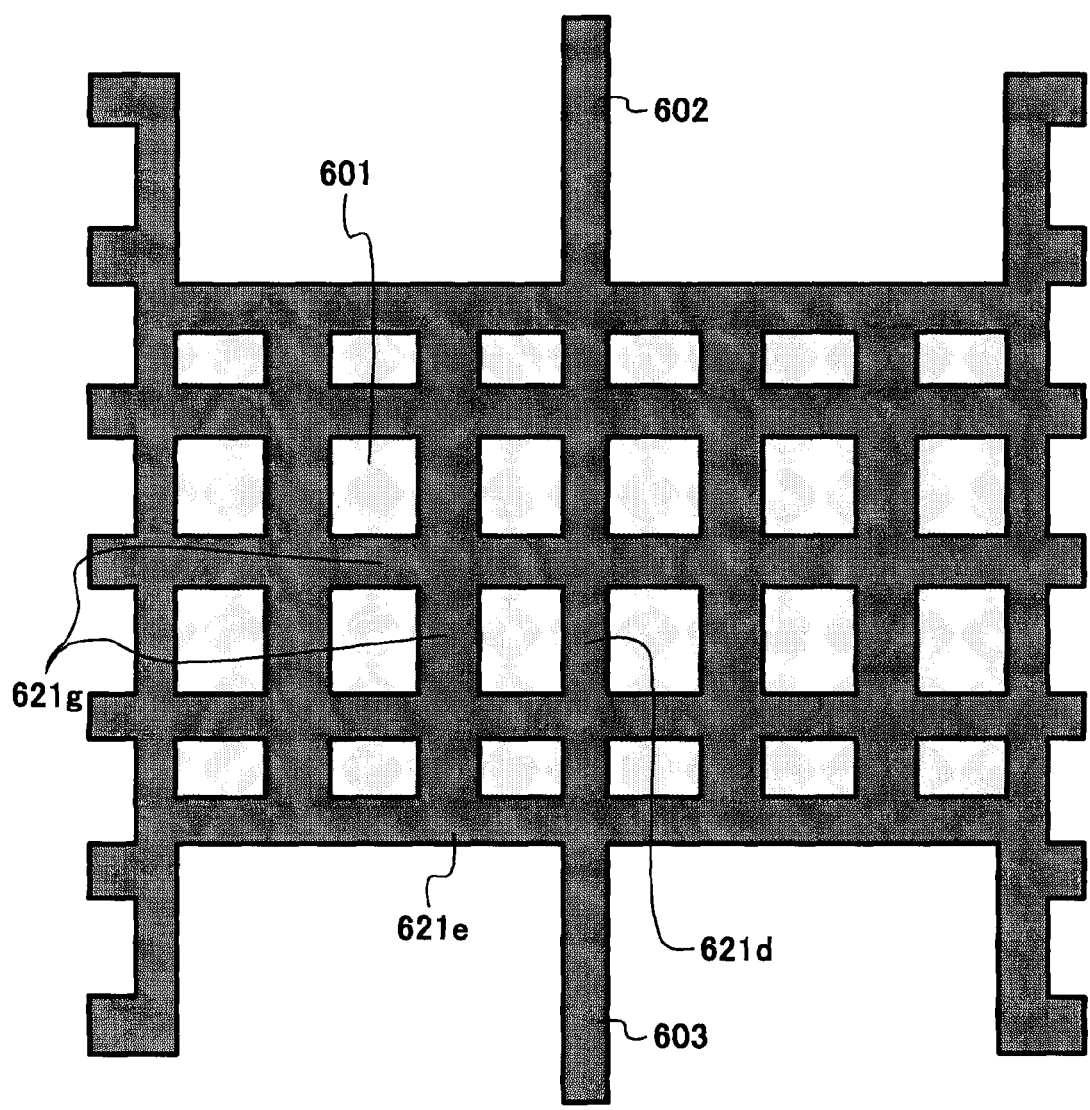
FIG. 29 is a bottom view showing a mirror base included in a tenth embodiment of the optical scanning device in accordance with the present invention.

FIG. 29 shows a tenth embodiment of the optical scanning device in accordance with the present invention. As for general configuration, this embodiment is similar to the seventh embodiment, so that the following description will concentrate on the ribs 621 of the mirror base 601 unique to the illustrative embodiment. As shown, the ribs 621 on the reverse side of the mirror base 601 include the rib 121d extending across the mirror base 601 and contiguous with the torsion bars 602 and 603, rib 621d surrounding the mirror base 601 and ribs 621g perpendicular to and parallel to the rib 621d as in the seventh embodiment. In the illustrative embodiment, the portions of the rib 621d extending along the free edges of the mirror base 601 are longer than the other portions of the rib 621d connected to the torsion bars 602 and 603. The above portions of the rib 621d are implemented as comb teeth and play the role of movable electrodes as in FIGS. 23A and 23B. The stationary electrodes 607 and 608 are also extended in accordance with the movable electrodes. The ribs 621 are 60 μm thick like the torsion bars 602 and 603 while the other portion of the mirror base 601 is thinner than the torsion bars by 30 μm.

The ribs 121g arranged in a lattice configuration effective reduce the deformation of the mirror base 601 in the directions perpendicular to and parallel to the torsion bars 602 and 603, as stated earlier. However, the ribs 121g increase the weight of the mirror base 601 and therefore a drive torque necessary for the mirror base 601 to swing by a preselected angle. This is why the illustrative embodiment extends the rib portions playing the role of movable electrodes to thereby increase the area of the movable electrodes, i.e., the drive torque.

FIGS. 30A and 30B show an eleventh embodiment of the optical scanning device in accordance with the present invention. FIG. 30A shows the bottom of the mirror base 601. FIG. 30B is a section along line B-B' of FIG. 30A. This embodiment is similar to the seventh embodiment as to general configuration, so that the following description will concentrate on the ribs 621 unique to the illustrative embodiment. As shown, the ribs 621 on the 4 mm square, mirror base 601 include the rib 621d contiguous with the torsion bars 602 and 603, 121e surrounding the mirror base 601 and rib 621f perpendicular to the rib 621d as in the eighth embodiment. As shown in FIG. 30A, in the illustrative embodiment, the corners of the rib 621e and the portions where the rib 621e and ribs 621d and 621f join each other are provided with curvature. The curvature successfully reduces the concentration of stress on the above portions where stress is apt to concentrate, thereby preventing cracks from appearing there. The ribs 621 are 60 μm thick like the torsion bars 602 and 603 while the other portion of the mirror base 601 is thinner than the torsion bars by 30 μm.

Figure 31B:
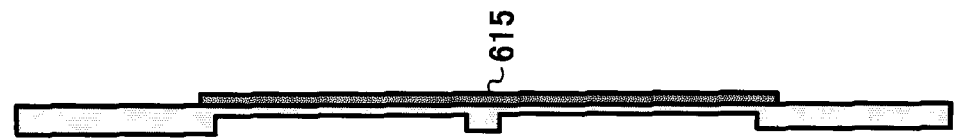
FIGS. 31A and 31B are respectively a bottom view and a section showing a mirror base included in a twelfth embodiment of the optical scanning device in accordance with the present invention.
Figure 31A:
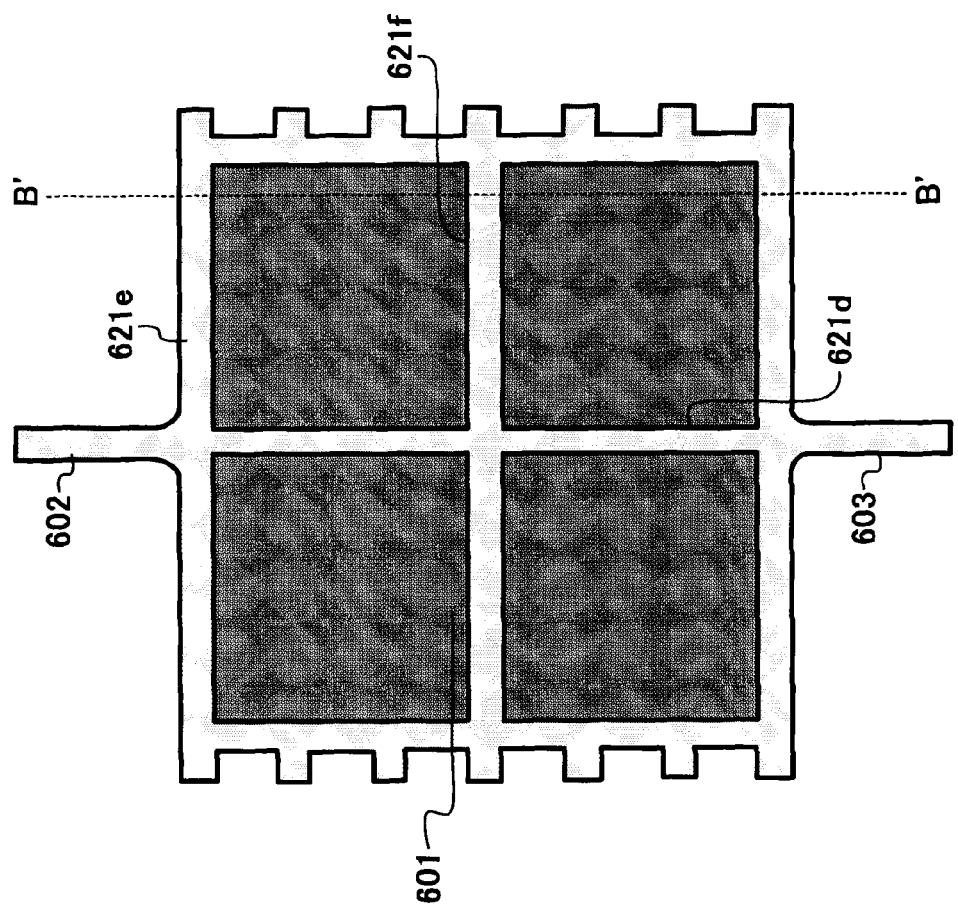

FIGS. 31A and 31B show a twelfth embodiment of the optical scanning device in accordance with the present invention. FIG. 31A shows the bottom of the mirror base 601. FIG. 31B is a section along line B-B' of FIG. 31A. This embodiment is also similar to the seventh embodiment as to general configuration, so that the following description will concentrate on the ribs 621 unique to the illustrative embodiment. As shown, the ribs 621 on the 4 mm square, mirror base 601 include the rib 621d contiguous with the torsion bars 602 and 603, 121e surrounding the mirror base 601 and rib 621f perpendicular to the rib 621d as in the eighth embodiment. As shown in FIG. 31A, in the illustrative embodiment, the portions where the rib 621e and torsion bars 602 and 603 join each other are provided with curvature for the same reason as stated in relation to the eleventh embodiment.

The curvature of the illustrative embodiment may, of course, be used in combination with the curvature of the eleventh embodiment. The ribs 621 are 60 μm thick like the torsion bars 602 and 603 while the other portion of the mirror base 601 is thinner than the torsion bars by 30 μm.

As shown in FIG. 32, in the embodiments shown and described, the mirror surface 615 of the mirror base 601 and the surfaces of the torsion bars 602 and 603 are flush with each other. FIG. 33 shows a thirteenth embodiment of the optical scanning device in accordance with the present invention in which the mirror surface 615 is coincident with the centers of the torsion bars 602 and 603 in the direction of thickness of the bars 602 and 603. The positional relation shown in FIG. 34 obviates the shift of a beam position on the mirror surface 615 ascribable to rotation and thereby enhances the positional accuracy of a reflected beam. As for the rest of the configuration, the thirteenth embodiment is identical with any one of the previous embodiments. While the rib 621e surrounding the mirror base 601 is shown as protruding above the mirror surface as well as below the same, such a configuration is only illustrative.

Further, the optical scanning device may include a depressurized container accommodating the mirror base and mirror driving means and provided with a portion for transmitting a light beam reflected by the mirror base and a terminal to be connected to the mirror driving means.

Figure 34:
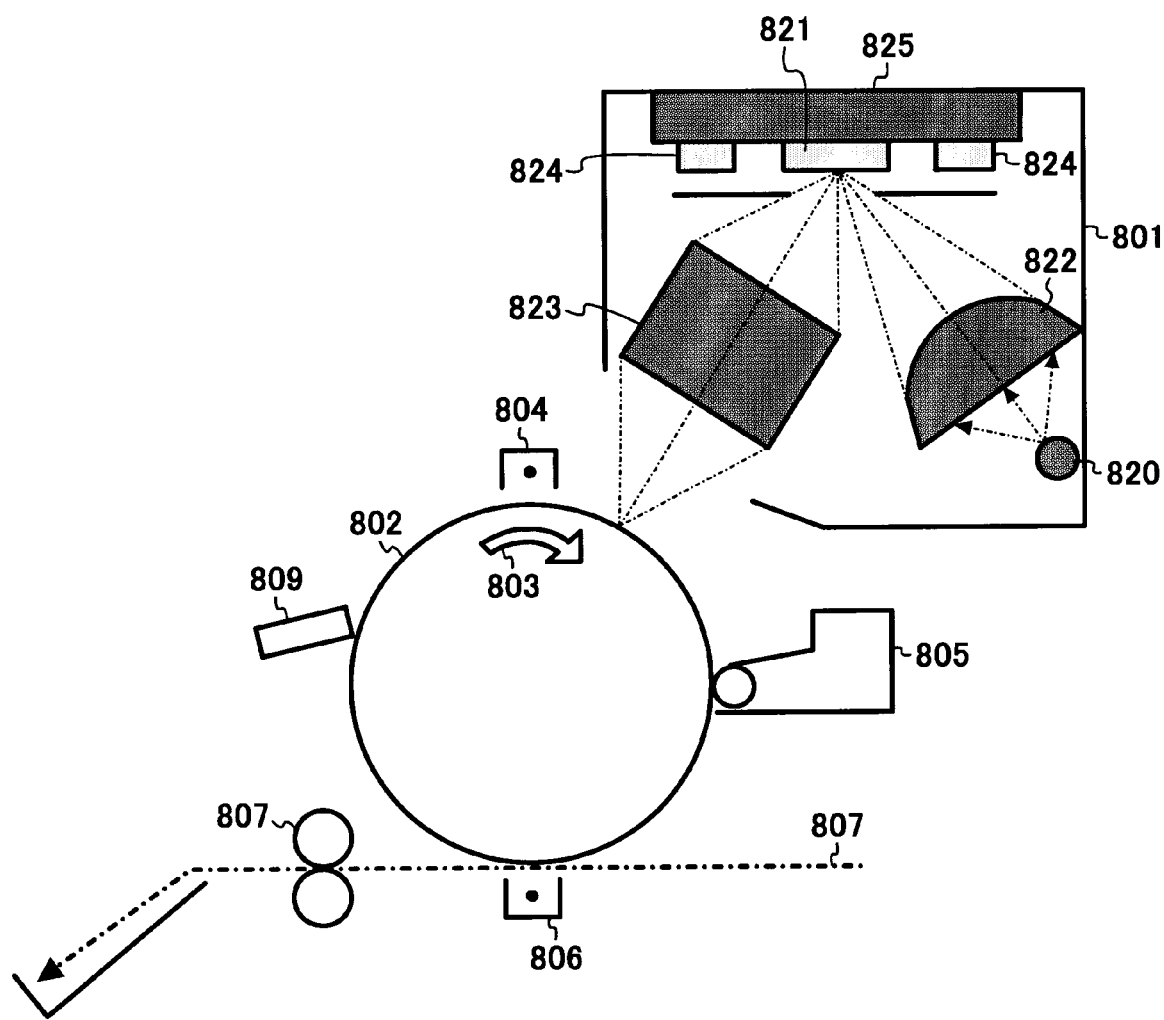
FIG. 34 shows a specific configuration of an optical writing unit and an image forming apparatus to which any one of the illustrative embodiments is applied.

Any one of the embodiments of the optical scanning device described above is desirably applicable to a printer, copier or similar electrophotographic image forming apparatus. Reference will be made to FIG. 34 for describing a specific construction of an image forming apparatus using any one of the illustrative embodiments.

As shown in FIG. 34, the image forming apparatus includes an optical writing unit 801 and a photoconductive drum or image carrier 802 forming a surface to be scanned by the writing unit 801. The optical writing unit 801 scans the surface of the drum 802 with one or more laser beams in the axial direction of the drum 302. More specifically, while the drum 802 is rotated in a direction indicated by an arrow 803, a charger 804 uniformly charges the surface of the drum 802. The writing unit 801 scans the charged surface of the drum 802 with one or more laser beams in accordance with image data to thereby form a latent image. A developing unit 805 develops the latent image with toner to thereby produce a corresponding toner image. An image transferring unit 806 transfers the toner image from the drum 802 to a sheet or recording medium 807. A fixing unit 807 fixes the toner image on the sheet 807. A cleaning unit 809 removes the toner left on the drum 802 after the image transfer. The drum 802 may, of course, be replaced with a photoconductive belt. A conventional, intermediate image transfer body may intervene between the drum 802 and the sheet 807, if desired.

The writing unit 801 includes a light source 820 for emitting one or more laser beams modulated in accordance with an image signal and an optical scanning device 821 configured in accordance with any one of the illustrative embodiments. Focusing optics 822 focuses the laser beam or beams issuing from the light source 820 on the mirror surface of a mirror base included in the scanning device 821. Scanning optics 823 focuses the laser beam or beams reflected by the mirror surface on the surface of the drum 820. The scanning device 821 is mounted on a circuit board 825 together with an IC (Integrated Circuit) 824 for driving the scanning device 821 and is built in the writing unit 801.

The writing unit 801 with the above configuration has the following various advantages. The scanning device 821 of the present invention insures the stable configuration of a laser beam lowers a required drive voltage, as stated earlier. In addition, the scanning device 821 consumes smaller power than a polygonal mirror and therefore reduces the power consumption of the image forming apparatus. The mirror base of the scanning device 821 produces less hissing noise than a polygonal mirror when in vibration, reducing noise to be output from the image forming apparatus. Further, the scanning device 821 occupies a far smaller space than a polygonal mirror. This, coupled with a minimum of heat output from the scanning device 821, promotes the size reduction of the writing unit 801 and therefore image forming apparatus.

In FIG. 34, control means for controlling a sheet conveying mechanism, a drive driving mechanism, the developing unit 805 and image transferring unit 806 and system for driving the light source 820 are not shown because they may have conventional configurations.

Figure 35A:
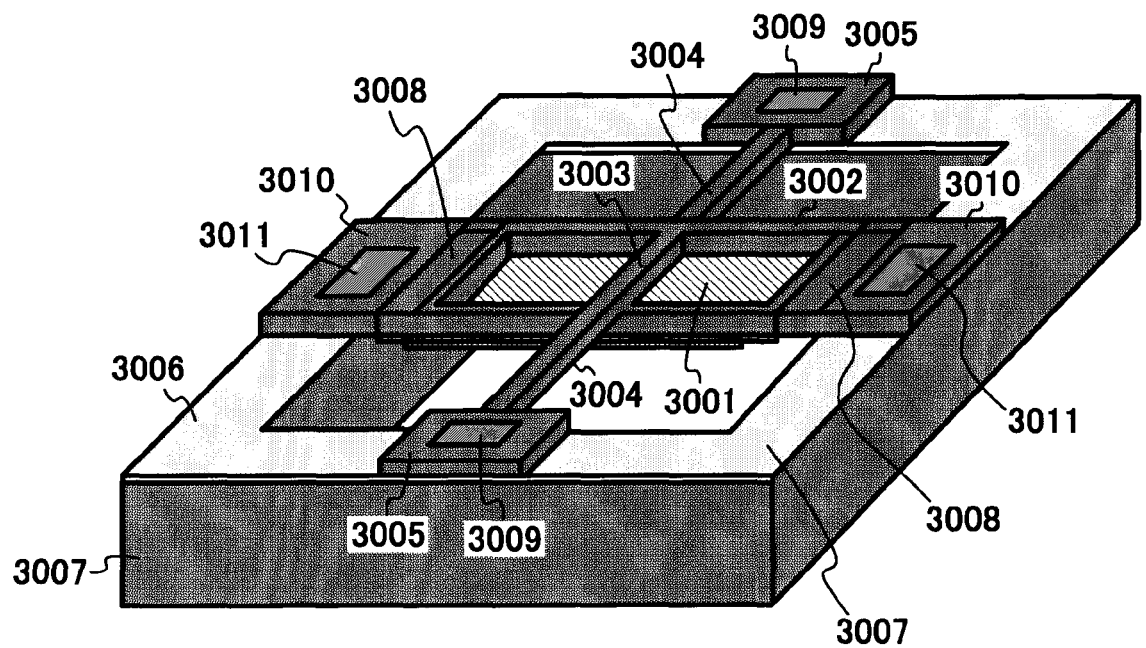
FIGS. 35A and 35B are respectively an isometric view and a section showing a first embodiment of the vibratory mirror chip in accordance with the present invention.
Figure 35B:
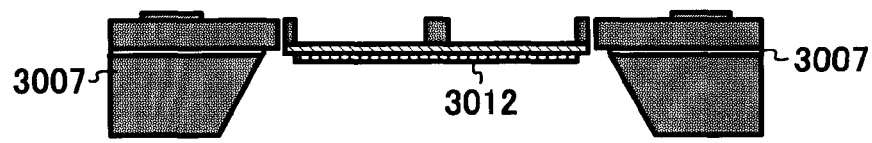

FIGS. 35A and 35B show a first embodiment of the vibratory mirror chip in accordance with the present invention. FIG. 35A is a perspective view of the mirror chip while FIG. 35B is a section perpendicular to torsion bars included in the mirror chip. As shown, the mirror chip includes a mirror base made up of a mirror portion 3001 and a frame portion 3002 connected together, a rib 3003 for reinforcement, torsion bars 3004, support portions 3005, a thermal oxide film 3006, a frame 3007, movable electrodes 3008 forming part of the frame portion 3002, pads 3009 to which the electrodes 3008 are lead, stationary electrodes 3010, and pads 3011 to which the electrodes 3010 are lead.

In the mirror base, the mirror portion 3001 is implemented as a thin film including a thin SiN (silicon nitride) film and a thin metal film 3012. The frame portion 3002 is formed on the outer edges of the mirror portion 3001 by use of a silicon single crystal. The rib 3003 connects the inner edges of the frame portion 3002 and has the same height as the frame portion 3002.

The metal film 3012 of the mirror portion 3001 and the frame portion 3002 are positioned at opposite sides with respect to the SiN film. The metal film 3012 has sufficient reflectance to light and has its surface opposite to the frame portion 3002 serving as a mirror surface. This allows the entire mirror surface to reflect an incident light beam and thereby obviates a beam loss.

The SiN film has tensile stress as internal stress and therefore insures the flatness of the mirror portion 3001 inclusive of the metal film 3012, particularly the flatness of the mirror surface, thereby insuring a stable beam configuration. If desired, the SiN film may be replaced with any other thin film, e.g., a thin, polycrystalline silicon film so long as it has a tensile stress as an internal stress.

The mirror portion 3001, which is entirely implemented as a thin film, is light weight even when the mirror base is large size. The light weight reduces the moment of inertia and allows the mirror base to oscillate with a large swing angle. Further, the frame portion 3002 and rib 3003 supporting the mirror portion 3001 provide the mirror base with high rigidity and thereby insure a stable beam configuration because of a minimum of deformation of the mirror base during vibration.

The two torsion bars 3004 support the mirror base at the intermediate portions of the outer edges of the frame portion 3002 that face each other. The torsion bars 3004 substantially align with each other on the axis of rotation of the mirror base. When the module is in operation, the mirror base performs torsional vibration about the above axis so as to steer a light beam incident to the mirror surface.

The rib 3003 should preferably be aligned with the torsion bars 3004 and form part of the axis of rotation of the mirror base, so that the mirror base is symmetrical with respect to the axis of rotation during vibration. This stabilizes the axis of rotation, reduces the deformation of the frame portion 3002 in the direction of the torsion bars 3004, reduces unnecessary vibration modes, and thereby insures a stable beam configuration. The torsion bars 3004 are formed integrally with the frame portion 3002 by use of a silicon single crystal in order to have sufficient durability and adequate torsional rigidity. Further, the height, width and length of each torsion bar 3004 are adequately selected in accordance with torsional rigidity such that the resonance frequency of the mirror base has an adequate value.

The resonance frequency f of the mirror base determined by the torsion bars 3004 is produced by the previously stated Eq. (3). Also, the coefficient of torsional elasticity k is produced by the Eq. (4). Further, the moment of inertia I of the mirror base is produced by the Eq. (2). As such equations indicate, when a mirror base sized 1 mm×4 mm and 60 μm thick is supported by torsion bars sized 50 μm×60 μm in section and 500 μm long each, the mirror base resonates with a frequency of about 3 kHz.

The other end of each torsion bar 3004 remote from the frame portion 3002 is connected to one of the support portions 3005. Each torsion bar 3004 and associated support portion 3005 are formed integrally by use of the same silicon. The support portion 3005 is affixed to the frame 3007, which is formed of silicon, via the thermal oxide film 3006. The frame portion 3002, rib 3003, torsion bars 3004 and support portions 3005 all share a single low-resistance silicon substrate. Thin Al films are formed on the surfaces of the support portions 3005, constituting the pads 3009. If the frame portion 3002, rib 3003 and torsion bars 3004 are provided with the same height (thickness), then they can be formed at the same time, reducing the production cost of the mirror chip.

The movable electrodes 3008 are formed at the portions of the frame portion 3002 facing each other in the direction perpendicular to the axis of rotation of the mirror base. The movable electrodes 3008 are configured in the form of comb teeth so as to have a broad area each, so that a drive torque for electrostatically driving the mirror base can be increased. Such a drive force increases the swing angle of the mirror base. The stationary electrodes 3010 each adjoin one of the movable electrodes 3008 at a small gap and are also configured in the form of comb teeth. The teeth of each stationary electrode 3010 and those of the adjoining movable electrode 3008 face each other while alternating with each other. These electrodes 3008 and 3010 facing each other are simple in structure and therefore low cost and can efficiently drive the mirror base. The stationary electrodes 3010 are implemented by a low-resistance silicon substrate and affixed to the frame 3007, which is formed of silicon, via the thermal oxide film 3006. Thin Al films are formed on the surfaces of the stationary electrodes 3010, constituting the pads 3011.

The operation of the vibratory mirror chip shown in FIGS. 35A and 35B will be described with reference to FIGS. 36A through 36D. The movable electrodes 3008 share a single low-resistance silicon substrate with the frame portion, torsion bars and support portions and therefore identical in potential with the pads 3009, FIG. 35A. The stationary electrodes 3010 also implemented by low-resistance silicon substrates are affixed to the frame 3007 via the thermal oxide film 3006 while the pads 3011 are connected to ground. When a voltage is applied to the pads 3009 assigned to the movable electrodes 3008 at the same time, an electrostatic force acts between each movable electrode 3008 and the adjoining stationary electrode 3010. It is to be noted that the pads 3009 may be connected to ground, in which case a voltage will be applied to the pads 3011.

Figure 36A:
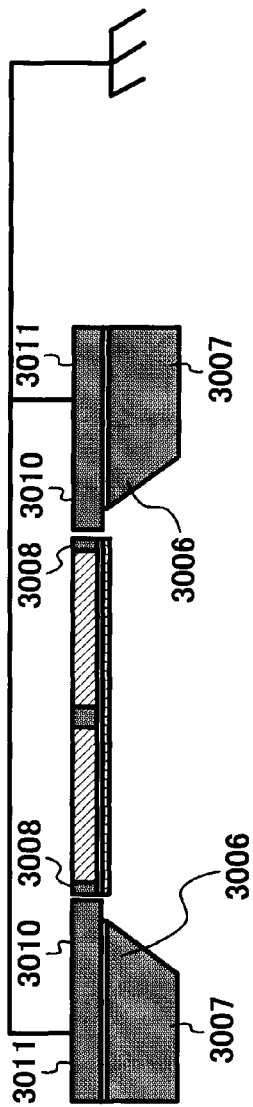
FIGS. 36A through 36D demonstrate the operation of the mirror chip of FIGS. 35A and 35B.

As shown in FIG. 36A, when a voltage is not applied to the pads 3009, the mirror base has initial displacement from a horizontal position due to some asymmetry of its configuration and internal stress although the displacement is as small as several micrometers. Therefore, the movable electrodes 8 and stationary electrodes 3010 are not held stationary with their facing surfaces remaining in parallel, but are slightly displaced from each other in the direction of swing angle.

Figure 36B:
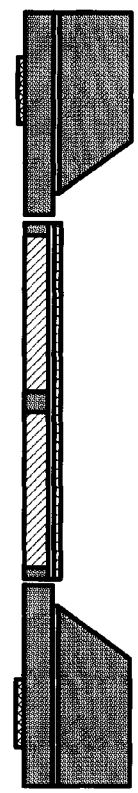

As shown in FIG. 36B, when a voltage is applied to the pads 3009 to cause electrostatic attraction to act between the movable electrodes 3008 and stationary electrodes 3010, the mirror base rotates about the axis of the torsion bars toward its horizontal position while twisting the torsion bars. This causes the facing surfaces of the electrodes 3008 and 3010 to move toward a position where they become parallel to each other.

Figure 36C:
Figure 36D:
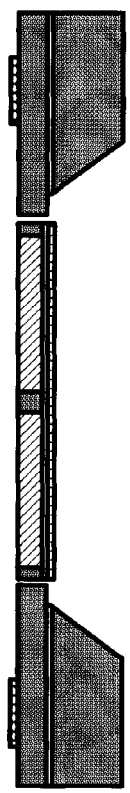

As soon as the mirror base becomes parallel to the stationary electrodes 3010 with the voltage being sequentially raised, the voltage application is interrupted. As a result, as shown in FIG. 36C, the mirror base moves due to its inertia to a position where the torsional rigidity of the torsion bars and the moment of rotation of the mirror base balance with each other. As shown in FIG. 36D, when the voltage is again applied to the pads 3009, the mirror base rotates in the direction opposite to the above direction due to electrostatic attraction acting between the electrodes 3008 and the electrodes 3010 and the torsional rigidity of the torsion bars. As a result, the mirror base again becomes parallel to the stationary electrodes 3010.

By making the drive frequency of the movable electrodes 3008 coincident with the resonance frequency of the torsion bars, it is possible to provide the mirror base with a large swing angle. At this instant, the rib 3003 positioned on the bottom of the mirror portion reduces the deformation of the mirror base, so that abeam reflected by the mirror portion 1 has a stable configuration because it is free from diffused reflection.

Figure 37A:
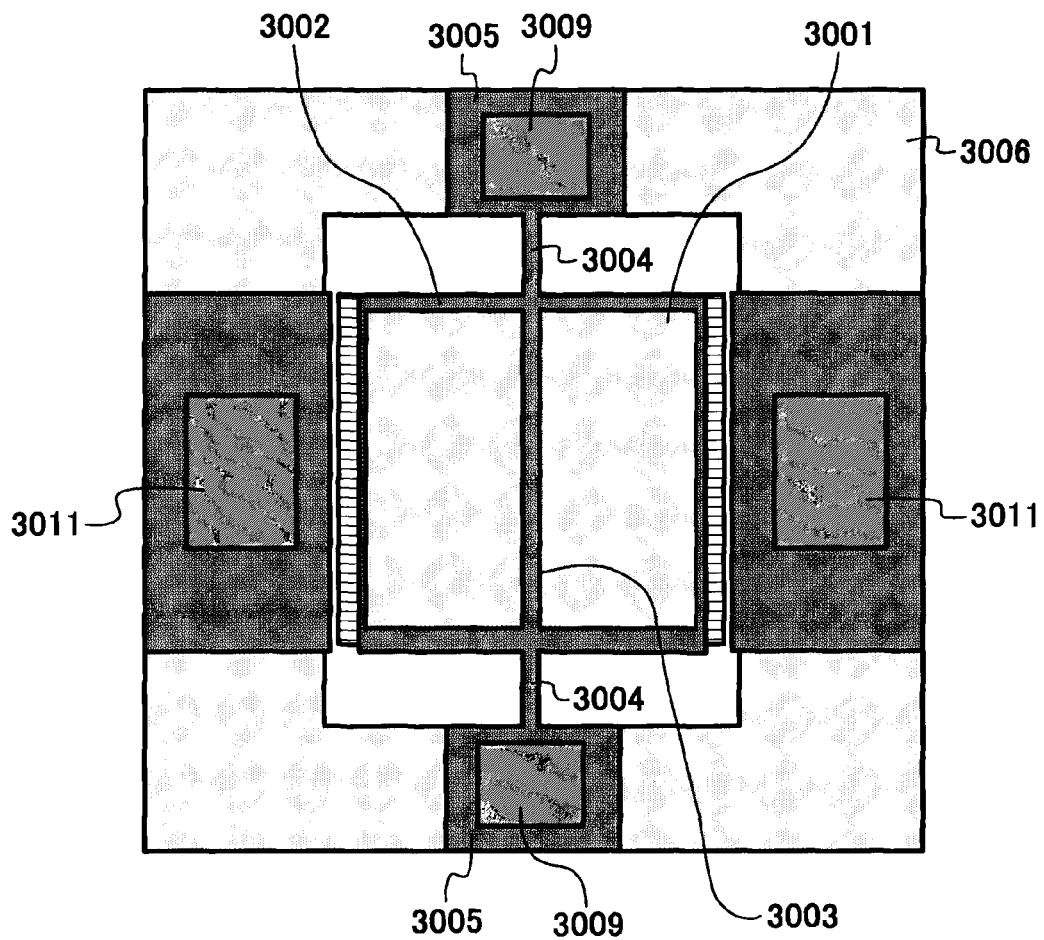
FIGS. 37A and 37B are respectively a plan view and a section showing a second embodiment of the vibratory mirror chip in accordance with the present invention.
Figure 37B:
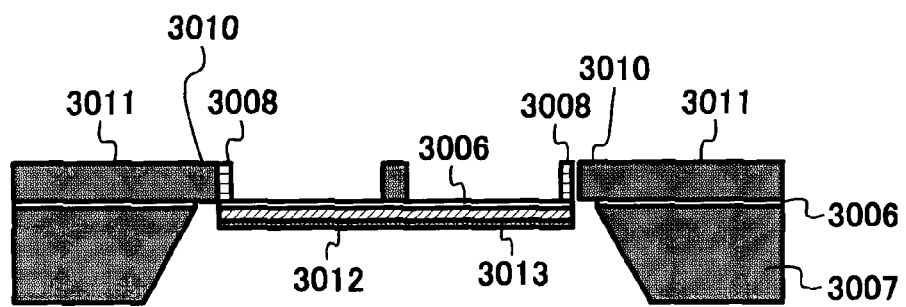

A second embodiment of the vibratory mirror chip in accordance with the present invention will be described with reference to FIGS. 37A and 37B. This embodiment is identical with the first embodiment except for the structure of the mirror portion. In FIGS. 37A and 37B, structural elements identical with the structural elements shown in FIGS. 35A and 35B are designated by identical structural elements and will not be described specifically. As shown, in the mirror portion 3001, is made up of the thermal oxide film 3006 and a thin SiN film 3013. The frame portion 3002 connected to the mirror portion 3001 is implemented by a silicon single crystal.

In the illustrative embodiment, the mirror portion 3001 is a laminate of the thermal oxide film 3006 and SiN film 3013, as stated above. The thermal oxide film 3006 adjoins the side where the frame portion 3002 and rib 3003 are positioned while the SiN film 3013 adjoins the mirror surface side. The thermal oxide film 3006 has a large selective etching ratio and is therefore desirable as an etching stop layer when silicon is etched. However, the thermal oxide film 3006 usually has compressive stress as its internal stress and yields when used alone, preventing the mirror surface from remaining flat. In this respect, the laminate achieves tensile stress as a whole and therefore allows the mirror portion to be designed by selectively using thin films each having a particular function. Further, there can be realized a high performance module whose mirror portion is free to design in structure and production step.

The illustrative embodiment using the thermal oxide film 3006 as an etching stop layer is simple to produce and low cost. A specific production procedure applicable to the illustrative embodiment will be described hereinafter with reference to FIGS. 38A through 38G.

The specific procedure uses an SOI wafer. Let a wafer below the thermal oxide film 3006 and a wafer above the same be referred to as a base wafer 3014 and a bond wafer 3015, respectively. The base wafer 3014 to be used as the frame is a (100) wafer that is 525 µm thick and has medium resistance. The bond wafer 3015 implementing the frame portion, rib, torsion bars, support portions, movable electrodes and stationary electrodes is a (100) waver that is 60 µm thick and low resistance. The thermal oxide film 306 between the two wafers is 500 nm thick. The thickness of the bond wafer 3015 is selected in matching relation to the designed resonance frequency of the mirror base and torsion bars. To produce the SOI wafer, two silicon wafers sufficiently cleaned may be thermally oxidized, brought into contact in a depressurized atmosphere to be temporarily bonded, and then heated at temperature as high as 1,000° C. or above to be firmly bonded. This is followed by polishing the upper wafer to desired thickness.

Figure 38A:
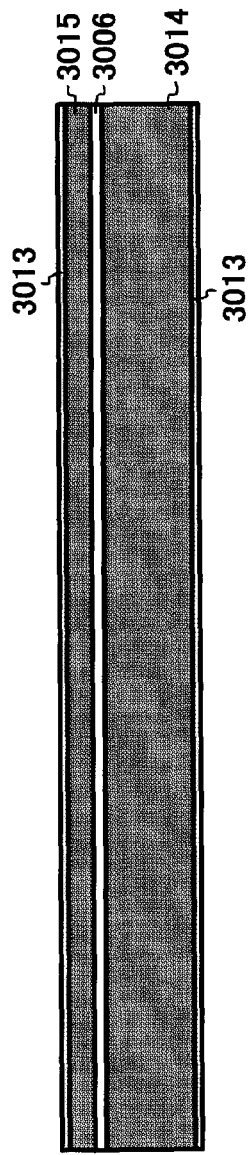
FIGS. 38A through 38G show a specific procedure for producing the mirror chip of the mirror chip shown in FIGS. 37A and 37B.

As shown in FIG. 38A, the 1,000 Å thick, thin SiN film 3013 is formed on both sides of the SOI wafer by LP-CVD (depressurized gas-phase chemical vapor deposition). The SiN film 3013 has sufficient durability as an etching mask when the 525 µm thick base wafer is to be entirely removed by anisotropic etching using a KOH solution. The thermal oxide film 3006 about 1 µm thick and generally used for anisotropic etching has higher etching rate than the SiN film 3013 and is not feasible as a mask in the even of deep silicon etching.

Subsequently, the SiN film 3013 is patterned via a resist mask by dry etching so as to remove the regions corresponding to the mirror portion 3001 and torsion bars. At this instant, the (100) silicon wafer is etched at an angle inclined by 54.7° from the surface of the etching mask where the SiN film 3013 is present. It is therefore necessary to design the pattern of the etching mask in consideration of the fact that the regions of the bond wafer to be left are positioned inward of the mask pattern.

Figure 38B:
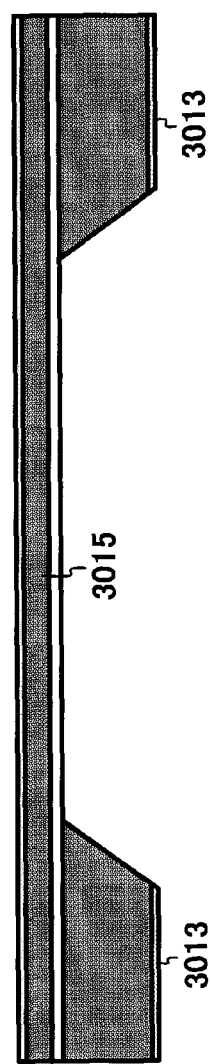

Subsequently, as shown in FIG. 38B, the base wafer 3014 is etched out to the thermal oxide film 3006 via the patterned SiN film or etching mask 3013 by anisotropic etching using a 30 mass percent of KOH solution, which is heated to 85° C. At this instant, the thermal oxide film 3006 plays the role of an etching stop layer because of its low etching rate. As a result, a silicon diaphragm 3016 is formed by the 60 µm thick bond wafer 3015 with the base wafer 3014 constituting the frame 3007. In the steps to follow, the mirror base, torsion bars and comb-like electrodes are formed in the silicon diaphragm 3016.

Figure 38C:
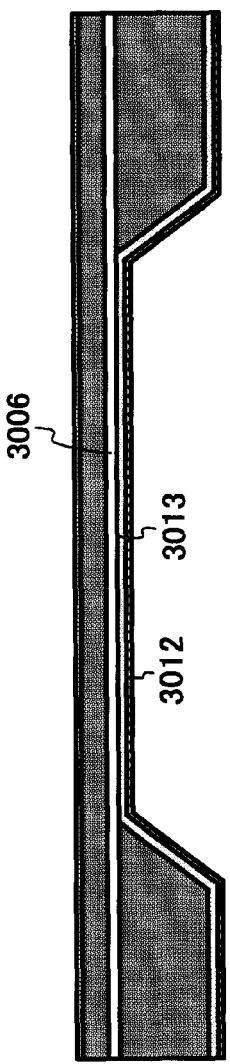

As shown in FIG. 38C, the 1,000 Å thick SiN film 3013 is again formed by LP-CVD, and then 1,000 Å Al film is formed by sputtering as a mirror surface. The thermal oxide film 3006 yields when used alone, as stated earlier. Also, a thin metal film formed by sputtering has compressive stress. In light of this, the SiN film 3013 and thermal oxide film 3006 are laminated together, so that the tensile stress of the film 3013 cancels the compressive stress of the films 3006 and 3012. Consequently, the entire laminate made up of the SiN film 3013, thermal oxide film 3006 and metal film 3012 has tensile stress as its internal stress. Stated another way, the SiN layer 3013 plays the role of a stress control film and allows the stress of the entire laminate to be easily controlled. Al applied to the metal film 3012 may be replaced with any other metal, e.g., Au so long as it has sufficient reflectance to a laser beam. Sputtering may, of course, be replaced with vacuum deposition, ion plating or any other similar technology.

Figure 38D:
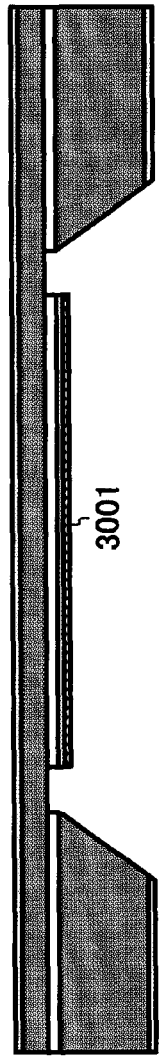

As shown in FIG. 38D, a resist is patterned on the portion of the bond wafer 3015 where the mirror 3001 is to be formed. Subsequently, the SiN film 3013, thermal oxide film 3006 and metal film 3012 are removed by dry etching via the above resist except for the portions of the bond wafer 3015 where the mirror portion 3001 is to be formed. As a result, the mirror portion 3001 made up of the siN film 3013, thermal oxide film 3006 and Al film 3012 is produced.

Figure 38E:
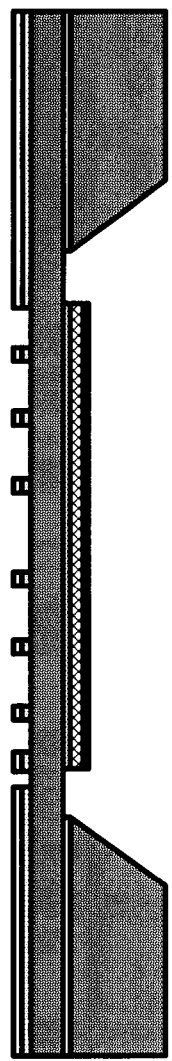

As shown in FIG. 38E, the SiN film 3013 present on the other side of the bond wafer is patterned by dry etching via a resist mask for thereby forming the frame portion, rib, torsion bars and small gaps.

Figure 38F:
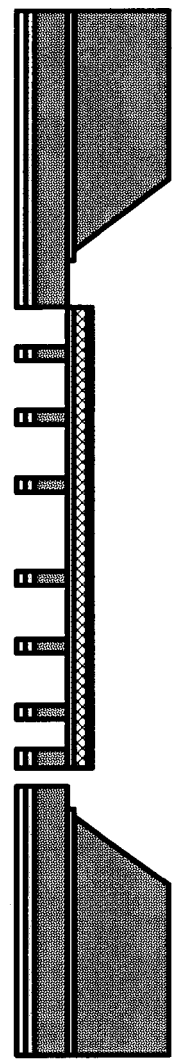

As shown in FIG. 38F, the mirror base and silicon surrounding it are etched through via a resist/SiN film or mask by a dry etching device featuring high etching speed and high anisotropy. At this instant, the etching of the mirror base stops at the thermal oxide film 3006 in the mirror portion of FIG. 38D.

Figure 38G:
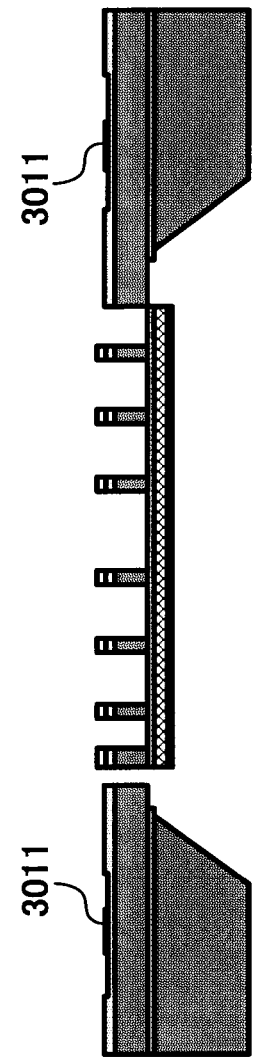

Finally, as shown in FIG. 38G, the surfaces of the two stationary electrodes are partly removed via the SiN film or mask 3013 by dry etching, so that the silicon substrate is exposed to the outside. Subsequently, a thin Al film is formed on the exposed surface of the silicon substrate via a mask by sputtering and then at 400° C. in order to lower resistance between the stationary electrodes and the substrate. As a result, the pads 3009 and 3011 are formed. If desired, Al may be replaced with any other suitable metal, e.g., Au or Ti so long as it closely contacts to silicon. Also, sputtering may be replaced with vacuum deposition, ion plating or similar conventional technology.

Figure 39A:
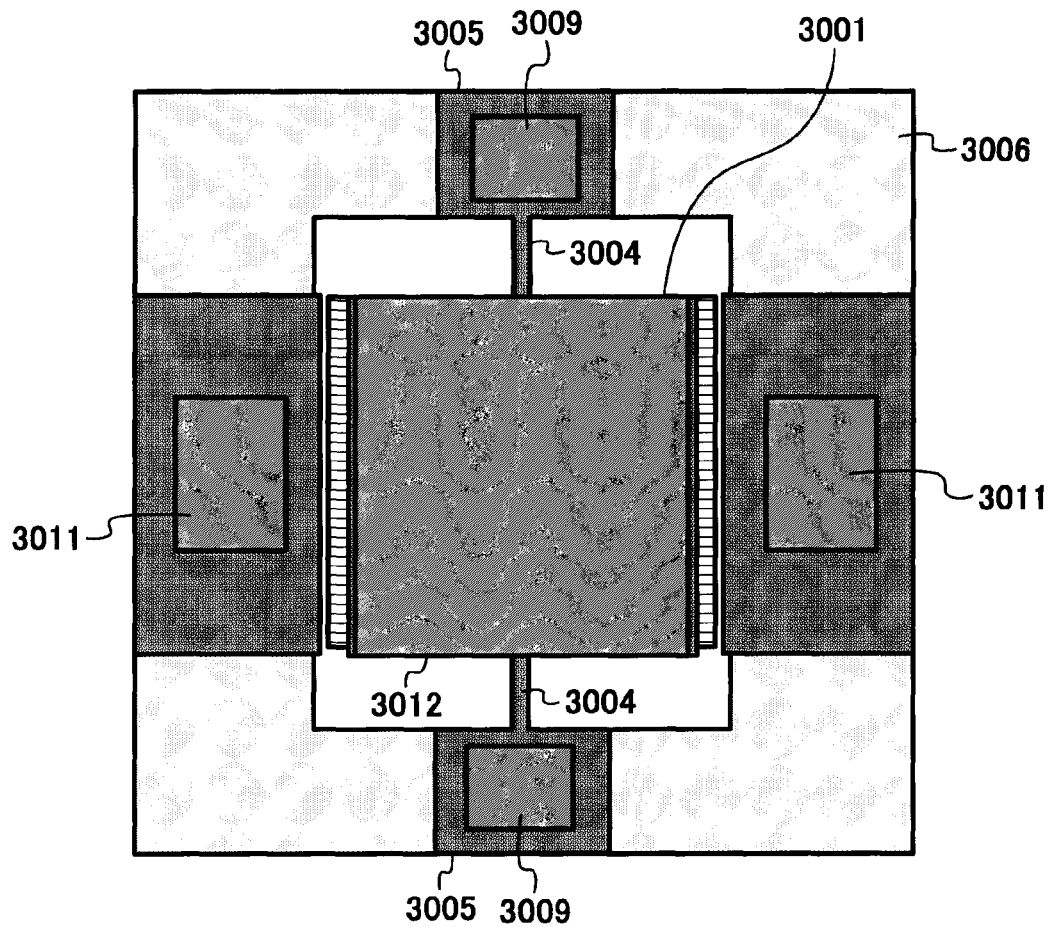
FIGS. 39A and 39B are respectively a plan view and a section showing a third embodiment of the vibratory mirror chip in accordance with the present invention.
Figure 39B:
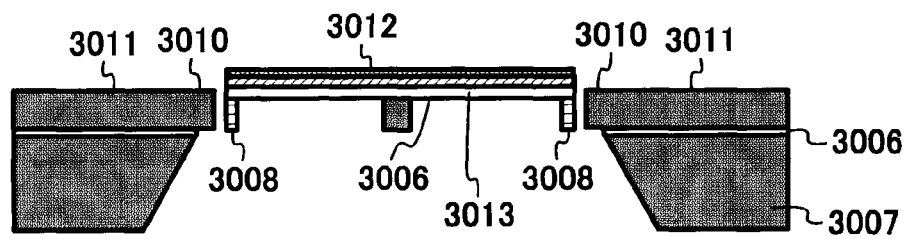

FIGS. 39A and 39B show a third embodiment of the vibratory mirror chip in accordance with the present invention. This embodiment is identical with the second embodiment except for the structure of the mirror portion. In FIGS. 39A and 39B, structural elements identical with the structural elements shown in FIGS. 37A and 37B are designated by identical reference numerals and will not be described specifically in order to avoid redundancy. While the fifteenth embodiment has the mirror portion 3001 formed on the side of the mirror base adjoining the frame 3007, the illustrative embodiment has it formed on the other side of the mirror base. A basic production procedure is identical with the procedure of the fifteenth embodiment and will not described specifically. The illustrative embodiment has an advantage that the mirror portion 3001 has no structural elements above the mirror surface, promoting free optical design.

Figure 40:
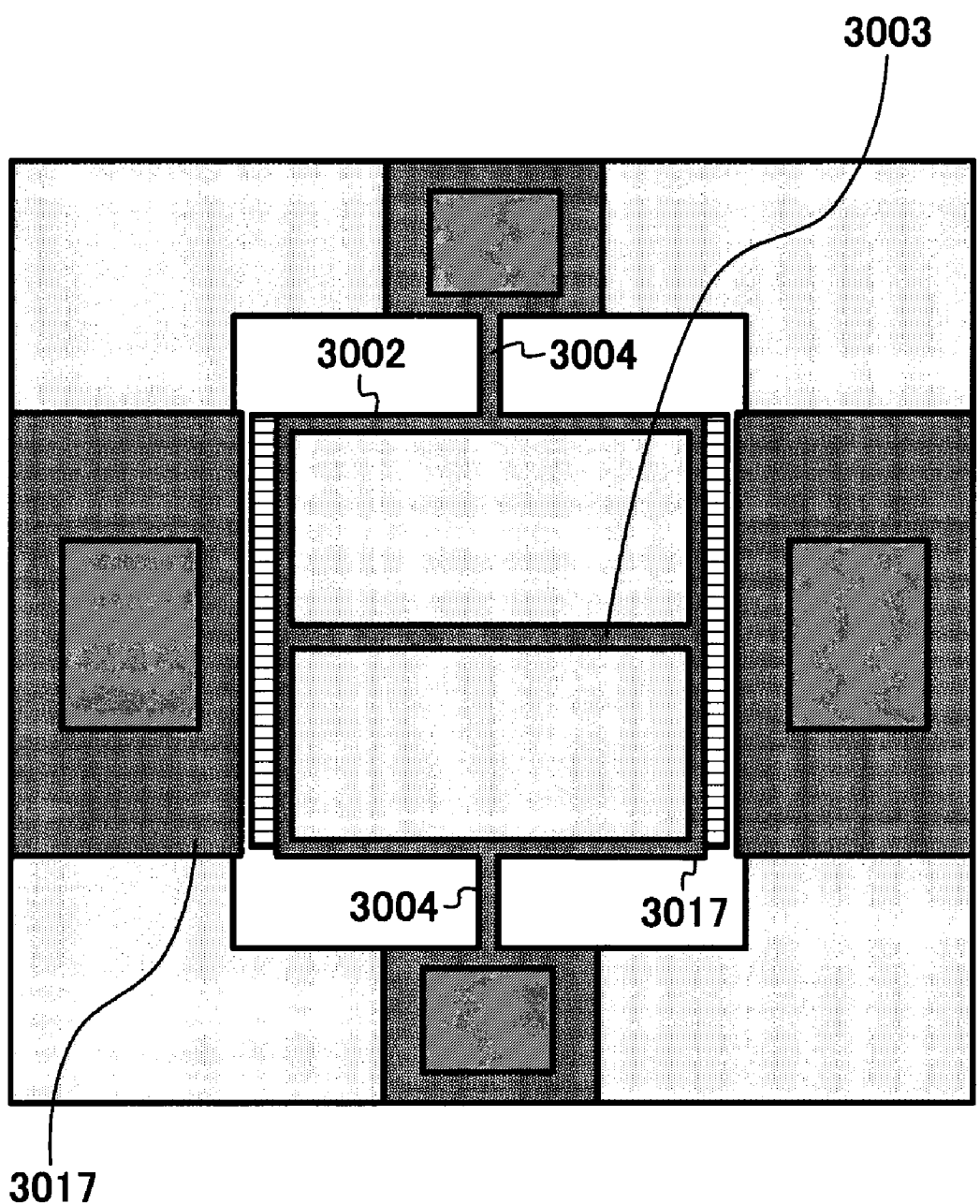
FIG. 40 is a plan view showing a fourth embodiment of the vibratory mirror chip in accordance with the present invention.

FIG. 40 shows a fourth embodiment of the vibratory mirror chip in accordance with the present invention identical with the third embodiment except for the configuration of the rib 3003 for reinforcement. As shown, in the illustrative embodiment, the rib 3003 extends substantially perpendicularly to the axis of the torsion bars 3004 and connects the intermediate portions of the portions of the frame portion 3002 where movable electrodes 3017 are present. The rib 3003 supports the movable electrodes 3017 during the vibration of the mirror base to thereby reduce the deformation of the mirror surface in the direction of rotation, so that a stable beam configuration is insured.

Figure 41:
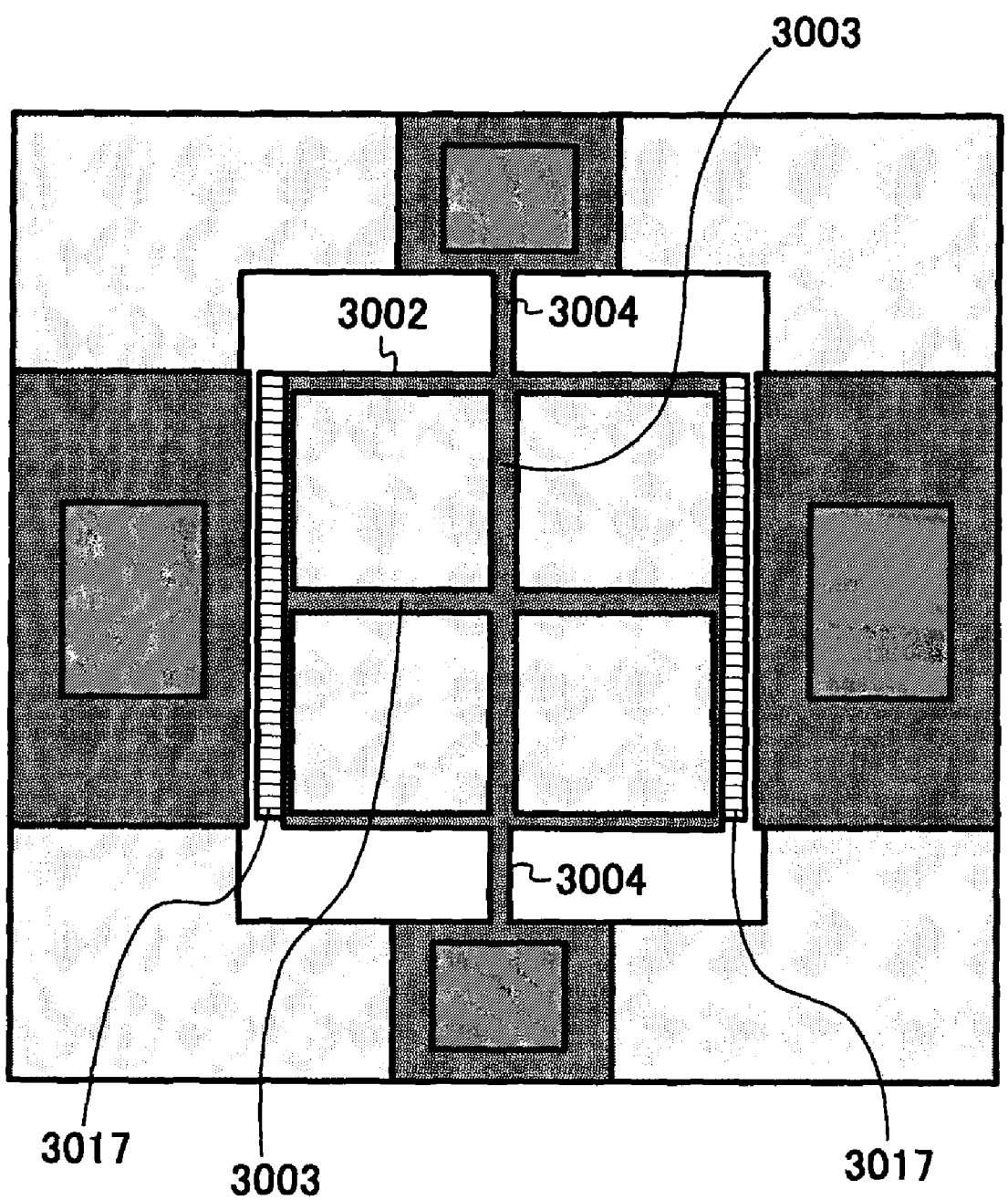
FIG. 41 is a plan view showing a fifth embodiment of the vibratory mirror chip in accordance with the present invention.

FIG. 41 shows a fifth embodiment of the vibratory mirror chip in accordance with the present invention. As shown, the mirror base has both of the rib 3003 of FIGS. 37A and 37B and the rib 3003 of FIG. 40. The ribs 3003 may be inclined relative to the axis of the torsion bars 3004 so long as they are symmetrical with respect to the axis of rotation, i.e., the axis of the torsion bars 3004. The ribs 3003 evenly reduce the deformation of the entire mirror portion during operation and insure a stable beam configuration.

Figure 42:
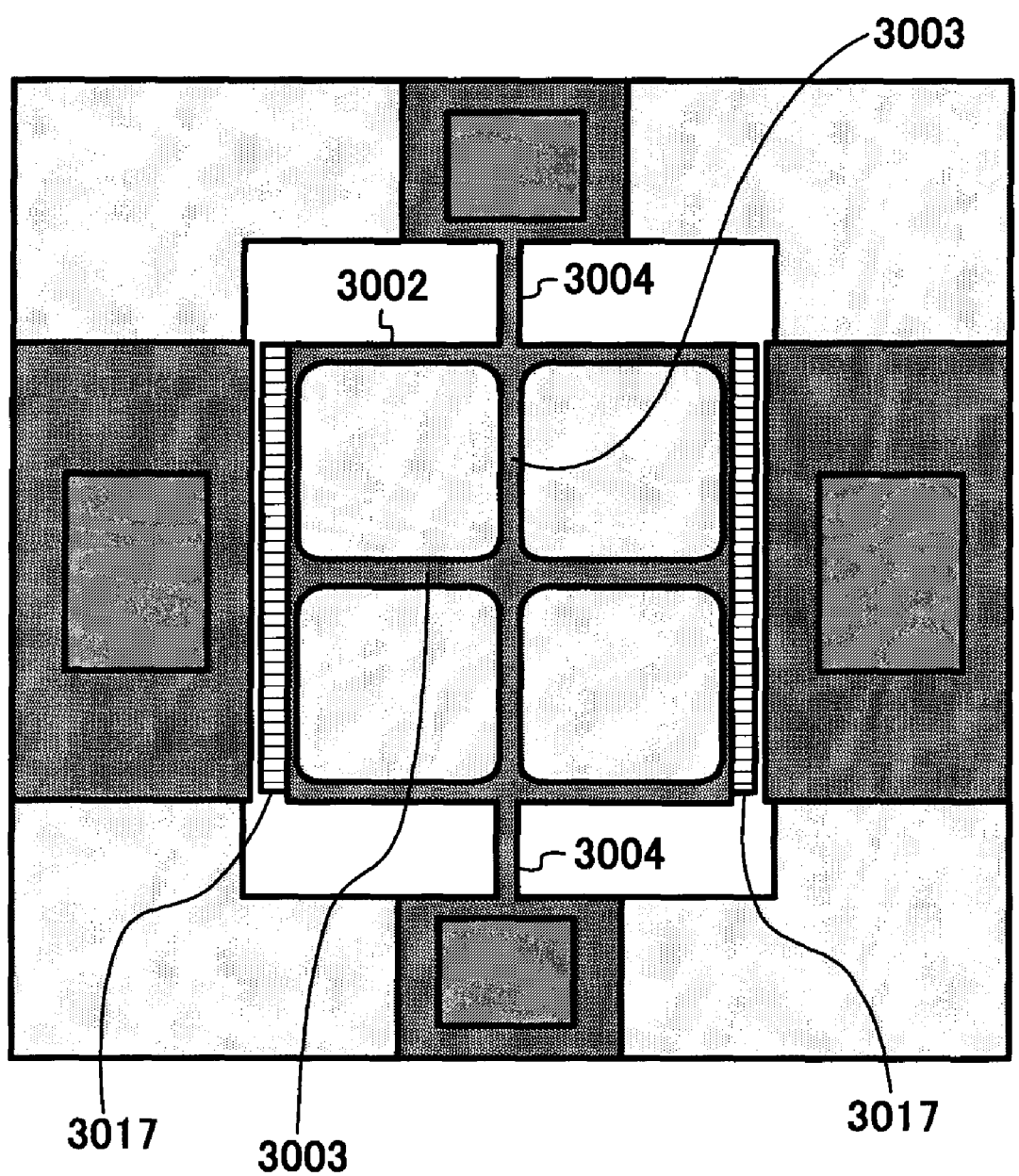
FIG. 42 is a plan view showing a sixth embodiment of the vibratory mirror chip in accordance with the present invention.

FIG. 42 shows a sixth embodiment of the vibratory mirror chip in accordance with the present invention. As shown, this embodiment is identical with the fifth embodiment except that the corners of the frame portion 3002, the portions where the frame portion 3002 and ribs 3003 join each other or the portions where the ribs 3003 join each other each are provided with curvature. The curvature prevents stress from concentrating on such corners to thereby protect the mirror base from damage during the operation or the handling of the mirror chip.

Figure 43:
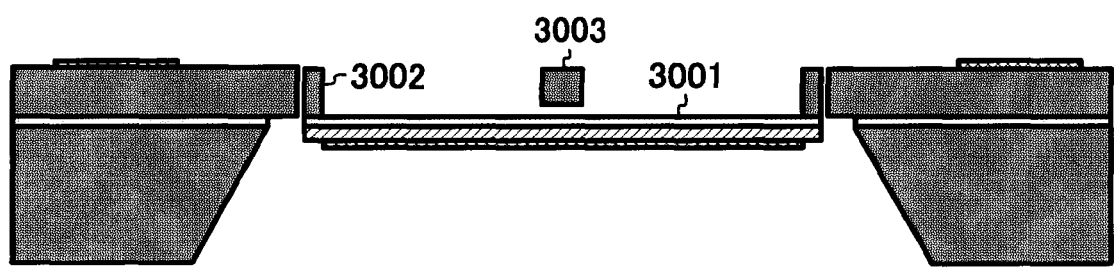
FIG. 43 is a section showing a seventh embodiment of the vibratory mirror chip in accordance with the present invention.

FIG. 43 shows a seventh embodiment of the vibratory mirror chip in accordance with the present invention. This embodiment is identical with the third embodiment except for the configuration of the rib 3003. In the third embodiment, the rib 3003 is identical in height as the frame portion 3002, so that the frame portion 3002 and rib 3003 both are bonded to the reverse surface of the mirror portion 3001. By contrast, in the illustrative embodiment, the rib 3003 is lower in height or thickness than the frame portion 3002 and spaced from the mirror portion 3001. Such a rib 3003 provides the frame portion 3002 with sufficient rigidity. Further, because the mirror portion 3001 is independent of the rib 3003 over its substantially entire area, the mirror portion is substantially free from distortion and therefore maintains the mirror portion flat.

Figure 44:
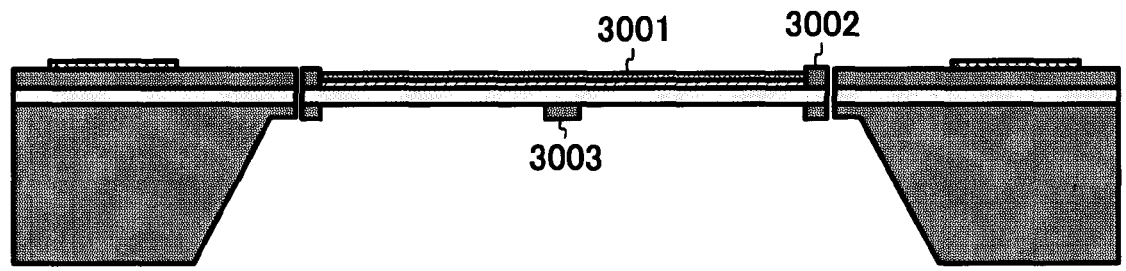
FIG. 44 is a section showing an eighth embodiment of the vibratory mirror chip in accordance with the present invention.

FIG. 44 shows an eighth embodiment of the vibratory mirror chip in accordance with the present invention. As shown, the mirror portion 3001 is positioned at substantially the center of the height of the frame portion 3002, i.e., the former has a height about one-half of the height of the latter. The frame portion 3002 has the same height as the torsion bars 3004. Therefore, in the previous embodiments, the center of the mirror portion 3001 is spaced by a distance that is one-half of the height of the frame portion 3002. By contrast, in the illustrative embodiment, the axis of the torsion bars is coincident with the mirror portion, causing the mirror portion to rotate about the axis of rotation lying in the mirror portion. This facilitates optical design.

Figure 45:
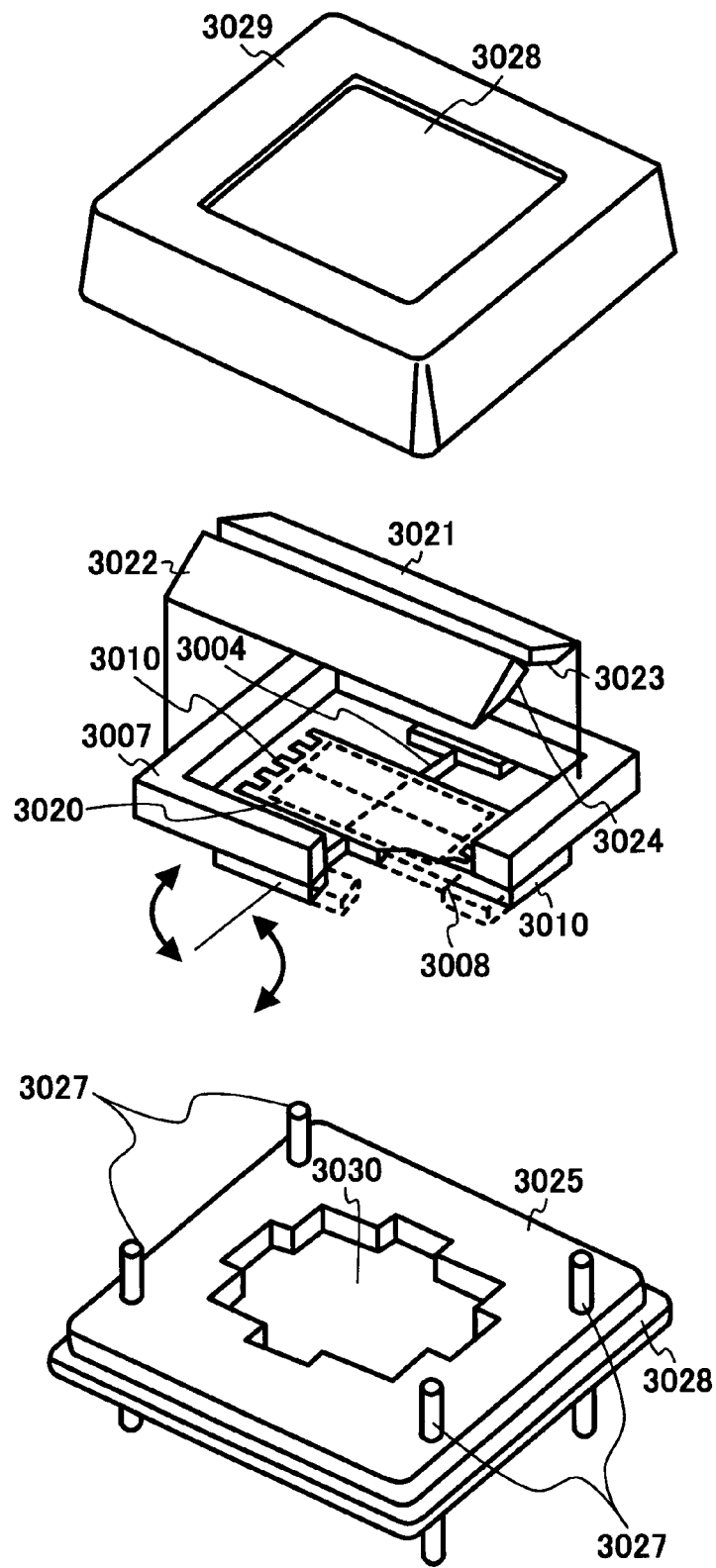
FIG. 45 is an exploded isometric view showing a third embodiment of the optical scanning module in accordance with the present invention.

Referring to FIG. 45, a third embodiment of the optical scanning module in accordance with the present invention will be described. This embodiment is similar to the first embodiment except for the following. As shown, the module includes a mirror base 3020 implemented as a 60 μm thick silicon substrate. The silicon substrate is etched through such that a mirror portion and torsion bars 3004 supporting it are separate from a frame. Comb-shaped movable electrodes 3008 are formed at opposite ends of the mirror portion positioned at opposite sides of torsion bars 3004 while stationary electrodes 3010 are formed at opposite edges of the frame as in the first embodiment, FIG. 1. Ribs are formed on the bottom of the mirror portion. The mirror portion is etched to a depth of 5 μm from the bottom in order to reduce the weight of the mirror base 3020.

In the illustrative embodiment, the clearance or gap between the movable electrode and stationary electrode facing each other is 4 μm, the torsion bars are 60 μm wide each, and the mirror diameter is 4×2 mm. In this condition, the mirror portion vibrates at a frequency of 2.5 kHz. The frame is implemented as a 525 μm thick silicon substrate and connected to the mirror base via an insulation film. The center portion of the frame is removed through to allow a person to see the mirror substrate 3020.

A first reflector 3021 and a second reflector 3022 are bonded to the frame and face each other with the intermediary of a fine gap through which an optical beam is to be passed. The first reflector 3021 and second reflector 3022 are respectively inclined by about 26° and 9° relative to a plane in which the frame and mirror base 3020 are bonded together, constituting a roof-like mirror pair. The reflectors 3021 and 3022 are implemented by silicon substrates having a slice angle inclined by 9° from crystal face orientations (110) and (111), respectively. Each reflector 3021 or 3022 is etched to expose a (111) face and bonded to the mirror chip and frame at the (111) face.

A bottom plate 3026 and a seat 3025 formed with a rectangular hole 3030 are integrally formed of sintered metal, e.g., iron, constituting a support base. A plurality of terminals 3027 extend throughout the support base with the intermediary of an insulator. The frame 3007 superposed on the mirror base 3020 is bonded to the seat 3025. The rectangular hole 3030 forms a space in which the mirror base 3020 is reciprocatingly vibrates. Pads for leading out the electrodes are connected to the tops of the terminals 3027 by wire bonding. The module is mounted on a printed circuit board, not shown, with the bottom of the bottom plate 3026 contacting the circuit board. The bottoms of the terminals 3027 are inserted in through holes formed in the circuit board and soldered to the circuit board.

A cover 3029 is fitted on the edges of the seat 3025 and formed with a window 3028 for passing a light beam. The inside of such a module is filled with an inactive gas and hermetically sealed. If use is made of an inactive gas with low viscous resistance or if the inside of the assembly is depressurized, then it is possible to cause the mirror base 3020 to vibrate with a light load acting thereon and therefor to provide the mirror base 3020 with a large swing angle.

Figure 46:
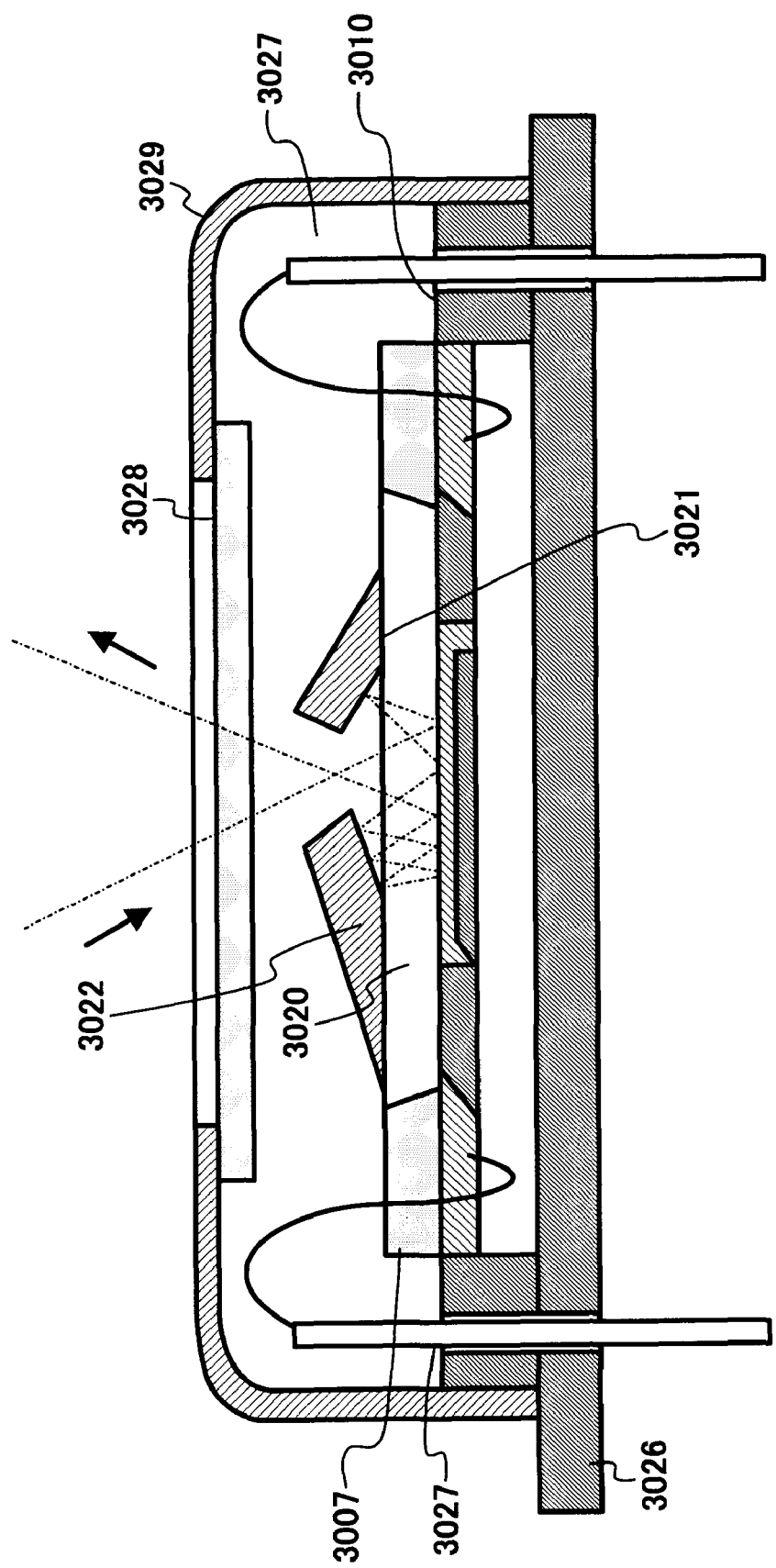
FIG. 46 is a section of the module shown in FIG. 45.

FIG. 46 shows the optical scanning module described above in a section. As shown, a light beam is incident to the mirror base 3020 via the window 3028 and the gap between the reflectors 3021 and 3022. At this instant, the light beam is inclined by about 20° relative to a line normal to the mounting surface in a plane perpendicular to the mounting surface and including the axis of rotation of the mirror base 3020 (vertical scanning section). The light beam steered by the mirror surface of the mirror base 3020 is reflected by the surface 3023 of the first reflector 3021, again reflected by the mirror surface of the mirror substrate 3020, and then reflected by the surface 3024 of the second reflector 3022. Subsequently, the light beam is repeatedly reflected between the surface 2040 of the second reflector 3022 and the mirror surface of the mirror base 3020 in the vertical scanning section (three times in FIG. 46). The light beam is then passed through the gap between the reflectors 3021 and 3022 at an angle of about 40° relative to the incident light beam, i.e., 20° relative to the line normal to the mounting surface to the opposite side to the incident light beam.

As stated above, the light beam is repeatedly reflected by the mirror surface of the mirror base 3020 and thereby steered by a large angle despite that the swing angle of the mirror base 3020 is small. More specifically, when the mirror surface of the mirror base 3020 tilts due to rotation, the light beam is repeatedly reflected in the direction perpendicular to the axis of rotation, the reflection angle increases every time the light beam is reflected. Assume that the mirror surface of the mirror base 3020 reflects the light beam N times in total, and that the swing angle of the mirror base 3020 is $\alpha$. Then, the angle of the output light beam or scanning angle $\theta$ is $2N\alpha$ and increases with an increase in the number of times of reflection. In the illustrative embodiment, a scanning angle of 50° is achievable for a swing angle of ±5° because the mirror surface of the mirror base 3020 reflects the light beam five times in total.

Figure 47:
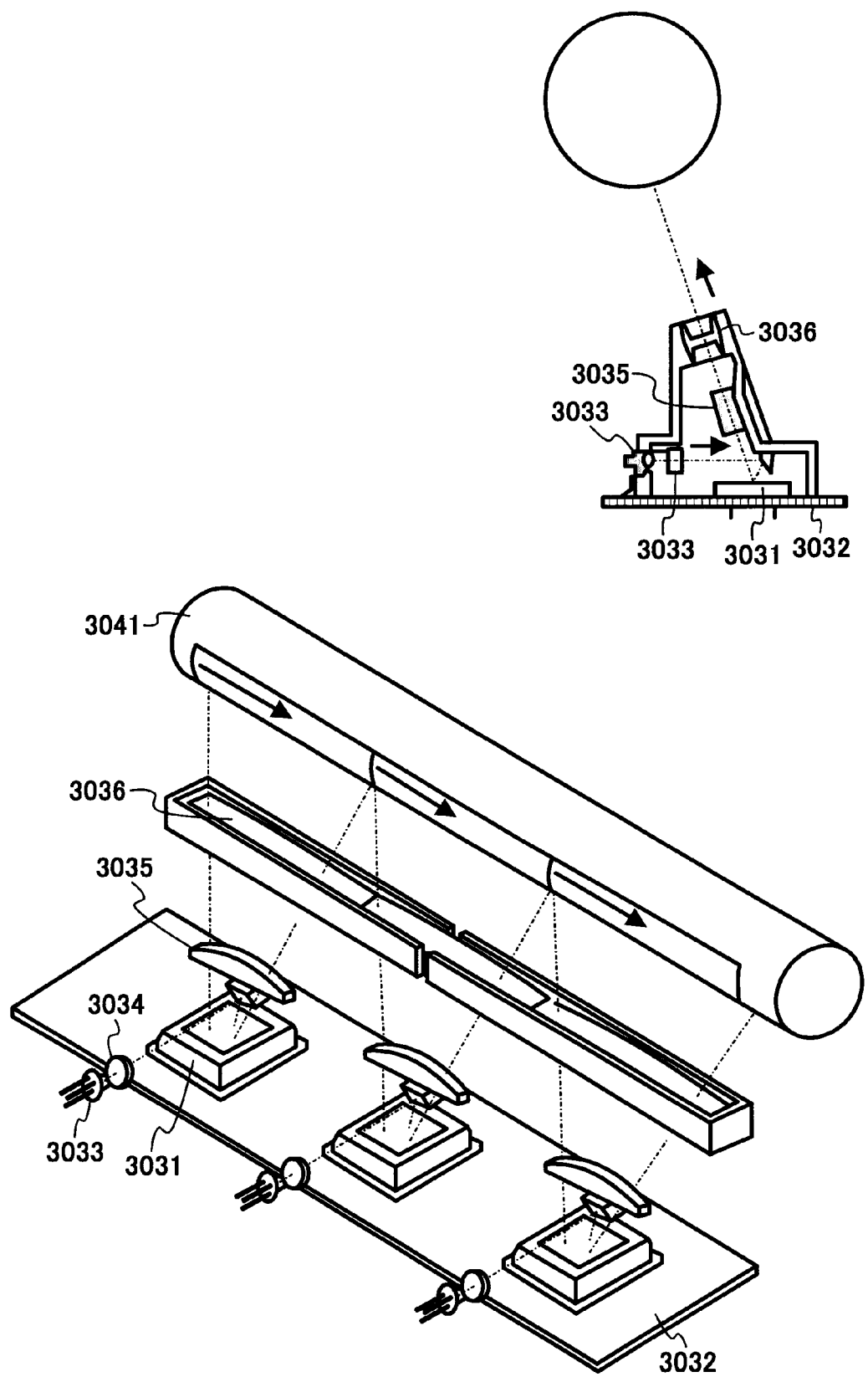
FIG. 47 shows a specific configuration of an optical scanning device using the module of FIG. 45.

FIG. 47 shows a specific configuration of an optical scanning device using the optical scanning module described above. As shown, the scanning device includes a printed circuit board 3032 on which a laser driver and a mirror base driver are formed. Three scanning modules 3031 are arranged on the circuit board 3032 in an array in the direction in which a laser beam is steered. A sensor, not shown, adjoins the scanning start side of each module 3031. Scanning optics includes semiconductor lasers 3033, coupling lenses 3034, and first lenses 3035 and second lenses 3036. Each first lens 3035 and associated second lens 3036 are accommodated in a casing such that their optical axes align with each other in the vertical scanning section containing the axis of rotation of the associated mirror substrate and such that their side faces are parallel to a surface to be scanned. The semiconductor laser 3033 is implemented as a general-purpose laser device including a light source and a monitor photodiode and having a lead terminal connected to the circuit board 3032 by a flexible cable. A circuit for controlling the modulation of the lasers 3033, a circuit for applying drive pulse voltages to the stationary electrodes of the mirror chips and other circuits are also mounted on the circuit board 3032.

In operation, a laser beam issuing from each semiconductor laser 3033 is incident to the associated coupling lens 3034, which has a non-spherical first phase symmetrical with respect to the optical axis and a cylindrical second surface curved in the vertical scanning direction. The coupling lens 3034 converts the incident laser beam to a substantially parallel beam in the scanning direction and a converging beam, which converts on the mirror surface of the mirror base, in the direction perpendicular to the scanning direction. The laser beam is then incident to the optical scanning module and reflected thereby, as stated earlier. The optics focuses the laser beam output from the module on the surface to be scanned, thereby recording an image. A synchronization mirror, not shown, adjoins each second lens 3036 and reflects the light beam at the scanning start side. A sensor senses the angular displacement of the mirror surface of the module in accordance with the light beam reflected by the synchronization mirror, outputting a synchronization signal. An LD driver, not shown, feeds a modulated signal, i.e., a pulse train entraining image data to the semiconductor laser 3033 in response to the synchronization signal. The pulse train has a frequency varying within single scanning with the elapse of time.

The mirror portion of the module should preferably have a mirror surface positioned at the side opposite to the side where the frame is connected. In addition, the mirror surface should preferably reflect the light beam at portions to which the frame or the rib for reinforcement is not connected. Such a configuration frees the mirror surface from distortion and allows it to reflect at highly flat portion thereof, insuring a stable beam configuration.

Figure 48:
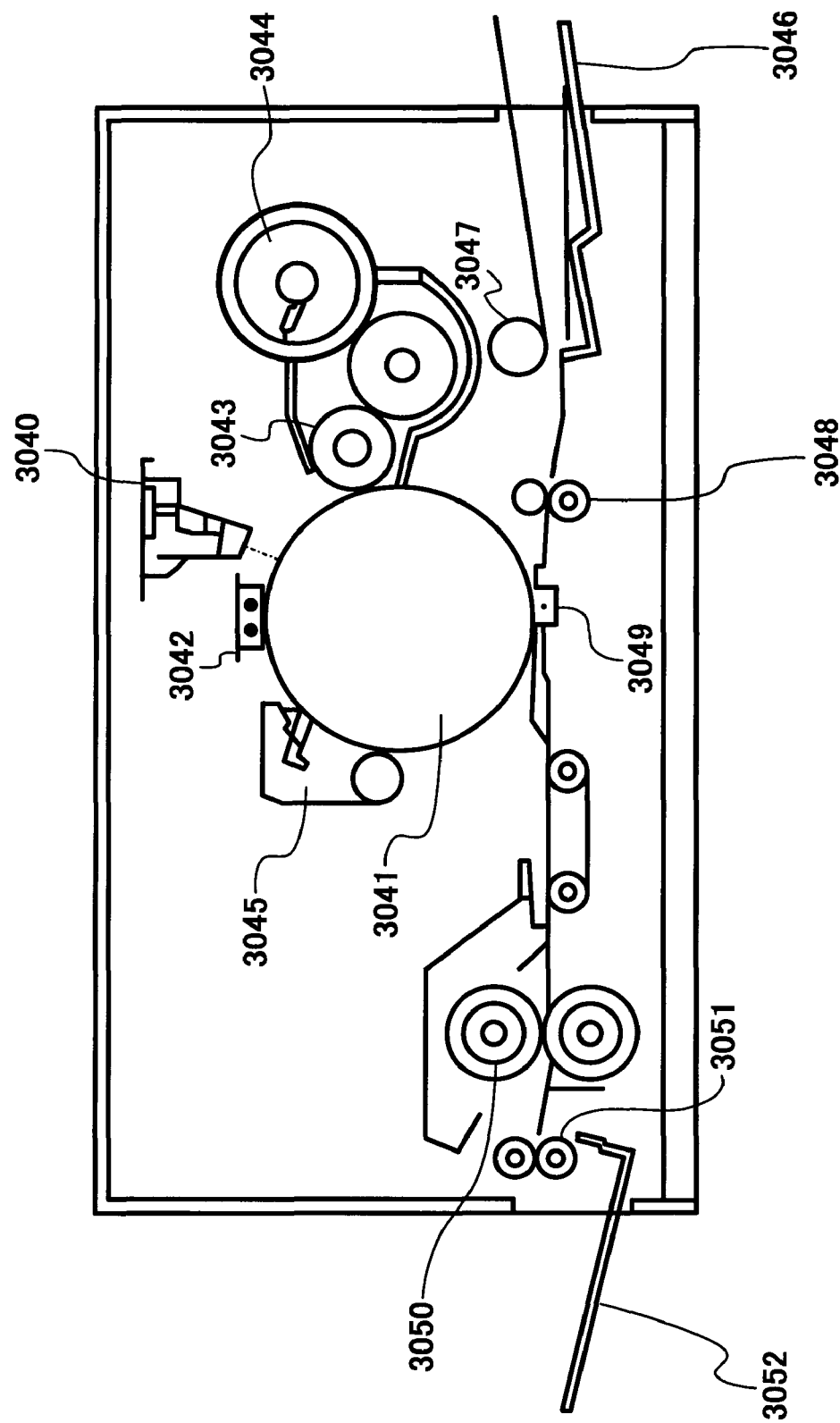
FIG. 48 shows a specific configuration of an image forming apparatus using the optical scanning device of FIG. 47.

FIG. 48 shows a specific configuration of an image forming apparatus using the optical scanning device described above. As shown, the image forming apparatus includes a photoconductive drum 3041 whose surface is to be scanned. Arranged around the drum 3041 are a charger 3042, an optical scanning device 3040, a developing roller 3042, a toner cartridge 3044 storing toner, and a cleaning case 3045. After the surface of the drum 3041 has been uniformly charged by the charger 3042, the optical scanning device 3040 scans the surface of the drum 3041 in accordance with image data to thereby form a latent image. The developing roller 3043 develops the latent image with toner to thereby form a corresponding toner image. A sheet or recording medium is fed from a sheet tray 3046 by a pickup roller 3047 to a registration roller pair 3048. The registration roller pair 3048 drives the sheet in synchronism with the start of recording in the subscanning direction. A transfer charger 49 transfers the toner image from the drum 3041 to the sheet. A fixing roller 3050 fixes the toner image formed on the drum 3041. The sheet or print is then driven out to a print tray 3052 by an outlet roller pair 3051.

In summary, the embodiments described with reference to FIGS. 16A through 48 achieve various unprecedented advantages, as enumerated below.

(1) A mirror base deforms little even when it is large size or thick, and therefore maintains its mirror surface flat, allowing a light beam to scan a desired surface with a stable configuration and a stable focus.

(2) The entire mirror surface can be used for reflection and cope with various beam configurations.

(3) Portions of the mirror base remote from torsion bars, which are likely to deform more than the other portion, are effectively prevented from deforming with the moment of inertial of the mirror base being reduced as far as possible. In addition, a rib for reinforcement can be easily formed integrally with the mirror substrate by a semiconductor process.

(4) The torsional deformation of the mirror base can be effectively reduced for further stabilizing the beam configuration.

(5) The torsion bars and mirror base can be firmly connected together, enhancing reliability.

(6) The area of each movable electrode can be increased to lower a voltage necessary for driving the mirror base.

(7) Support portions and a movable portion are formed integrally with each other and therefore high in mechanical strength and durability. The rib reduces the weight of the mirror base while insuring rigidity, so that the flat portion of the mirror base does not distort not only when it is stationary but also when it is vibrating. This also insures a stable beam configuration.

(8) A rib extending along the edges of the mirror base effectively reduces the deformation of the mirror base during vibration in the direction perpendicular to the torsion bars and the direction parallel to the same. Further, a rib aligned with the torsion bars and extending over the entire mirror base enhances the positional accuracy of the axis of vibration, insuring a stable beam configuration.

(9) A rib extends in the direction in which an inertial force has great influence to thereby further effectively reduce the deformation of the mirror base. Such a rib has the shortest possible length and prevents the weight of the mirror base from increasing, so that a decrease in the swing angle of the mirror base is minimized.

(10) The center of gravity of the mirror base is positioned on the axis of rotation and allows the mirror base to stably vibrate. This, coupled with a minimum of deformation in the direction of torsion bars, insures a stable beam configuration.

(11) The concentration of stress ascribable to the deformation of the mirror base in vibration is reduced to thereby reduce cracks. This successfully increases durability.

(12) The beam is free from dislocation when the mirror base is in vibration, and can therefore accurately scan a desired surface.

(13) Each electrode can be provided with a broad area, so that a larger electrostatic torque is achievable without resorting to a higher drive voltage and increases the swing angle of the mirror base.

(14) Structural materials have a minimum of defects and are therefore reliable, durable, and easy to process and therefore low cost.

(15) The space in which the mirror base vibrates has low viscous resistance and provides the mirror base with a large swing angle with a small drive torque.

(16) Power consumption and noise are reduced, compared to a conventional polygonal mirror.

Various modifications will become possible for those skilled in the art after receiving the teachings of the present disclosure without departing from the scope thereof.

What is claimed is:

1. An optical scanning device, comprising:
a mirror base supported by torsion bars and configured to reciprocatingly vibrate about an axis comprised by said torsion bars,
said torsion bars, said mirror base and a frame portion that supports said mirror base and that connects said torsion bars being formed integrally with each other,
said mirror base including a rib identical in thickness with said torsion bars and a thin portion smaller in thickness than said torsion bars, said torsion bars intersecting the frame portion in respective recesses in the frame portion,
wherein said mirror base comprises a first rib extending throughout said mirror base in alignment with said torsion bars and a second rib surrounding said mirror base; and
corners between said first rib and said second rib are provided with curvature.

2. The device as claimed in claim 1, wherein said mirror base further comprises a third rib extending between facing portions of said second rib while intersecting said first rib.

3. The device as claimed in claim 2, wherein said third rib extends perpendicularly to said first rib.

4. The device as claimed in claim 1, wherein said mirror base comprises a plurality of ribs arranged in a lattice configuration.

5. The device as claimed in claim 4, wherein said ribs are arranged such that a center of gravity of said mirror base is positioned on said first rib.

6. The device as claimed in claim 4, wherein said ribs are arranged such that a center of gravity of said mirror base coincides with a center of said first rib.

7. An optical scanning device, comprising:
a mirror base supported by torsion bars and configured to reciprocatingly vibrate about an axis comprised by said torsion bars,
said torsion bars, said mirror base and a frame portion that supports said mirror base and that connects said torsion bars being formed integrally with each other,
said mirror base including a rib identical in thickness with said torsion bars and a thin portion smaller in thickness than said torsion bars, said torsion bars intersecting the frame portion in respective recesses in the frame portion,
wherein said mirror base comprises a first rib extending throughout said mirror base in alignment with said torsion bars and a second rib surrounding said mirror base; and
portions where said torsion bars and said second rib intersect each other are provided with curvature.

8. An optical scanning device, comprising:
a mirror base supported by torsion bars and configured to reciprocatingly vibrate about an axis comprised by said torsion bars,
said torsion bars, said mirror base and a frame portion that supports said mirror base and that connects said torsion bars being formed integrally with each other,
said mirror base including a rib identical in thickness with said torsion bars and a thin portion smaller in thickness than said torsion bars, said torsion bars intersecting the frame portion in respective recesses in the frame portion, wherein said mirror base comprises a first rib extending throughout said mirror base in alignment with said torsion bars and a second rib surrounding said mirror base; and facing portions of said second rib parallel to said torsion bars are formed with movable electrodes each facing a particular stationary electrode formed on said frame portion.

9. The device as claimed in claim 8, wherein said facing portions each are longer than said first rib.

10. The device as claimed in claim 8, wherein said movable electrodes and said stationary electrodes each are configured in a form of comb teeth.

11. In an optical scanning device comprising a mirror base supported by torsion bars and configured to reciprocatingly vibrate about an axis formed by said torsion bars, said torsion bars, said mirror base and a frame portion that supports said mirror base and that connects said torsion bars being formed integrally with each other, said mirror base including a rib identical in thickness with said torsion bars and a thin portion smaller in thickness than said torsion bars, wherein said mirror base and means for driving said mirror base are accommodated in a depressurized container including a portion, which transmits the light beam deflected by said mirror base, and a terminal portion electrically connected to said means.

* * * * *